United States Patent
Noh et al.

(10) Patent No.: US 8,111,732 B2
(45) Date of Patent: Feb. 7, 2012

(54) METHOD FOR GENERATING A REFERENCE SIGNAL SEQUENCE USING GROUPING

(75) Inventors: Min Seok Noh, Gyeonggi-do (KR);
Seung Hee Han, Gyeonggi-do (KR);
Yeong Hyeon Kwon, Gyeonggi-do (KR); Hyun Woo Lee, Gyeonggi-do (KR); Dong Cheol Kim, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/084,397

(22) Filed: Apr. 11, 2011

(65) Prior Publication Data

US 2011/0189950 A1    Aug. 4, 2011

Related U.S. Application Data

(63) Continuation of application No. 12/024,884, filed on Feb. 1, 2008, now Pat. No. 7,949,033.

(60) Provisional application No. 60/888,065, filed on Feb. 2, 2007, provisional application No. 60/984,386, filed on Nov. 1, 2007, provisional application No. 61/019,588, filed on Jan. 7, 2008.

(30) Foreign Application Priority Data

| May 16, 2007 | (KR) | 10-2007-0047494 |
| Oct. 4, 2007 | (KR) | 10-2007-0099707 |
| Oct. 26, 2007 | (KR) | 10-2007-0108226 |
| Oct. 29, 2007 | (KR) | 10-2007-0109089 |

(51) Int. Cl.
*H04B 1/707* (2011.01)

(52) U.S. Cl. ............... 375/140; 455/450; 455/452.1; 370/330

(58) Field of Classification Search .................. 375/140, 375/295, 260, 267; 455/450, 452.1; 370/330, 370/336, 338
See application file for complete search history.

(56) References Cited

U.S. PATENT DOCUMENTS

| 5,430,774 | A | 7/1995 | Dupuy |
| 6,115,354 | A | 9/2000 | Weck |
| 6,226,337 | B1 | 5/2001 | Klank et al. |
| 7,792,212 | B2 | 9/2010 | Lee et al. |
| 2005/0111522 | A1 | 5/2005 | Sung et al. |
| 2005/0226140 | A1 | 10/2005 | Zhuang et al. |

(Continued)

FOREIGN PATENT DOCUMENTS

KR    10-2004-0073156    8/2004

(Continued)

OTHER PUBLICATIONS

Motorola, "E-UTRAN Non-Synchronized Random Access Procedure," 3GPP TSG RAN1#46bis, R1-062602, Oct. 9, 2006, XP-050103110.

(Continued)

*Primary Examiner* — Kevin Kim
(74) *Attorney, Agent, or Firm* — Lee, Hong, Degerman, Kang & Waimey

(57) ABSTRACT

Method for generating reference signal sequence using grouping is explained. In this method, base sequences are grouped such that each group contains at least one base sequence of each length, so UE(s) can use various length sequences as a reference signal. And in this method, inter cell interference caused by using various length sequence as a reference signal sequence can be minimized by grouping sequences having the high cross correlation relation.

10 Claims, 4 Drawing Sheets

U.S. PATENT DOCUMENTS

2008/0080472 A1     4/2008    Bertrand et al.
2009/0252260 A1    10/2009    Noh et al.

FOREIGN PATENT DOCUMENTS

| KR | 10-2007-0050338 | 5/2007 |
|---|---|---|
| KR | 10-2007-0103917 | 10/2007 |
| RU | 2137312 | 9/1999 |
| WO | 98/52327 | 11/1998 |
| WO | 00/76248 | 12/2000 |
| WO | 2008-057836 | 5/2008 |

OTHER PUBLICATIONS

Motorola, "Uplink Reference Signal Generation Methods," 3GPP TSG RAN1 #47bis, R1-070152, Jan. 15, 2007, XP-050104199.

LG Electronics, "P-SCH Sequence Design for Single and Multiple PSCs," 3GPP TSG RAN WG1 #47bis, R1-070230, Jan. 15, 2007, XP-050104269.

Nokia, "Restricted Sets of RACH Preamble Signatures for Environments with High Doppler Shifts," 3GPP TSG RAN WG1 #47bis, R1-070377, Jan. 15, 2007, XP-050104409.

Toshiba Corporation, "On UL Reference Signal Structure," 3GPP TSG RAN WG1 #47bis, R1-070539, Jan. 15, 2007, XP-050104565.

Liang et al. "Synchronization in OFDM-based WLAN with transmit and receive diversities" IEEE 16th international symposium on personal, indoor, and mobile radio communications, 2005, PIMRC 2005, Sep. 2005.

A. Ghosh et al., "Random Access Design for UMTS Air-Interface Evolution," IEEE 65th Vehicular Technology Conference, pp. 1041-1045, Apr. 2007.

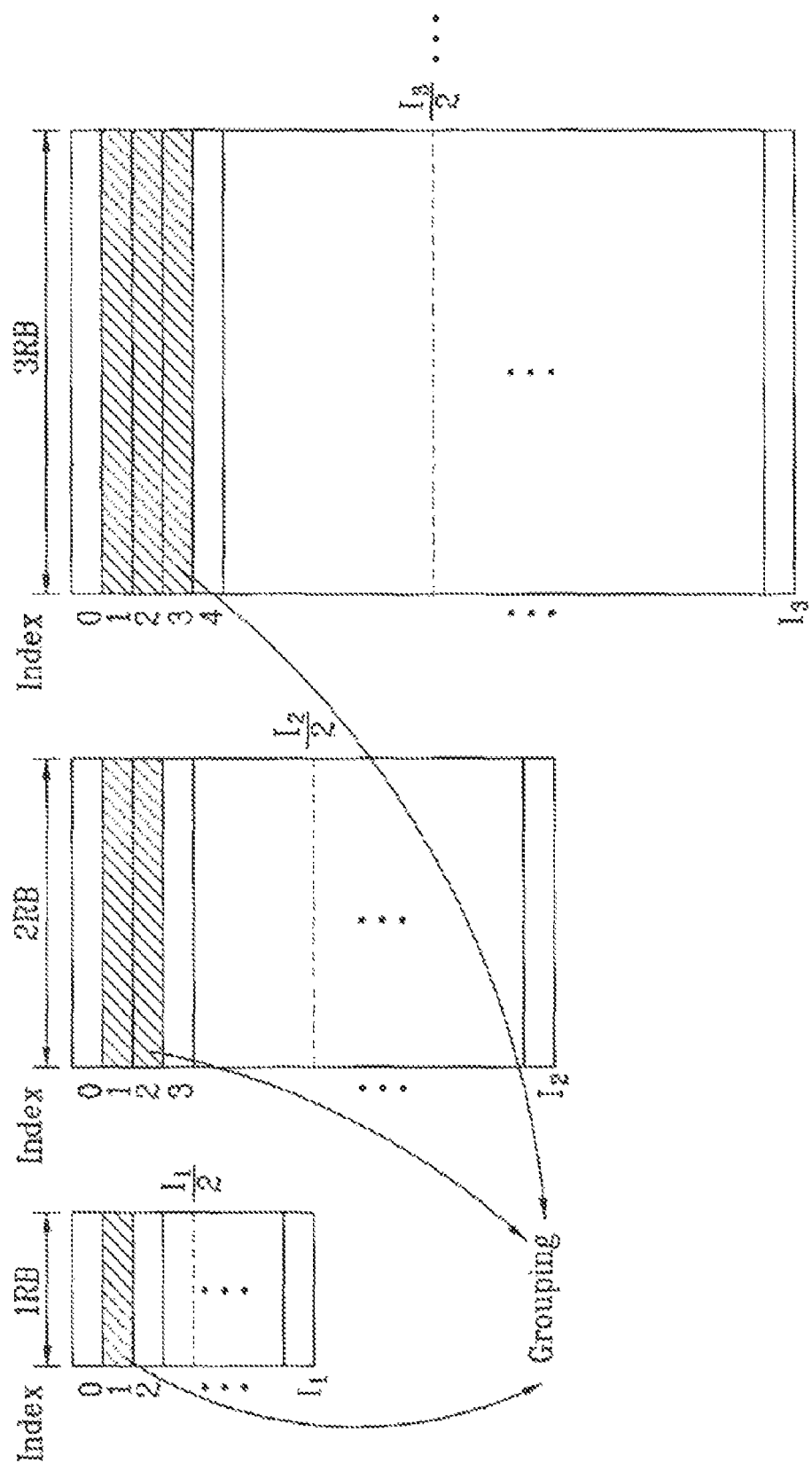

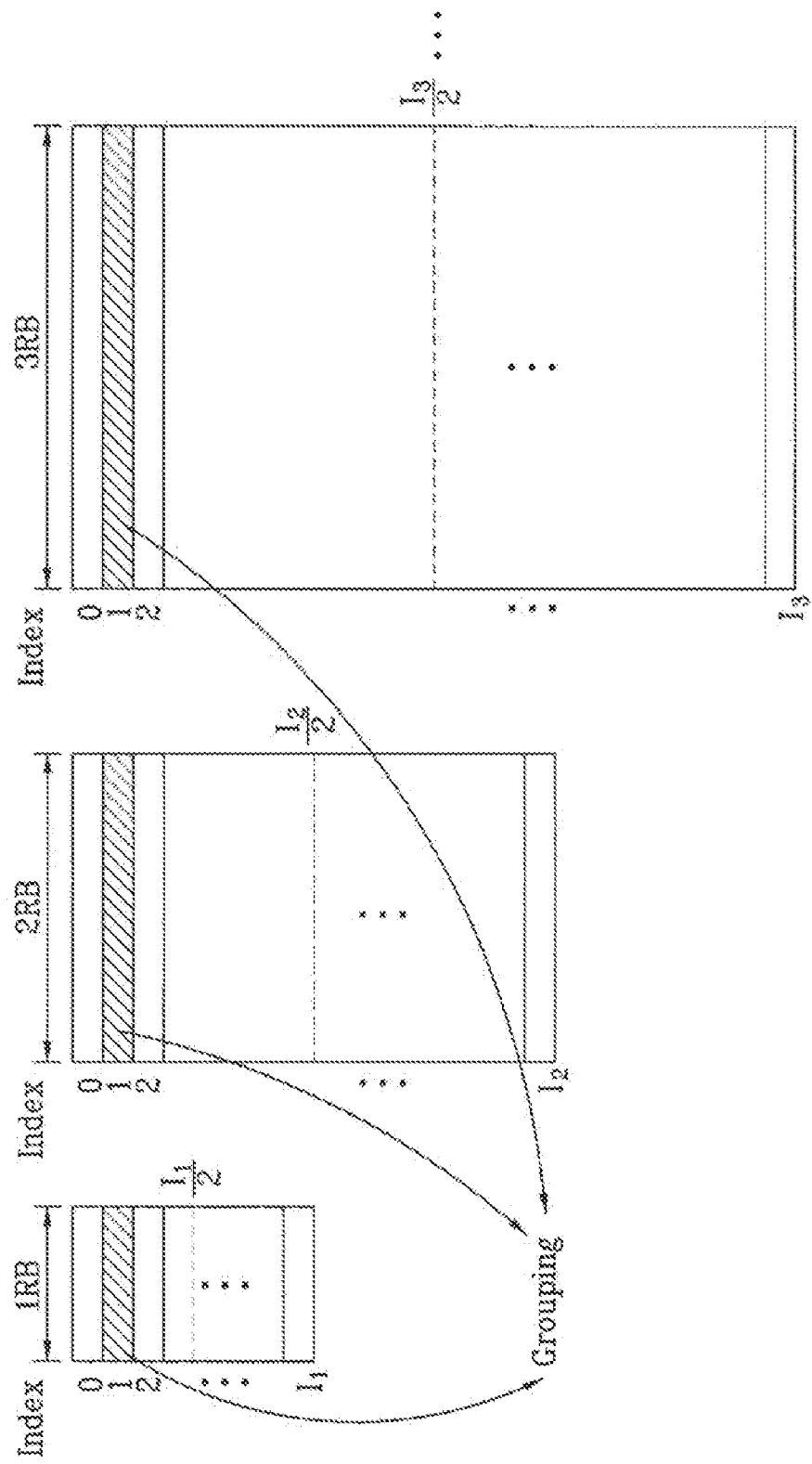

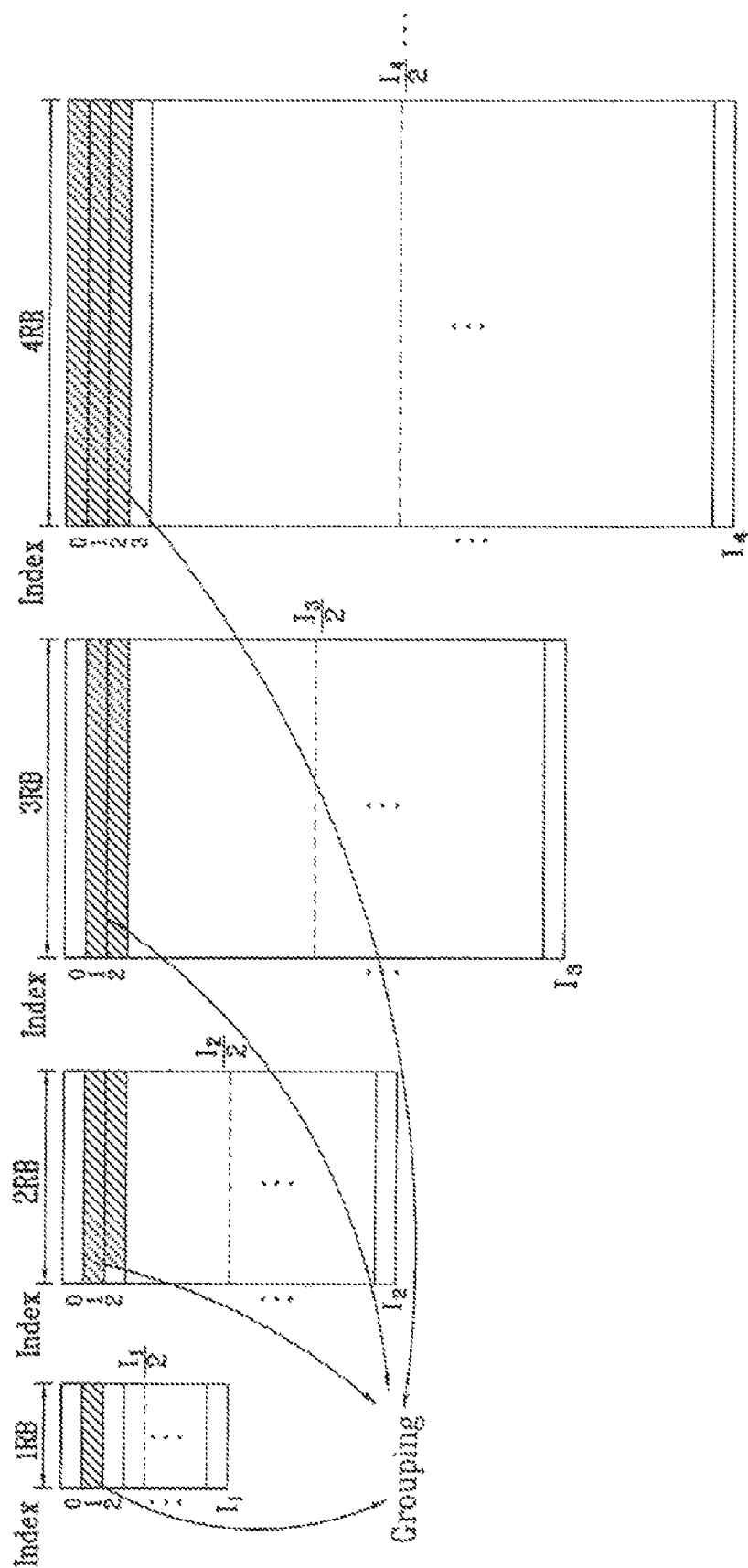

METHOD FOR GENERATING A REFERENCE SIGNAL SEQUENCE USING GROUPING

CROSS-REFERENCE TO RELATED APPLICATIONS

This application is a continuation of U.S. application Ser. No. 12/024,884, filed Feb. 1, 2008, now U.S. Pat. No. 7,949,033, which pursuant to 35 U.S.C. §119 claims the benefit of Korean patent application Nos. 10-2007-0047494, filed on May 16, 2007, 10-2007-0099707, filed on Oct. 4, 2007, 10-2007-0108226, filed on Oct. 26, 2007 and 10-2007-0109089, filed on Oct. 29, 2007, and U.S. Provisional application Ser. Nos. 60/888,065, filed on Feb. 2, 2007, 60/984,386, filed on Nov. 1, 2007 and 61/019,588, filed on Jan. 7, 2008, the contents of which are hereby incorporated by reference herein in their entirety.

BACKGROUND OF THE INVENTION

1. Field of the Invention

The present invention relates to method for generating a reference signal sequence, and more particularly, to a method for grouping sequences having a variable length corresponding one or multiple of a resource block size, a method for generating a reference signal sequence and a method for generating a reference signal sequence using Zadoff-Chu (ZC) sequence.

2. Discussion of the Related Art

Following explanation is mainly discussed in view of 3GPP LTE system, but the present invention is not limited to this system, and exemplary 3GPP LTE system is only for making those skilled in the art clearly understand the present invention.

There are a lot of sequences used for transmitting signal, but in 3GPP LTE ($3^{rd}$ Generation Partnership Project Long Term Evolution) system, CAZAC (Constant Amplitude Zero Auto-Correlation) sequence forms the basis sequence for transmitting signals. CAZAC sequence can be used to various channels for extracting ID or control information, such as uplink/downlink synchronization channels (SCH) including P-SCH (primary SCH) and S-SCH (Secondary SCH), pilot channel for transmitting reference signal. And, the CAZAC sequence can be used in scrambling.

Two types of CAZAC sequences, i.e., GCL CAZAC sequence and Zadoff-Chu CAZAC sequence are mainly used as the CAZAC sequences. The two types of CAZAC sequences are associated with each other by a conjugate complex relation. That is, the GCL CAZAC sequence can be acquired by conjugate complex calculation for the Zadoff-Chu CAZAC sequence. The Zadoff-Chu CAZAC sequence is given as follows.

$$c(k; N, M) = \exp\left(\frac{j\pi Mk(k+1)}{N}\right) \quad \text{[Equation 1]}$$
(for odd $N$)

$$c(k; N, M) = \exp\left(\frac{j\pi Mk^2}{N}\right) \quad \text{[Equation 2]}$$
(for even $N$)

where k represents a sequence component index, N represents a length of CAZAC sequence to be generated, and M represents sequence ID or sequence index.

When the Zadoff-Chu CAZAC sequence given by the Equations 1 and 2 and the GCL CAZAC sequence which is a conjugate complex relation with the Zadoff-Chu CAZAC sequence are represented by c(k; N, M), these sequence can have three features as follows.

$$|C(k; N; M)| = 1 \text{ (for all } k, N, M) \quad \text{[Equation 3]}$$

$$R_{M;N}(d) = \begin{cases} 1, & (\text{for } d = 0) \\ 0, & (\text{for } d \neq 0) \end{cases} \quad \text{[Equation 4]}$$

$$R_{M1,M2;N}(d) = p \text{ (for all } M_1, M_2 \text{ and } N) \quad \text{[Equation 5]}$$

The Equation 3 means that the CAZAC sequence always has a size of 1, and the Equation 4 shows that an auto-correlation function of the CAZAC sequence is expressed by a delta function. In this case, the auto-correlation is based on circular correlation. Also, the Equation 5 shows that a cross-correlation is always a constant.

Among these two kinds of CAZAC sequence, the following explanation is mainly focused on the Zadoff Chu sequence (hereinafter "ZC sequence").

In the 3GPP LTE system, using this ZC sequence as reference signal sequence, the length of the ZC sequence should be equal to the resource block size. And, not only using one resource block size sequence, but the reference signal sequence having the length corresponding to multiples of resource block size can be used.

For a single-cell environment, the reference signals are transmitted by the localized FDM (Frequency Divisional Multiplexing) method for multiplexing signals from multiple user equipments (UEs). But, for the multi-cell environment, the reference signals are transmitted by the additional CDM (Code Divisional Multiplexing) method for distinguishing the signals from that of the neighboring cells. In this multiplexing, two type of method is possible. One is a CDM method using a ZC sequence having a different root indexes, and the other is a CDM method using a ZC sequence having the same root index (M) and but having differently applied cyclic shift.

When the length of the reference signals using these kinds of ZC sequences is same, the cross correlation values for both of the cases are not large. But, when the reference signals having a difference length came as interference from the neighboring cells and transmitted through the same frequency band or overlapped frequency band, the cross correlation value would be significant.

SUMMARY OF THE INVENTION

Accordingly, the present invention is directed to provide a method for generating reference signal sequence, which minimizes the interference caused by the signals having different length, came from the neighboring cells.

For this method, the present invention also provides a method for effectively grouping sequences such that each of the group is consisted of the sequences having high cross correlation value, and supports variable length sequences to be used as a reference signals.

Also, the present invention provides a method for generating reference signal sequence based on the above grouping.

To achieve these objects and other advantages and in accordance with the purpose of the invention, as embodied and broadly described herein, a method for grouping sequences having a variable length corresponding one or multiple of a resource block size is provided. According to one embodiment, the method comprises: grouping the sequences into groups such that each of the groups contains at least one sequence of each length, wherein the grouped sequence is a base sequence which is used for applying a cyclic shift corresponding to variable cyclic shift value, and the base sequence with the cyclic shift is used as a reference signal sequence.

Preferably, a number of the groups is 30.

And, said grouping may be performed such that each of the groups contains one base sequence of each length corresponding to 1 to 5 times of the resource block size, and two base sequences of each length corresponding to 6 or more times of the resource block size.

And, preferably, the base sequence having a length corresponding to 3 or more times of the resource block size is defined by using a Zadoff-Chu (ZC) sequence, and the base sequence having a length corresponding to 1 or 2 times of the resource block size is defined by using other sequence other than the ZC sequence.

In another aspect of the present invention, a method for generating a reference signal sequence is provided. In one embodiment for this aspect, the method comprises: defining one or more base sequences having a variable length corresponding to one or multiple of a resource block size; and applying a cyclic shift corresponding to variable cyclic shift value to the defined base sequence, wherein the base sequences are divided into groups, and each of the group comprises at least one base sequence of each length.

In this case, the base sequence may be defined by cyclic extension of the ZC sequence having a length ($N_{zc}^{RS}$) given by a largest prime number which is less than a corresponding reference signal sequence size. Also the base sequence may be defined by truncation of the ZC sequence having a length ($N_{zc}^{RS}$) given by the smallest prime number which is larger than a corresponding reference signal sequence size.

Also in this embodiment, preferably, a number of the groups is 30.

And, each of the groups may contain one base sequence of each length corresponding to 1 to 5 times of the resource block size, and two base sequences of each length corresponding to 6 or more times of the resource block size.

And, the base sequence having a length corresponding to 3 or more times of the resource block size may be defined by using a Zadoff-Chu (ZC) sequence with specific ZC sequence index (q), and the base sequence having a length corresponding to 1 or 2 times of the resource block size may be defined by using other sequence other than the ZC sequence.

And, preferably, the specific ZC sequence index (q) is a function of a group index (u) and a base sequence number index (v) within the group.

And, the defined base sequence with cyclic shift may be used for uplink reference signal sequence.

Also for above embodiments, the resource block size may correspond to a size of 12 subcarriers in a frequency domain.

In another aspect of the present invention, a method for generating a reference signal sequence using Zadoff-Chu (ZC) sequence is provided. In on embodiment for this aspect, the method comprises: defining a specific base sequence using q-th root ZC sequence, wherein the base sequences are divided into groups, and the "q" is a function of a group index (u) and a base sequence number index (v) within the group; and applying a cyclic shift corresponding to variable cyclic shift value to the defined base sequence to generate the reference signal sequence.

In one case, the specific ZC sequence index (q) may be determined by one of equations of, $$q = \text{round}(y) + \text{floor}\left(\frac{v+1}{2}\right) \cdot (-1)^{floor(round(y)-y)+v} \quad (1)$$

where $y = \dfrac{N_{zc}^{RS} \cdot (u+1)}{N_{reference,zc}^{RS}}$, $u \in \{0, 1, \ldots, 29\}, v \in \{0, 1, \ldots, \text{floor}(N_{ZC}^{RS}/30) - 1\}$, $$q = \text{round}(y) + \text{floor}\left(\frac{v+1}{2}\right) \cdot (-1)^{floor(round(y)-y)+v} \quad (2)$$

where $y = \dfrac{(N_{zc}^{RS}-1) \cdot (u+1)}{N_{reference,zc}^{RS}-1}$, $u \in \{0, 1, \ldots, 29\}, v \in \{0, 1, \ldots, \text{floor}(N_{ZC}^{RS}/30) - 1\}$, or $$q = \text{round}(y) + \text{floor}\left(\frac{v+1}{2}\right) \cdot (-1)^{floor(round(y)-y)+v} \quad (3)$$

where $y = \text{round}\left(\dfrac{N_{zc}^{RS}}{N_{reference,zc}^{RS}}\right) \cdot (u+1)$, $u \in \{0, 1, \ldots, 29\}, v \in \{0, 1, \ldots, \text{floor}(N_{ZC}^{RS}/30) - 1\}$.

wherein $N_{zc}^{RS}$ is the length given by the largest prime number which is less than the corresponding reference signal sequence $N_{reference,zc}^{RS}$ is the corresponding reference signal sequence size, the "round (z)" is a function of rounding off to a nearest integer nearest to z, and the "floor (z)" is a function of making a greatest integer not greater than z. But, $N_{zc}^{RS}$ can be the length given by the smallest prime number which is greater than the corresponding reference signal sequence, for another embodiment of this invention.

In the other case, the specific ZC sequence index (q) may be determined by one of equations of, $$q = \text{floor}(y+0.5) + \text{floor}\left(\frac{v+1}{2}\right) \cdot (-1)^{floor(floor(y+0.5)-y)+v} \quad (1)$$

where $y = \dfrac{N_{zc}^{RS} \cdot (u+1)}{N_{reference,zc}^{RS}}$, $u \in \{0, 1, \ldots, 29\}, v \in \{0, 1, \ldots, \text{floor}(N_{ZC}^{RS}/30) - 1\}$ $$q = \text{floor}(y+0.5) + \text{floor}\left(\frac{v+1}{2}\right) \cdot (-1)^{floor(floor(y+0.5)-y)+v} \quad (2)$$

where $y = \dfrac{(N_{zc}^{RS}-1) \cdot (u+1)}{N_{reference,zc}^{RS}-1}$, $u \in \{0, 1, \ldots, 29\}, v \in \{0, 1, \ldots, \text{floor}(N_{ZC}^{RS}/30) - 1\}$, or $$q = \text{floor}(y+0.5) + \text{floor}\left(\frac{v+1}{2}\right) \cdot (-1)^{floor(floor(y+0.5)-y)+v} \quad (3)$$

where $y = \text{floor}\left(\dfrac{N_{zc}^{RS}}{N_{reference,zc}^{RS}} + 0.5\right) \cdot (u+1)$, $u \in \{0, 1, \ldots, 29\}, v \in \{0, 1, \ldots, \text{floor}(N_{ZC}^{RS}/30) - 1\}$.

wherein $N_{zc}^{RS}$ is the length given by the largest prime number which is less than the corresponding reference signal sequence size, $N_{reference,zc}^{RS}$ is the corresponding reference signal sequence size, the "round (z)" is a function of rounding off to a nearest integer nearest to z, and the "floor (z)" is a function of making a greatest integer not greater than z. But, $N_{zc}^{RS}$ can be the length given by the smallest prime number which is greater than the corresponding reference signal sequence, for another embodiment of this invention.

In one specific embodiment of this invention, the maximum number of the base sequence number index (v) within each group may be set to is 2, and then the specific ZC sequence index (q) can be determined by one of equations of, $$q = \text{round}(y) + v \cdot (-1)^{\text{floor}(2y)} \quad (1)$$
$$\text{where } y = \frac{N_{zc}^{RS} \cdot (u+1)}{N_{reference,zc}^{RS}}, u \in \{0, 1, \ldots, 29\}, v \in \{0, 1\}$$

$$q = \text{round}(y) + v \cdot (-1)^{\text{floor}(2y)} \quad (2)$$
$$\text{where } y = \frac{(N_{zc}^{RS} - 1) \cdot (u+1)}{N_{reference,zc}^{RS} - 1},$$
$$u \in \{0, 1, \ldots, 29\}, v \in \{0, 1\}, \text{ or}$$

$$q = \text{round}(y) + v \cdot (-1)^{\text{floor}(2y)} \quad (3)$$
$$\text{where } y = \text{round}\left(\frac{N_{zc}^{RS}}{N_{reference,zc}^{RS}}\right) \cdot (u+1),$$
$$u \in \{0, 1, \ldots, 29\}, v \in \{0, 1\}.$$

rr by one of equations of, $$q = \text{floor}(y + 0.5) + v \cdot (-1)^{\text{floor}(2y)} \quad (1)$$
$$\text{where } y = \frac{N_{zc}^{RS} \cdot (u+1)}{N_{reference,zc}^{RS}}, u \in \{0, 1, \ldots, 29\}, v \in \{0, 1\}$$

$$q = \text{floor}(y + 0.5) + v \cdot (-1)^{\text{floor}(2y)} \quad (2)$$
$$\text{where } y = \frac{(N_{zc}^{RS} - 1) \cdot (u+1)}{N_{reference,zc}^{RS} - 1},$$
$$u \in \{0, 1, \ldots, 29\}, v \in \{0, 1\}, \text{ or}$$

$$q = \text{floor}(y + 0.5) + v \cdot (-1)^{\text{floor}(2y)} \quad (3)$$
$$\text{where } y = \text{floor}\left(\frac{N_{zc}^{RS}}{N_{reference,zc}^{RS}} + 0.5\right) \cdot (u+1),$$
$$u \in \{0, 1, \ldots, 29\}, v \in \{0, 1\}.$$

Preferably, $N_{reference,zc}^{RS}$ be set to 31 or 37, but $N_{reference,zc}^{RS}$ can be set to other values as well.

According to these embodiments, of this invention, because the base sequence for applying cyclic shift is grouped, and each group contains at least one base sequence of each length, UE(s) can use various length sequences as a reference signal sequence when specific group is allocated to one cell or Node B.

Additionally, because each group contains base sequences having high cross correlation relation, if each group is allocated to one cell or Node B, inter cell interference can be minimized.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIGS. 3 to 5 show conceptual diagrams of grouping sequences according to one embodiment of this invention.

DETAILED DESCRIPTION OF THE INVENTION

Hereinafter, the preferred embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

Hereinafter, the detailed description includes detailed matters to provide full understanding of the present invention. However, it will be apparent to those skilled in the art that the present invention can be carried out without the detailed matters. To prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

As stated above, the present invention is directed to provide a method for generating reference signal sequence, which minimizes the interference caused by the signals having different length, came from the neighboring cells.

To this end, the length of the CAZAC sequence is explained.

Presently, in the 3GPP LTE system, the resource block (RB) size for transmitting all kind of the OFDM symbol including reference signal symbol corresponds to the size of 12 subcarriers. So, when ZC is generated for uplink reference signal sequence, the size of ZC sequence would correspond to 12 subcarriers size.

For the case of CAZAC sequence, the number of CAZAC sequence indexes (M) which could be distinguished from, each other is decided by the number of relative prime number relative prime to the sequence length (N). So, when the ZC sequence is generated to have the length of 12, the number of ZC sequences having a different sequence index is 4. But, if the ZC sequence is generated based on the prime number length (N), the number of ZC sequence having a different sequence index can be N−1, which maximizes the number of ZC sequence. Therefore, various methods for generating CAZAC sequence based on the prime number length are provided.

First, a truncated sequence generation method is explained.

Figure 1:
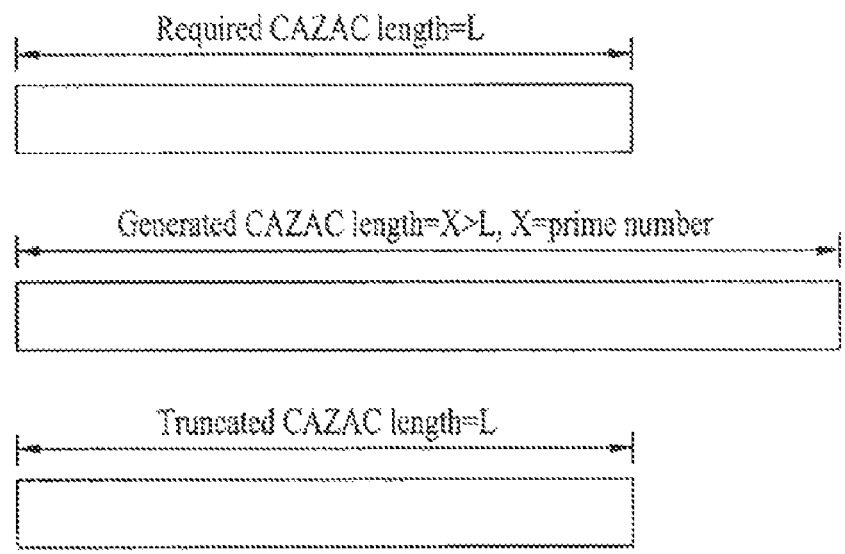
FIG. 1 shows a conceptual diagram for explaining the truncated sequence generation method.

FIG. 1 shows a conceptual diagram for explaining the truncated sequence generation method.

As shown in the FIG. 1, when the required CAZAC sequence length is "L", CAZAC sequence having the prime number length of "X" (where X>L) is generated. And, the generated CAZAC sequence having the length "X" is truncated to have the length "L", that is, part of the sequence having the length of "X−L" is truncated.

By this method, the number of CAZAC sequence is maximized. But because part of the generated sequence is truncated, the auto/cross correlation properties of CAZAC sequence explained with the equations 4 and 5 are somewhat deteriorated. And, when the sequences having poor correlation properties are eliminated, the actual number of sequence is diminished. Moreover, because of the truncation, good PAPR property of CAZAC sequence can also be deteriorated.

So, another type of methods for generating CAZAC sequence based on the prime number is presented. One of these method is that the CAZAC sequence is generated to have the prime number length "X" (where X<L), and components having the length of "L−X" is added to the generated CAZAC sequence. This components added to the generated sequence can be called as padding part, so this method can be called as generation method using padding part.

Figure 2:
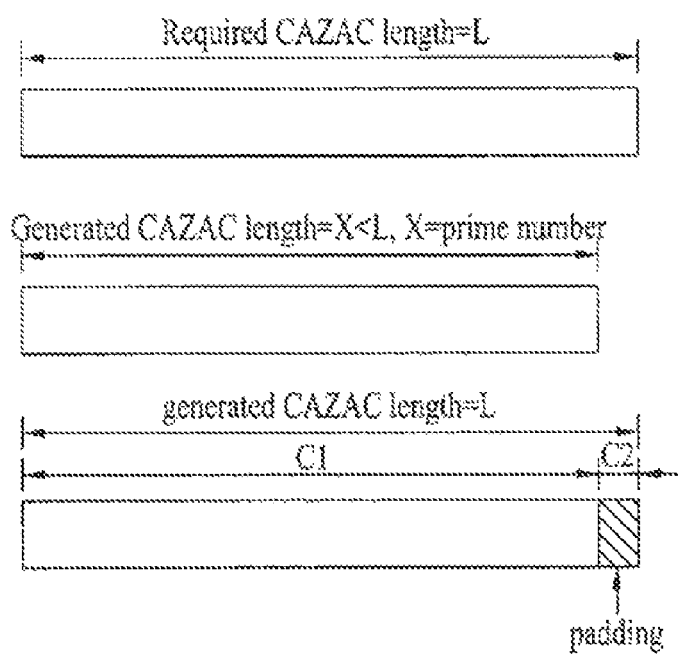
FIG. 2 shows a conceptual diagram for explaining the generation method using padding part.

FIG. 2 shows a conceptual diagram for explaining the generation method using padding part.

As shown in the FIG. 2, when the required CAZAC sequence length is "L", the CAZAC sequence is generated to have the length "X", which is a maximum prime number smaller than "L". And, the padding part having the length of "L–X" is added to the generated sequence.

In one method for this kind of methods, the padding part can be consisted of zeros. By this method, the number of CAZAC sequence can be maximized. Moreover, the auto/cross correlation properties of the CAZAC sequence can be maintained when distinction of the sequences is done with regard to the length of "C1" in FIG. 2.

And, preferably, the padding part can be a cyclic extension of the CAZAC sequence. That is, the padding part (C2) can be generated by cyclic copying of the first part of the generated CAZAC sequence, and be added to the generated sequence. By doing so, the resultant sequence can have a good auto-cross correlation propertied even when the distinction of the sequence is done with regard to the entire sequence length (L). So, this method has further advantage than the above method using the padding part as zeros.

The present invention for generating reference signal sequence using CAZAC sequence is mainly based on the generation method using padding part generated by the above mentioned cyclic extension. But, limitation to this generation method is not necessary, that is, present invention can be based on the truncated sequence generation method and the generation method using padding part consisted of zeros.

Based on this, the inter cell interference caused by using sequences having difference length is explained.

When CAZAC sequence is used for reference signal sequence, the inter cell interference is proportional to the cross correlation value between two sequence. So, in the following examples, the cross correlation value, caused by the overlapping between the original reference signal transmitted through certain resource region and the incoming sequence came from the neighboring cells, having difference length from that of the original reference signal, and transmitted through the same resource region, is considered with regard to the index of the ZC sequences.

More specifically, in the following examples, the sequences having the length of 1 RB, 2 RB and 3 RB is considered. And, let us presume that the sequences having the length of 1 RB and 2 RB are generated by the cyclic extension of the ZC sequence having the length given by the largest prime number which is less than a corresponding resource block size. And, let us presume that the sequence having the length of 3 RB is generated by the truncated sequence generation method. That is, the sequences can be generated to have the corresponding resource block size based on the prime number length by one of the above 3 generation methods.

First, consider the case when the sequence having 1 RB length and the sequence having 2 RB length is overlapped in the same resource region. The sequence having 1 RB length and the sequence having 2 RB length can be expressed as follows.

$$g_{1RB}(k;s_1) = e^{-j\frac{\pi}{N_1}s_1 k(k+1)}, \quad k=0,\ldots,N-1 \quad \text{[Equation 6]}$$

$$g_{2RB}(k;s_2) = e^{-j\frac{\pi}{N_2}s_2 k(k+1)}, \quad k=0,\ldots,2N-1$$

Here, $s_1$ and $s_2$ indicate the indexes which are relative prime to the sequence length (N or 2N). In this example, for the sequences having 1 RB length and 2 RB length are generated using the cyclic extension method, $s_1$ can be 1, 2, ..., 10 and $s_2$ can be 1, 2, ..., 22. And, $N_1$ may be 11, and $N_2$ may be 23.

Based on this, the cross correlation value ($c(d; s_1, s_2)$) generated when the sequence with 1 RB length is overlapped with the sequence with 2 RB length in the first 12 subcarriers region of the sequence with 2 RB length can be expressed as follows.

$$c(d;s_1,s_2) = \sum_{k=0}^{N-1} g_{1,RB}(k;s_1) g_{2RB}^*(k+d;s_2) \quad \text{[Equation 7]}$$

For $d = 0$, $$c(0;s_1,s_2) = \sum_{k=0}^{N-1} \exp\left(-j\frac{\pi}{N_1}s_1 \bmod(k, N-1)(\bmod(k, N-1)+1)\right)$$

$$\exp\left(j\frac{\pi}{N_2}s_2 \bmod(k, 2N-1)(\bmod(k, 2N-1)+1)\right)$$

$$= \left[\sum_{k=0}^{10} \exp\left\{j\pi k(k+1)\left(\frac{s_2}{23} - \frac{s_1}{11}\right)\right\}\right] +$$

$$\exp\left(j\frac{\pi}{23}s_2 \cdot 11 \cdot 12\right)$$

According to the equation 7, it can be understood that if the combination of sequence indexes ($s_1$ and $s_2$) meet the condition that the term of $$\left(\frac{s_2}{23} - \frac{s_1}{11}\right)$$

becomes close to zero, the sequences indicated by these sequence indexes result in high cross correlation.

Therefore, one embodiment of the present invention proposes to perform grouping the sequences into groups such that the sequences contained in each group have the high cross correlation relation with each other. And, if 1 RB length sequence and 2 RB length sequence are considered, grouping the combination of sequence indexes which meets the condition that the term of $$\left(\frac{s_2}{23} - \frac{s_1}{11}\right)$$

becomes close to zero is proposed.

But, to determine more general condition for the grouping sequences, let us consider some other examples.

When 1 RB sequence is overlapped in the last 12 subcarriers region of the 2 RB sequence, the cross correlation value ($c(d; s_1, s_2)$) of the two sequences can be expressed as follows.

$$c(d;s_1,s_2) = \sum_{k=0}^{N-1} g_{1,RB}(k;s_1) g_{2RB}^*(k+12+d;s_2) \quad \text{[Equation 8]}$$

For $d = 0$,

-continued $$c(d; s_1, s_2) = \sum_{k=0}^{N-1} \exp\left(-j\frac{\pi}{N_1}s_1 \mod(k, N-1)(\mod(k, N-1)+1)\right)$$

$$\exp\left(j\frac{\pi}{N_2}s_2 \mod(k+12, 2N-1)(\mod(k+12, 2N-1)+1)\right)$$

$$= \left[\sum_{k=0}^{10} \exp\left\{j\pi k(k+1)\left(\frac{s_2}{23} - \frac{s_1}{11}\right) + \frac{s_2}{23} \cdot 12 \cdot (2k+13)\right\}\right] + 1$$

According to the equation 8, it can also concluded that if the combination of sequence indexes ($s_1$ and $s_2$) meet the condition that the term of $$\left(\frac{s_2}{23} - \frac{s_1}{11}\right)$$

becomes close to zero, the sequences indicated by these sequence indexes result in high cross correlation. So, if 1 RB length sequence and 2 RB length sequence are considered, the position where the overlapping is occurred is not change the grouping condition.

Next, let us consider the case when the 1 RB length sequence and the 3 RB length sequence are overlapped in the same resource region.

First of all, the 1 RB length sequence and the 3 RB length sequence can be expressed as follows.

$$g_{1RB}(k; s_1) = e^{-j\frac{\pi}{N_1}s_1 k(k+1)}, \quad k = 0, \ldots, N-1 \quad \text{[Equation 9]}$$

$$g_{3RB}(k; s_3) = e^{-j\frac{\pi}{N_3}s_3 k(k+1)}, \quad k = 0, \ldots, 3N-1$$

Here, $s_1$ and $s_3$ indicate the indexes which are relative prime to the sequence length (N or 3N). In this example, for the 1 RB length sequences is generated using the cyclic extension method and the 3 RB length sequence is generated using the truncated sequence generation method, $s_1$ can be 1, 2, . . . , 10 and $s_2$ can be 1, 2, . . . , 36. And, $N_1$ may be 11, and $N_2$ may be 37.

Based on this, if the 1 RB length sequence is overlapped in the first 12 subcarriers region of the 3 RB length sequence, the cross correlation value between the two sequences can be expressed as follows.

$$c(d; s_1, s_3) = \sum_{k=0}^{N-1} g_{1,RB}(k; s_1) g^*_{3RB}(k+d; s_3) \quad \text{[Equation 10]}$$

For $d = 0$, $$c(0; s_1, s_3) = \sum_{k=0}^{N-1} \exp\left(-j\frac{\pi}{N_1}s_1 \mod(k, N-1)(\mod(k, N-1)+1)\right)$$

$$\exp\left(j\frac{\pi}{N_3}s_3 k(k+1)\right)$$

$$= \left[\sum_{k=0}^{10} \exp\left\{j\pi k(k+1)\left(\frac{s_3}{37} - \frac{s_1}{11}\right)\right\}\right] +$$

$$\exp\left(j\frac{\pi}{37}s_3 \cdot 11 \cdot 12\right)$$

According to the equation 10, it can be understood that if the combination of sequence indexes ($s_1$ and $s_3$) meet the condition that the term of $$\left(\frac{s_3}{37} - \frac{s_1}{11}\right)$$

becomes close to zero, the sequences indicated by these sequence indexes result in high cross correlation. Therefore, if 1 RB length sequence and 3 RB length sequence are considered, grouping the combination of sequence indexes which meets the condition that the term of $$\left(\frac{s_3}{37} - \frac{s_1}{11}\right)$$

becomes close to zero is proposed.

And, to certify the relation with the position where the overlapping is occurred, let us consider the case when the 1 RB length sequence is overlapped in the second 12 subcarriers region of the 3 RB length sequence. In this case, the cross correlation value between these two sequences can be expressed as follows.

$$c(d; s_1, s_3) = \sum_{k=0}^{N-1} g_{1RB}(k; s_1) g^*_{3RB}(k+12+d; s_3) \quad \text{[Equation 11]}$$

For $d = 0$, $$c(0; s_1, s_3) = \sum_{k=0}^{N-1} \exp\left(-j\frac{\pi}{N_1}s_1 \mod(k, N-1)(\mod(k, N-1)+1)\right)\exp$$

$$\left(j\frac{\pi}{N_3}s_3(k+12)(k+13)\right)$$

$$= \left[\sum_{k=0}^{10} \exp\left[j\pi\left\{k(k+1)\left(\frac{s_3}{37} - \frac{s_1}{11}\right) + \frac{s_2}{37} \cdot 12 \cdot (2k+13)\right\}\right]\right] +$$

$$\exp\left(j\frac{\pi}{37}s_3 \cdot 23 \cdot 24\right)$$

And, when the 1 RB length sequence overlapped in the last 12 subcarrier region of the 3 RB length sequence, the cross correlation value can be expressed as follows.

$$c(d; s_1, s_3) = \sum_{k=0}^{N-1} g_{1RB}(k; s_1) g^*_{3RB}(k+24+d; s_3) \quad \text{[Equation 12]}$$

For $d = 0$, $$c(0; s_1, s_3) = \sum_{k=0}^{N-1} \exp\left(-j\frac{\pi}{N_1}s_1 \mod(k, N-1)(\mod(k, N-1)+1)\right)\exp$$

$$\left(j\frac{\pi}{N_3}s_3(k+24)(k+25)\right)$$

$$= \left[\sum_{k=0}^{10} \exp\left[j\pi\left\{k(k+1)\left(\frac{s_3}{37} - \frac{s_1}{11}\right) + \frac{s_2}{37} \cdot 24 \cdot (2k+25)\right\}\right]\right] +$$

$$\exp\left(j\frac{\pi}{37}s_3 \cdot 35 \cdot 36\right)$$

According to the equations 11 and 12, it can also concluded that if the combination of sequence indexes ($s_1$ and $s_3$) meet the condition that the term of $$\left(\frac{s_3}{37} - \frac{s_1}{11}\right)$$

becomes close to zero, the sequences indicated by these sequence indexes result in high cross correlation. So, if 1 RB length sequence and 3 RB length sequence are considered, the position where the overlapping is occurred is not change the grouping condition.

According to the above examples, the present embodiment proposes to perform grouping sequences such that two sequence indexes among all the sequence indexes grouped into the same group meet the condition that the term ($s_2/N_2 - s_1/N_1$) becomes close to zero, when the two sequences having the length of $N_1$ and $N_2$ are considered. Here, $N_1$ and $N_2$ can be maximum relative prime numbers which are less than the resultant reference signal sequence. And, $s_1$ and $s_2$ mean the root indexes of the ZC sequences, and can be selected among the ranges of $1 \sim (N_1-1)$ and $1 \sim (N_2-1)$ respectively.

Based on this, let's consider more general grouping method considering various length sequences.

FIGS. 3 to 5 show conceptual diagrams of grouping sequences according to one embodiment of this invention.

According to this embodiment, among various length sequences such as 1 RB, 2 RB, 3 RB . . . as shown in the FIG. 3, the sequences whose indexes meet the high cross correlation condition as stated above may be grouped into the same group. And, each of the sequence groups can be allocated to the same cell or node B.

Generally, FDM is done with the unit of cell or Node B, so the inference caused by using the sequences having difference length can be minimized within one cell or Node B. So, by allocating the sequences having the high cross correlation relation to the same cell or Node B, the inter cell interference caused by using the different length sequences can be minimized.

And, another embodiment of this invention proposes to perform grouping such that each of the groups contains at least one sequence of each length. By doing so, if the sequence group is allocated to the same cell or Node B, UE(s) located in that cell or Node B can be supported to use various length reference signal sequence. But specific grouping method can be variously defined.

First, the number of sequences allocated to one group can be proportional to the number of RBs which corresponds to the reference signal sequence length. In FIG. 3, one sequence for 1 RB length sequence, two sequences for 2 RB length sequence, 3 sequences for 3 RB length sequence, and so on, are grouped.

Second, the number of sequences allocated to one group can be a constant number. In FIG. 4, one sequence for each RB length sequence is grouped to the same group.

And, the present embodiment can be defined to perform grouping such that the number of sequences allocated to one group is neither proportional to the sequence length nor remain constant. FIG. 5 shows an example of grouping sequence such that one sequence for 1 RB length sequence, 2 sequences for 2 RB length sequence, 2 sequences for 3 RB length sequence, and 3 sequences for 4 RB length sequence, and so on, are grouped into one group.

As like the above, if each group contains at least one sequence of each RB length, the maximum number of sequence per group can be defined. When the maximum number of sequence per group is defined, a method for selecting root index of the ZC sequence within the sequence number limit can be defined as follows.

If one sequence is selected per each RB length sequence, and if one specific sequence with the index of $s_1$ and the length of $N_1$ is already selected for that group, one sequence per (having index of $s_2$) each RB length can be selected, of which index make the term of ($s_2/N_2 - s_1/N_1$) to be closest to zero, where $N_2$ is the sequence length corresponding to the considered RB length. And, if 2 sequences are selected per certain RB length sequence, and if one specific sequence with the index of $s_1$ and the length of $N_1$ is already selected for that group, two sequences per that RB length can be selected to make the term of ($s_2/N_2 - s_1/N_1$) to be close to zero. This can be more generalized to the maximum sequence number of "x" per each RB length.

And, another grouping method can be defined as follows. If one sequence is selected per each RB length sequence, and if one specific sequence with the index of $s_1$ and the length of $N_1$ is already selected for that group, first, select certain number (y) of sequences among sequences which make the term ($s_2/N_2 - s_1/N_1$) to be close to certain value, and then, select one sequence among the y sequences which has high cross correlation relation with the sequence having the index of $s_1$. And, if 2 sequences are selected per certain RB length sequence, and if one specific sequence with the index of $s_1$ and the length of $N_1$ is already selected for that group, first, select certain number (y) of sequences among sequences which make the term ($s_2/N_2 - s_1/N_1$) to be close to certain value, and then, select two sequences among the y sequences which have high cross correlation relation with the sequence having the index of $s_1$. This can be more generalized to the maximum sequence number of "x" per each RB length.

In the above examples, one specific sequence with the index of $S_1$ and the length of $N_1$ is firstly selected and becomes the reference for selecting rest of the sequence. This reference sequence can be defined to be 1 RB length sequence, 2 RB length sequence, 3 RB length sequence, and so on. But In the following explanation, let us presume that the reference sequence is the 3 RB length sequence. And, because the number of sequence indexes per 3 RB length is 30, the number of groups for grouping sequence according to this embodiment of the invention can be 30.

Considering that the number of root indexes for 3 RB length sequence is 30, the number of root index selected for certain group can be determined as follows.

round(the number of root index for certain *RB* length sequence/30)       [Equation 13]

Here, "round (z)" is a function of rounding off to a nearest integer nearest to z.

By the equation 13, for 3 RB and 4 RB lengths, 1 sequence can be selected. And, for 5 RB~6 RB lengths, 2 sequence can be selected. Further, for the length greater than the 6 RB length, 3 or more sequence can be selected, respectively. And, according to one embodiment of this invention, sequence with the length less than 3 RB length can be differently defined, such as not using ZC sequence. By doing so, the number of sequences selected for 1 RB length and 2 RB length can be determined to 1.

To summarize, according to this embodiment, the number of sequence per groups can be defined as follows.

(1*RB*,2*RB*,3*RB*,4*RB*,5*RB*,6*RB*,8*RB*,9*RB*,10*RB*,12*RB*, 15*RB*,16*RB*,18*RB*,20*RB*,24*RB*,25*RB*, . . . )={1,1, 1,1,2,2,3,3,4,5,6,6,7,8,9,9, . . . }     [Equation 14]

Based on this, the following tables 1-5 show an example of sequence grouping such that each group contains the number of sequences according to the equation 14, and the sequences selected per each group satisfy the high cross correlation relation as stated above.

TABLE 1

| Group index based on 3RBs | 3RB | 4RB | 5RB | | 6RB | | 8RB | | | 9RB | | |
|---|---|---|---|---|---|---|---|---|---|---|---|---|
| 1  | 1  | 2  | 2  | 1  | 2  | 3  | 3  | 2  | 4  | 3   | 4   | 2   |
| 2  | 2  | 3  | 4  | 3  | 5  | 4  | 6  | 5  | 7  | 7   | 6   | 8   |
| 3  | 3  | 5  | 6  | 5  | 7  | 6  | 9  | 8  |    | 10  | 11  | 9   |
| 4  | 4  | 6  | 8  | 7  | 9  | 10 | 11 | 12 |    | 14  | 13  | 15  |
| 5  | 5  | 8  | 10 | 9  | 11 | 12 | 14 | 15 | 13 | 17  | 18  | 16  |
| 6  | 6  | 9  | 11 | 12 | 14 | 13 | 17 | 18 | 16 | 21  | 20  | 22  |
| 7  | 7  | 11 | 13 | 14 | 16 | 17 | 20 | 21 | 19 | 24  | 25  | 23  |
| 8  | 8  | 12 | 15 | 16 | 18 | 19 | 23 | 22 | 24 | 28  | 27  | 29  |
| 9  | 9  | 14 | 17 | 18 | 21 | 20 | 26 | 25 | 27 | 31  | 32  | 30  |
| 10 | 10 | 15 | 19 |    | 23 | 22 | 29 | 28 | 30 | 35  | 34  | 36  |
| 11 | 11 | 17 | 21 |    | 25 | 26 | 32 | 31 |    | 38  | 37  | 39  |
| 12 | 12 | 18 | 23 | 22 | 27 | 28 | 34 | 35 |    | 41  | 42  | 40  |
| 13 | 13 | 20 | 25 | 24 | 30 | 29 | 37 | 38 | 36 | 45  | 44  | 46  |
| 14 | 14 | 21 | 27 | 26 | 32 | 33 | 40 | 41 | 39 | 48  | 49  | 47  |
| 15 | 15 | 23 | 29 | 28 | 34 | 35 | 43 | 44 | 42 | 52  | 51  | 53  |
| 16 | 16 | 24 | 30 | 31 | 37 | 36 | 46 | 45 | 47 | 55  | 56  | 54  |
| 17 | 17 | 26 | 32 | 33 | 39 | 38 | 49 | 48 | 50 | 59  | 58  | 60  |
| 18 | 18 | 27 | 34 | 35 | 41 | 42 | 52 | 51 | 53 | 62  | 63  | 61  |
| 19 | 19 | 29 | 36 | 37 | 44 | 43 | 55 | 54 |    | 66  | 65  | 67  |
| 20 | 20 | 30 | 38 |    | 46 | 45 | 57 | 58 |    | 69  | 70  | 68  |
| 21 | 21 | 32 | 40 |    | 48 | 49 | 60 | 61 | 59 | 72  | 73  | 71  |
| 22 | 22 | 33 | 42 | 41 | 50 | 51 | 63 | 64 | 62 | 76  | 75  | 77  |
| 23 | 23 | 35 | 44 | 43 | 53 | 52 | 66 | 67 | 65 | 79  | 80  | 78  |
| 24 | 24 | 36 | 46 | 45 | 55 | 54 | 69 | 68 | 70 | 83  | 82  | 84  |
| 25 | 25 | 38 | 48 | 47 | 57 | 58 | 72 | 71 | 73 | 86  | 87  | 85  |
| 26 | 26 | 39 | 49 | 50 | 60 | 59 | 75 | 74 | 76 | 90  | 89  | 91  |
| 27 | 27 | 41 | 51 | 52 | 62 | 61 | 78 | 77 |    | 93  | 94  | 92  |
| 28 | 28 | 42 | 53 | 54 | 64 | 65 | 80 | 81 |    | 97  | 96  | 98  |
| 29 | 29 | 44 | 55 | 56 | 66 | 67 | 83 | 84 | 82 | 100 | 101 | 99  |
| 30 | 30 | 45 | 57 | 58 | 69 | 68 | 86 | 87 | 85 | 104 | 103 | 105 |

TABLE 2

| Group index based on 3RBs | 10RB | | | | 12RB | | | | | 15RB | | | | | |
|---|---|---|---|---|---|---|---|---|---|---|---|---|---|---|---|
| 1  | 4   | 3   | 5   | 2   | 4   | 5   | 3   | 6   | 2   | 6   | 5   | 7   | 4   | 8   | 3   |
| 2  | 7   | 8   | 6   |     | 9   | 8   | 10  | 7   |     | 12  | 11  | 13  | 10  | 14  | 9   |
| 3  | 11  | 10  | 12  |     | 13  | 14  | 12  | 15  |     | 17  | 18  | 16  | 19  | 15  | 20  |
| 4  | 15  | 14  | 16  | 13  | 18  | 17  | 19  | 16  |     | 23  | 24  | 22  | 25  | 21  |     |
| 5  | 18  | 19  | 17  |     | 22  | 23  | 21  | 24  |     | 29  | 28  | 30  | 27  | 31  |     |
| 6  | 22  | 21  | 23  |     | 27  | 26  | 28  | 25  |     | 35  | 34  | 36  | 33  | 37  | 32  |
| 7  | 26  | 25  | 27  | 24  | 31  | 32  | 30  | 33  |     | 40  | 41  | 39  | 42  | 38  | 43  |
| 8  | 29  | 30  | 28  |     | 36  | 35  | 37  | 34  |     | 46  | 47  | 45  | 48  | 44  |     |
| 9  | 33  | 32  | 34  |     | 40  | 41  | 39  | 42  |     | 52  | 51  | 53  | 50  | 54  |     |
| 10 | 36  | 37  | 35  | 38  | 45  | 44  | 46  | 43  |     | 58  | 57  | 59  | 56  | 60  | 55  |
| 11 | 40  | 41  | 39  |     | 49  | 50  | 48  | 51  |     | 64  | 63  | 65  | 62  | 66  | 61  |
| 12 | 44  | 43  | 45  |     | 54  | 53  | 55  | 52  |     | 69  | 70  | 68  | 71  | 67  | 72  |
| 13 | 47  | 48  | 46  | 49  | 58  | 59  | 57  | 60  |     | 75  | 76  | 74  | 77  | 73  |     |
| 14 | 51  | 52  | 50  |     | 63  | 62  | 64  | 61  |     | 81  | 80  | 82  | 79  | 83  |     |
| 15 | 55  | 54  | 56  |     | 67  | 68  | 66  | 69  |     | 87  | 86  | 88  | 85  | 89  | 84  |
| 16 | 58  | 59  | 57  |     | 72  | 71  | 73  | 70  |     | 92  | 93  | 91  | 94  | 90  | 95  |
| 17 | 62  | 61  | 63  |     | 76  | 77  | 75  | 78  |     | 98  | 99  | 97  | 100 | 96  |     |
| 18 | 66  | 65  | 67  | 64  | 81  | 80  | 82  | 79  |     | 104 | 103 | 105 | 102 | 106 |     |
| 19 | 69  | 70  | 68  |     | 85  | 86  | 84  | 87  |     | 110 | 109 | 111 | 108 | 112 | 107 |
| 20 | 73  | 72  | 74  |     | 90  | 89  | 91  | 88  |     | 115 | 116 | 114 | 117 | 113 | 118 |
| 21 | 77  | 76  | 78  | 75  | 94  | 95  | 93  | 96  |     | 121 | 122 | 120 | 123 | 119 | 124 |
| 22 | 80  | 81  | 79  |     | 99  | 98  | 100 | 97  |     | 127 | 128 | 126 | 129 | 125 |     |
| 23 | 84  | 83  | 85  |     | 103 | 104 | 102 | 105 |     | 133 | 132 | 134 | 131 | 135 |     |
| 24 | 87  | 88  | 86  | 89  | 108 | 107 | 109 | 106 |     | 139 | 138 | 140 | 137 | 141 | 136 |
| 25 | 91  | 92  | 90  |     | 112 | 113 | 111 | 114 |     | 144 | 145 | 143 | 146 | 142 | 147 |
| 26 | 95  | 94  | 96  |     | 117 | 116 | 118 | 115 |     | 150 | 151 | 149 | 152 | 148 |     |
| 27 | 98  | 99  | 97  | 100 | 121 | 122 | 120 | 123 |     | 156 | 155 | 157 | 154 | 158 |     |
| 28 | 102 | 103 | 101 |     | 126 | 125 | 127 | 124 |     | 162 | 161 | 163 | 160 | 164 | 159 |
| 29 | 106 | 105 | 107 |     | 130 | 131 | 129 | 132 |     | 167 | 168 | 166 | 169 | 165 | 170 |
| 30 | 109 | 110 | 108 | 111 | 135 | 134 | 136 | 133 | 137 | 173 | 174 | 172 | 175 | 171 | 176 |

TABLE 3

| Group index based on 3RBs | 16RB | | | | | | 18RB | | | | | |
|---|---|---|---|---|---|---|---|---|---|---|---|---|
| 1 | 6 | 7 | 5 | 8 | 4 | 9 | 7 | 6 | 8 | 5 | 9 | 4 | 10 |
| 2 | 12 | 13 | 11 | 14 | 10 | 15 | 14 | 13 | 15 | 12 | 16 | 11 | 17 |
| 3 | 18 | 19 | 17 | 20 | 16 | 21 | 20 | 21 | 19 | 22 | 18 | 23 | 17 |
| 4 | 25 | 24 | 26 | 23 | 27 | 22 | 27 | 28 | 26 | 29 | 25 | 30 | 24 |
| 5 | 31 | 30 | 32 | 29 | 33 | 28 | 34 | 35 | 33 | 36 | 32 | 37 | 31 |
| 6 | 37 | 36 | 38 | 35 | 39 | 34 | 41 | 40 | 42 | 39 | 43 | 38 | 44 |
| 7 | 43 | 44 | 42 | 45 | 41 | 46 | 48 | 47 | 49 | 46 | 50 | 45 | 51 |
| 8 | 49 | 50 | 48 | 51 | 47 | 52 | 54 | 55 | 53 | 56 | 52 | 57 | 51 |
| 9 | 55 | 56 | 54 | 57 | 53 | 58 | 61 | 62 | 60 | 63 | 59 | 64 | 58 |
| 10 | 62 | 61 | 63 | 60 | 64 | 59 | 68 | 69 | 67 | 70 | 66 | 71 | 65 |
| 11 | 68 | 67 | 69 | 66 | 70 | 65 | 75 | 74 | 76 | 73 | 77 | 72 | 78 |
| 12 | 74 | 73 | 75 | 72 | 76 | 71 | 82 | 81 | 83 | 80 | 84 | 79 | 85 |
| 13 | 80 | 81 | 79 | 82 | 78 | 83 | 88 | 89 | 87 | 90 | 86 | 91 | 85 |
| 14 | 86 | 87 | 85 | 88 | 84 | 89 | 95 | 96 | 94 | 97 | 93 | 98 | 92 |
| 15 | 92 | 93 | 91 | 94 | 90 | 95 | 102 | 103 | 101 | 104 | 100 | 105 | 99 |
| 16 | 99 | 98 | 100 | 97 | 101 | 96 | 109 | 108 | 110 | 107 | 111 | 106 | 112 |
| 17 | 105 | 104 | 106 | 103 | 107 | 102 | 116 | 115 | 117 | 114 | 118 | 113 | 119 |
| 18 | 111 | 110 | 112 | 109 | 113 | 108 | 123 | 122 | 124 | 121 | 125 | 120 | 126 |
| 19 | 117 | 118 | 116 | 119 | 115 | 120 | 129 | 130 | 128 | 131 | 127 | 132 | 126 |
| 20 | 123 | 124 | 122 | 125 | 121 | 126 | 136 | 137 | 135 | 138 | 134 | 139 | 133 |
| 21 | 129 | 130 | 128 | 131 | 127 | 132 | 143 | 142 | 144 | 141 | 145 | 140 | 146 |
| 22 | 136 | 135 | 137 | 134 | 138 | 133 | 150 | 149 | 151 | 148 | 152 | 147 | 153 |
| 23 | 142 | 141 | 143 | 140 | 144 | 139 | 157 | 156 | 158 | 155 | 159 | 154 | 160 |
| 24 | 148 | 147 | 149 | 146 | 150 | 145 | 163 | 164 | 162 | 165 | 161 | 166 | 160 |
| 25 | 154 | 155 | 153 | 156 | 152 | 157 | 170 | 171 | 169 | 172 | 168 | 173 | 167 |
| 26 | 160 | 161 | 159 | 162 | 158 | 163 | 177 | 176 | 178 | 175 | 179 | 174 | 180 |
| 27 | 166 | 167 | 165 | 168 | 164 | 169 | 184 | 183 | 185 | 182 | 186 | 181 | 187 |
| 28 | 173 | 172 | 174 | 171 | 175 | 170 | 191 | 190 | 192 | 189 | 193 | 188 | 194 |
| 29 | 179 | 178 | 180 | 177 | 181 | 176 | 197 | 198 | 196 | 199 | 195 | 200 | 194 |
| 30 | 185 | 184 | 186 | 183 | 187 | 182 | 204 | 205 | 203 | 206 | 202 | 207 | 201 |

TABLE 4

| Group index based on 3RBs | 20RB | | | | | | | | 24RB | | | | | | | |
|---|---|---|---|---|---|---|---|---|---|---|---|---|---|---|---|---|
| 1 | 8 | 7 | 9 | 6 | 10 | 5 | 11 | 4 | 9 | 10 | 8 | 11 | 7 | 12 | 6 | 13 | 5 |
| 2 | 15 | 16 | 14 | 17 | 13 | 18 | 12 | 19 | 18 | 19 | 17 | 20 | 16 | 21 | 15 | 22 | 14 |
| 3 | 23 | 24 | 22 | 25 | 21 | 26 | 20 | | 27 | 28 | 26 | 29 | 25 | 30 | 24 | 31 | 23 |
| 4 | 31 | 30 | 32 | 29 | 33 | 28 | 34 | | 37 | 36 | 38 | 35 | 39 | 34 | 40 | 33 | 41 |
| 5 | 39 | 38 | 40 | 37 | 41 | 36 | 42 | 35 | 46 | 45 | 47 | 44 | 48 | 43 | 49 | 42 | 50 |
| 6 | 46 | 47 | 45 | 48 | 44 | 49 | 43 | | 55 | 54 | 56 | 53 | 57 | 52 | 58 | 51 | 59 |
| 7 | 54 | 53 | 55 | 52 | 56 | 51 | 57 | | 64 | 63 | 65 | 62 | 66 | 61 | 67 | 60 | 68 |
| 8 | 62 | 61 | 63 | 60 | 64 | 59 | 65 | 58 | 73 | 74 | 72 | 75 | 71 | 76 | 70 | 77 | 69 |
| 9 | 69 | 70 | 68 | 71 | 67 | 72 | 66 | 73 | 82 | 83 | 81 | 84 | 80 | 85 | 79 | 86 | 78 |
| 10 | 77 | 78 | 76 | 79 | 75 | 80 | 74 | | 91 | 92 | 90 | 93 | 89 | 94 | 88 | 95 | 87 |
| 11 | 85 | 84 | 86 | 83 | 87 | 82 | 88 | | 100 | 101 | 99 | 102 | 98 | 103 | 97 | 104 | 96 |
| 12 | 93 | 92 | 94 | 91 | 95 | 90 | 96 | 89 | 110 | 109 | 111 | 108 | 112 | 107 | 113 | 106 | 114 |
| 13 | 100 | 101 | 99 | 102 | 98 | 103 | 97 | | 119 | 118 | 120 | 117 | 121 | 116 | 122 | 115 | 123 |
| 14 | 108 | 107 | 109 | 106 | 110 | 105 | 111 | | 128 | 127 | 129 | 126 | 130 | 125 | 131 | 124 | 132 |
| 15 | 116 | 115 | 117 | 114 | 118 | 113 | 119 | 112 | 137 | 136 | 138 | 135 | 139 | 134 | 140 | 133 | 141 |
| 16 | 123 | 124 | 122 | 125 | 121 | 126 | 120 | 127 | 146 | 147 | 145 | 148 | 144 | 149 | 143 | 150 | 142 |
| 17 | 131 | 132 | 130 | 133 | 129 | 134 | 128 | | 155 | 156 | 154 | 157 | 153 | 158 | 152 | 159 | 151 |
| 18 | 139 | 138 | 140 | 137 | 141 | 136 | 142 | | 164 | 165 | 163 | 166 | 162 | 167 | 161 | 168 | 160 |
| 19 | 146 | 147 | 145 | 148 | 144 | 149 | 143 | 150 | 173 | 174 | 172 | 175 | 171 | 178 | 170 | 177 | 169 |
| 20 | 154 | 155 | 153 | 156 | 152 | 157 | 151 | | 183 | 182 | 184 | 181 | 185 | 180 | 186 | 179 | 187 |
| 21 | 162 | 161 | 163 | 160 | 164 | 159 | 165 | | 192 | 191 | 193 | 190 | 194 | 189 | 195 | 188 | 196 |
| 22 | 170 | 169 | 171 | 168 | 172 | 167 | 173 | 166 | 201 | 200 | 202 | 199 | 203 | 198 | 204 | 197 | 205 |
| 23 | 177 | 178 | 176 | 179 | 175 | 180 | 174 | 181 | 210 | 209 | 211 | 208 | 212 | 207 | 213 | 206 | 214 |
| 24 | 185 | 186 | 184 | 187 | 183 | 188 | 182 | | 219 | 220 | 218 | 221 | 217 | 222 | 216 | 223 | 215 |
| 25 | 193 | 192 | 194 | 191 | 195 | 190 | 196 | | 228 | 229 | 227 | 230 | 226 | 231 | 225 | 232 | 224 |
| 26 | 200 | 201 | 199 | 202 | 198 | 203 | 197 | 204 | 237 | 238 | 236 | 239 | 235 | 240 | 234 | 241 | 233 |
| 27 | 208 | 209 | 207 | 210 | 206 | 211 | 205 | | 246 | 247 | 245 | 248 | 244 | 249 | 243 | 250 | 242 |
| 28 | 216 | 215 | 217 | 214 | 218 | 213 | 219 | | 256 | 255 | 257 | 254 | 258 | 253 | 259 | 252 | 260 |
| 29 | 224 | 223 | 225 | 222 | 226 | 221 | 227 | 220 | 265 | 264 | 266 | 263 | 267 | 262 | 268 | 261 | 269 |
| 30 | 231 | 232 | 230 | 233 | 229 | 234 | 228 | 235 | 274 | 273 | 275 | 272 | 276 | 271 | 277 | 270 | 278 |

TABLE 5

| Group-index based on 3RBs | 25RBs | | | | | | | | |
|---|---|---|---|---|---|---|---|---|---|
| 1  | 9   | 10  | 8   | 11  | 7   | 12  | 6   | 13  | 5   |
| 2  | 19  | 18  | 20  | 17  | 21  | 16  | 22  | 15  | 23  |
| 3  | 28  | 29  | 27  | 30  | 26  | 31  | 25  | 32  | 24  |
| 4  | 38  | 37  | 39  | 36  | 40  | 35  | 41  | 34  | 42  |
| 5  | 47  | 48  | 46  | 49  | 45  | 50  | 44  | 51  | 43  |
| 6  | 57  | 56  | 58  | 55  | 59  | 54  | 60  | 53  | 61  |
| 7  | 66  | 67  | 65  | 68  | 64  | 69  | 63  | 70  | 62  |
| 8  | 76  | 75  | 77  | 74  | 78  | 73  | 79  | 72  | 80  |
| 9  | 85  | 86  | 84  | 87  | 83  | 88  | 82  | 89  | 81  |
| 10 | 95  | 94  | 96  | 93  | 97  | 92  | 98  | 91  | 99  |
| 11 | 104 | 103 | 105 | 102 | 106 | 101 | 107 | 100 | 108 |
| 12 | 113 | 114 | 112 | 115 | 111 | 116 | 110 | 117 | 109 |
| 13 | 123 | 122 | 124 | 121 | 125 | 120 | 126 | 119 | 127 |
| 14 | 132 | 133 | 131 | 134 | 130 | 135 | 129 | 136 | 128 |
| 15 | 142 | 141 | 143 | 140 | 144 | 139 | 145 | 138 | 146 |
| 16 | 151 | 152 | 150 | 153 | 149 | 154 | 148 | 155 | 147 |
| 17 | 161 | 160 | 162 | 159 | 163 | 158 | 164 | 157 | 165 |
| 18 | 170 | 171 | 169 | 172 | 168 | 173 | 167 | 174 | 166 |
| 19 | 180 | 179 | 181 | 178 | 182 | 177 | 183 | 176 | 184 |
| 20 | 189 | 190 | 188 | 191 | 187 | 192 | 186 | 193 | 185 |
| 21 | 198 | 199 | 197 | 200 | 196 | 201 | 195 | 202 | 194 |
| 22 | 208 | 207 | 209 | 206 | 210 | 205 | 211 | 204 | 212 |
| 23 | 217 | 218 | 216 | 219 | 215 | 220 | 214 | 221 | 213 |
| 24 | 227 | 226 | 228 | 225 | 229 | 224 | 230 | 223 | 231 |
| 25 | 236 | 237 | 235 | 238 | 234 | 239 | 233 | 240 | 232 |
| 26 | 246 | 245 | 247 | 244 | 248 | 243 | 249 | 242 | 250 |
| 27 | 255 | 256 | 254 | 257 | 253 | 258 | 252 | 259 | 251 |
| 28 | 265 | 264 | 266 | 263 | 267 | 262 | 268 | 261 | 269 |
| 29 | 274 | 275 | 273 | 276 | 272 | 277 | 271 | 278 | 270 |
| 30 | 284 | 283 | 285 | 282 | 286 | 281 | 287 | 280 | 288 |

In the tables 1~5, 1 RB and 2 RB length sequence are not shown because 1 RB and 2 RB length sequence are differently defined.

And, in another example, considering that the number of root indexes for 3 RB length sequence is 30, the number of root index selected for certain group can be determined as follows.

$$\text{floor(the number of root index for certain } RB \text{ length sequence}/30) \quad \text{[Equation 15]}$$

Here, floor (z) is a function of making the greatest integer not greater than z.

By the equation 15, for 3~5 RB lengths, 1 sequence can be selected. And, for 6~8 RB lengths, 2 sequence can be selected. Further, for the length greater than the 9 RB length, 3 or more sequence can be selected, respectively. And; according to one embodiment of this invention, sequence with the length less than 3 RB length can be differently defined, such as not using ZC sequence. By doing so, the number of sequences selected for 1 RB length and 2 RB length can be determined to 1.

To summarize, according to this embodiment, the number of sequence per groups can be defined as follows.

$$\{1RB, 2RB, 3RB, 4RB, 5RB, 6RB, 8RB, 9RB, 10RB, 12RB, 15RB, 16RB, 18RB, 20RB, 24RB, 25RB, \ldots\} = \{1, 1, 1, 1, 1, 2, 2, 3, 3, 4, 5, 6, 7, 7, 9, 9, \ldots\} \quad \text{[Equation 16]}$$

Based on this, the following tables 6-8 show an example of sequence grouping such that each group contains the number of sequences according to the equation 16, and the sequences selected per each group satisfy the high cross correlation relation as stated above.

TABLE 6

| Gr. Idx 3RBs | 3RB | 4RB | | 5RB | | 6RB | | 8RB | | 9RB | | | 10RB | | |
|---|---|---|---|---|---|---|---|---|---|---|---|---|---|---|---|
| 1  | 1  | 2  | 2  | 2  | 3  | 3  | 2  | 3  | 4  | 2  | 4  | 3  | 5  |
| 2  | 2  | 3  | 4  | 5  | 4  | 6  | 5  | 7  | 6  | 8  | 7  | 8  | 6  |
| 3  | 3  | 5  | 6  | 7  | 6  | 9  | 8  | 10 | 11 | 9  | 11 | 10 | 12 |
| 4  | 4  | 6  | 8  | 9  | 10 | 11 | 12 | 14 | 13 | 15 | 15 | 14 | 16 |
| 5  | 5  | 8  | 10 | 11 | 12 | 14 | 15 | 17 | 18 | 16 | 18 | 19 | 17 |
| 6  | 6  | 9  | 11 | 14 | 13 | 17 | 18 | 21 | 20 | 22 | 22 | 21 | 23 |
| 7  | 7  | 11 | 13 | 16 | 17 | 20 | 21 | 24 | 25 | 23 | 26 | 25 | 27 |
| 8  | 8  | 12 | 15 | 18 | 19 | 23 | 22 | 28 | 27 | 29 | 29 | 30 | 28 |
| 9  | 9  | 14 | 17 | 21 | 20 | 26 | 25 | 31 | 32 | 30 | 33 | 32 | 34 |
| 10 | 10 | 15 | 19 | 23 | 22 | 29 | 28 | 35 | 34 | 36 | 36 | 37 | 35 |
| 11 | 11 | 17 | 21 | 25 | 26 | 32 | 31 | 38 | 37 | 39 | 40 | 41 | 39 |
| 12 | 12 | 18 | 23 | 27 | 28 | 34 | 35 | 41 | 42 | 40 | 44 | 43 | 45 |
| 13 | 13 | 20 | 25 | 30 | 29 | 37 | 38 | 45 | 44 | 46 | 47 | 48 | 46 |
| 14 | 14 | 21 | 27 | 32 | 33 | 40 | 41 | 48 | 49 | 47 | 51 | 52 | 50 |
| 15 | 15 | 23 | 29 | 34 | 35 | 43 | 44 | 52 | 51 | 53 | 55 | 54 | 56 |
| 16 | 16 | 24 | 30 | 37 | 36 | 46 | 45 | 55 | 56 | 54 | 58 | 59 | 57 |
| 17 | 17 | 26 | 32 | 39 | 38 | 49 | 48 | 59 | 58 | 60 | 62 | 61 | 63 |
| 18 | 18 | 27 | 34 | 41 | 42 | 52 | 51 | 62 | 63 | 61 | 66 | 65 | 67 |
| 19 | 19 | 29 | 36 | 44 | 43 | 55 | 54 | 66 | 65 | 67 | 69 | 70 | 68 |
| 20 | 20 | 30 | 38 | 46 | 45 | 57 | 58 | 69 | 70 | 68 | 73 | 72 | 74 |
| 21 | 21 | 32 | 40 | 48 | 49 | 60 | 61 | 72 | 73 | 71 | 77 | 76 | 78 |
| 22 | 22 | 33 | 42 | 50 | 51 | 63 | 64 | 76 | 75 | 77 | 80 | 81 | 79 |
| 23 | 23 | 35 | 44 | 53 | 52 | 66 | 67 | 79 | 80 | 78 | 84 | 83 | 85 |
| 24 | 24 | 36 | 46 | 55 | 54 | 69 | 68 | 83 | 82 | 84 | 87 | 88 | 86 |
| 25 | 25 | 38 | 48 | 57 | 58 | 72 | 71 | 86 | 87 | 85 | 91 | 92 | 90 |
| 26 | 26 | 39 | 49 | 60 | 59 | 75 | 74 | 90 | 89 | 91 | 95 | 94 | 96 |
| 27 | 27 | 41 | 51 | 62 | 61 | 78 | 77 | 93 | 94 | 92 | 98 | 99 | 97 |
| 28 | 28 | 42 | 53 | 64 | 65 | 80 | 81 | 97 | 96 | 98 | 102 | 103 | 101 |
| 29 | 29 | 44 | 55 | 66 | 67 | 83 | 84 | 100 | 101 | 99 | 106 | 105 | 107 |
| 30 | 30 | 45 | 57 | 69 | 68 | 86 | 87 | 104 | 103 | 105 | 109 | 110 | 108 |

TABLE 6-continued

| Gr. Idx 3RBs | 12RB | | | | 15RB | | | |
|---|---|---|---|---|---|---|---|---|
| 1 | 4 | 5 | 3 | 6 | 6 | 5 | 7 | 4 | 8 |
| 2 | 9 | 8 | 10 | 7 | 12 | 11 | 13 | 10 | 14 |
| 3 | 13 | 14 | 12 | 15 | 17 | 18 | 16 | 19 | 15 |
| 4 | 18 | 17 | 19 | 16 | 23 | 24 | 22 | 25 | 21 |
| 5 | 22 | 23 | 21 | 24 | 29 | 28 | 30 | 27 | 31 |
| 6 | 27 | 26 | 28 | 25 | 35 | 34 | 36 | 33 | 37 |
| 7 | 31 | 32 | 30 | 33 | 40 | 41 | 39 | 42 | 38 |
| 8 | 36 | 35 | 37 | 34 | 46 | 47 | 45 | 48 | 44 |
| 9 | 40 | 41 | 39 | 42 | 52 | 51 | 53 | 50 | 54 |
| 10 | 45 | 44 | 46 | 43 | 58 | 57 | 59 | 56 | 60 |
| 11 | 49 | 50 | 48 | 51 | 64 | 63 | 65 | 62 | 66 |
| 12 | 54 | 53 | 55 | 52 | 69 | 70 | 68 | 71 | 67 |
| 13 | 58 | 59 | 57 | 60 | 75 | 76 | 74 | 77 | 73 |
| 14 | 63 | 62 | 64 | 61 | 81 | 80 | 82 | 79 | 83 |
| 15 | 67 | 68 | 66 | 69 | 87 | 86 | 88 | 85 | 89 |
| 16 | 72 | 71 | 73 | 70 | 92 | 93 | 91 | 94 | 90 |
| 17 | 76 | 77 | 75 | 78 | 98 | 99 | 97 | 100 | 96 |
| 18 | 81 | 80 | 82 | 79 | 104 | 103 | 105 | 102 | 106 |
| 19 | 85 | 86 | 84 | 87 | 110 | 109 | 111 | 108 | 112 |
| 20 | 90 | 89 | 91 | 88 | 115 | 116 | 114 | 117 | 113 |
| 21 | 94 | 95 | 93 | 96 | 121 | 122 | 120 | 123 | 119 |
| 22 | 99 | 98 | 100 | 97 | 127 | 128 | 126 | 129 | 125 |
| 23 | 103 | 104 | 102 | 105 | 133 | 132 | 134 | 131 | 135 |
| 24 | 108 | 107 | 109 | 106 | 139 | 138 | 140 | 137 | 141 |
| 25 | 112 | 113 | 111 | 114 | 144 | 145 | 143 | 146 | 142 |
| 26 | 117 | 116 | 118 | 115 | 150 | 151 | 149 | 152 | 148 |
| 27 | 121 | 122 | 120 | 123 | 156 | 155 | 157 | 154 | 158 |
| 28 | 126 | 125 | 127 | 124 | 162 | 161 | 163 | 160 | 164 |
| 29 | 130 | 131 | 129 | 132 | 167 | 168 | 166 | 169 | 165 |
| 30 | 135 | 134 | 136 | 133 | 173 | 174 | 172 | 175 | 171 |

TABLE 7

| Gr. Idx 3RBs | 16RB | | | | | | 18RB | | | | | | 20RB | | | | | |
|---|---|---|---|---|---|---|---|---|---|---|---|---|---|---|---|---|---|---|
| 1 | 6 | 7 | 5 | 8 | 4 | 9 | 7 | 6 | 8 | 5 | 9 | 4 | 10 | 8 | 7 | 9 | 6 | 10 | 5 | 11 |
| 2 | 12 | 13 | 11 | 14 | 10 | 15 | 14 | 13 | 15 | 12 | 16 | 11 | 17 | 15 | 16 | 14 | 17 | 13 | 18 | 12 |
| 3 | 18 | 19 | 17 | 20 | 16 | 21 | 20 | 21 | 19 | 22 | 18 | 23 | 17 | 23 | 24 | 22 | 25 | 21 | 26 | 20 |
| 4 | 25 | 24 | 26 | 23 | 27 | 22 | 27 | 28 | 26 | 29 | 25 | 30 | 24 | 31 | 30 | 32 | 29 | 33 | 28 | 34 |
| 5 | 31 | 30 | 32 | 29 | 33 | 28 | 34 | 35 | 33 | 36 | 32 | 37 | 31 | 39 | 38 | 40 | 37 | 41 | 36 | 42 |
| 6 | 37 | 36 | 38 | 35 | 39 | 34 | 41 | 40 | 42 | 39 | 43 | 38 | 44 | 46 | 47 | 45 | 48 | 44 | 49 | 43 |
| 7 | 43 | 44 | 42 | 45 | 41 | 46 | 48 | 47 | 49 | 46 | 50 | 45 | 51 | 54 | 53 | 55 | 52 | 56 | 51 | 57 |
| 8 | 49 | 50 | 48 | 51 | 47 | 52 | 54 | 55 | 53 | 56 | 52 | 57 | 51 | 62 | 61 | 63 | 60 | 64 | 59 | 65 |
| 9 | 55 | 56 | 54 | 57 | 53 | 58 | 61 | 62 | 60 | 63 | 59 | 64 | 58 | 69 | 70 | 68 | 71 | 67 | 72 | 66 |
| 10 | 62 | 61 | 63 | 60 | 64 | 59 | 68 | 69 | 67 | 70 | 66 | 71 | 65 | 77 | 78 | 76 | 79 | 75 | 80 | 74 |
| 11 | 68 | 67 | 69 | 66 | 70 | 65 | 75 | 74 | 76 | 73 | 77 | 72 | 78 | 85 | 84 | 86 | 83 | 87 | 82 | 88 |
| 12 | 74 | 73 | 75 | 72 | 76 | 71 | 82 | 81 | 83 | 80 | 84 | 79 | 85 | 93 | 92 | 94 | 91 | 95 | 90 | 96 |
| 13 | 80 | 81 | 79 | 82 | 78 | 83 | 88 | 89 | 87 | 90 | 86 | 91 | 85 | 100 | 101 | 99 | 102 | 98 | 103 | 97 |
| 14 | 86 | 87 | 85 | 88 | 84 | 89 | 95 | 96 | 94 | 97 | 93 | 98 | 92 | 108 | 107 | 109 | 106 | 110 | 105 | 111 |
| 15 | 92 | 93 | 91 | 94 | 90 | 95 | 102 | 103 | 101 | 104 | 100 | 105 | 99 | 116 | 115 | 117 | 114 | 118 | 113 | 119 |
| 16 | 99 | 98 | 100 | 97 | 101 | 96 | 109 | 108 | 110 | 107 | 111 | 106 | 112 | 123 | 124 | 122 | 125 | 121 | 126 | 120 |
| 17 | 105 | 104 | 106 | 103 | 107 | 102 | 116 | 115 | 117 | 114 | 118 | 113 | 119 | 131 | 132 | 130 | 133 | 129 | 134 | 128 |
| 18 | 111 | 110 | 112 | 109 | 113 | 108 | 123 | 122 | 124 | 121 | 125 | 120 | 126 | 139 | 138 | 140 | 137 | 141 | 136 | 142 |
| 19 | 117 | 118 | 116 | 119 | 115 | 120 | 129 | 130 | 128 | 131 | 127 | 132 | 126 | 146 | 147 | 145 | 148 | 144 | 149 | 143 |
| 20 | 123 | 124 | 122 | 125 | 121 | 126 | 136 | 137 | 135 | 138 | 134 | 139 | 133 | 154 | 155 | 153 | 156 | 152 | 157 | 151 |
| 21 | 129 | 130 | 128 | 131 | 127 | 132 | 143 | 142 | 144 | 141 | 145 | 140 | 146 | 162 | 161 | 163 | 160 | 164 | 159 | 165 |
| 22 | 136 | 135 | 137 | 134 | 138 | 133 | 150 | 149 | 151 | 148 | 152 | 147 | 153 | 170 | 169 | 171 | 168 | 172 | 167 | 173 |
| 23 | 142 | 141 | 143 | 140 | 144 | 139 | 157 | 156 | 158 | 155 | 159 | 154 | 160 | 177 | 178 | 176 | 179 | 175 | 180 | 174 |
| 24 | 148 | 147 | 149 | 146 | 150 | 145 | 163 | 164 | 162 | 165 | 161 | 166 | 160 | 185 | 186 | 184 | 187 | 183 | 188 | 182 |
| 25 | 154 | 155 | 153 | 156 | 152 | 157 | 170 | 171 | 169 | 172 | 168 | 173 | 167 | 193 | 192 | 194 | 191 | 195 | 190 | 196 |
| 26 | 160 | 161 | 159 | 162 | 158 | 163 | 177 | 176 | 178 | 175 | 179 | 174 | 180 | 200 | 201 | 199 | 202 | 198 | 203 | 197 |
| 27 | 166 | 167 | 165 | 168 | 164 | 169 | 184 | 183 | 185 | 182 | 186 | 181 | 187 | 208 | 209 | 207 | 210 | 206 | 211 | 205 |
| 28 | 173 | 172 | 174 | 171 | 175 | 170 | 191 | 190 | 192 | 189 | 193 | 188 | 194 | 216 | 215 | 217 | 214 | 218 | 213 | 219 |
| 29 | 179 | 178 | 180 | 177 | 181 | 176 | 197 | 198 | 196 | 199 | 195 | 200 | 194 | 224 | 223 | 225 | 222 | 226 | 221 | 227 |
| 30 | 185 | 184 | 186 | 183 | 187 | 182 | 204 | 205 | 203 | 206 | 202 | 207 | 201 | 231 | 232 | 230 | 233 | 229 | 234 | 228 |

TABLE 8

| Gr. Idx 3 RBs | 24 RB | | | | | | | | | | | | 25 RBs | | | | | |
|---|---|---|---|---|---|---|---|---|---|---|---|---|---|---|---|---|---|---|
| 1  | 9   | 10  | 8   | 11  | 7   | 12  | 6   | 13  | 5   | 9   | 10  | 8   | 11  | 7   | 12  | 6   | 13  | 5   |
| 2  | 18  | 19  | 17  | 20  | 16  | 21  | 15  | 22  | 14  | 19  | 18  | 20  | 17  | 21  | 16  | 22  | 15  | 23  |
| 3  | 27  | 28  | 26  | 29  | 25  | 30  | 24  | 31  | 23  | 28  | 29  | 27  | 30  | 26  | 31  | 25  | 32  | 24  |
| 4  | 37  | 36  | 38  | 35  | 39  | 34  | 40  | 33  | 41  | 38  | 37  | 39  | 36  | 40  | 35  | 41  | 34  | 42  |
| 5  | 46  | 45  | 47  | 44  | 48  | 43  | 49  | 42  | 50  | 47  | 48  | 46  | 49  | 45  | 50  | 44  | 51  | 43  |
| 6  | 55  | 54  | 56  | 53  | 57  | 52  | 58  | 51  | 59  | 57  | 56  | 58  | 55  | 59  | 54  | 60  | 53  | 61  |
| 7  | 64  | 63  | 65  | 62  | 66  | 61  | 67  | 60  | 68  | 66  | 67  | 65  | 68  | 64  | 69  | 63  | 70  | 62  |
| 8  | 73  | 74  | 72  | 75  | 71  | 76  | 70  | 77  | 69  | 76  | 75  | 77  | 74  | 78  | 73  | 79  | 72  | 80  |
| 9  | 82  | 83  | 81  | 84  | 80  | 85  | 79  | 86  | 78  | 85  | 86  | 84  | 87  | 83  | 88  | 82  | 89  | 81  |
| 10 | 91  | 92  | 90  | 93  | 89  | 94  | 88  | 95  | 87  | 95  | 94  | 96  | 93  | 97  | 92  | 98  | 91  | 99  |
| 11 | 100 | 101 | 99  | 102 | 98  | 103 | 97  | 104 | 96  | 104 | 103 | 105 | 102 | 106 | 101 | 107 | 100 | 108 |
| 12 | 110 | 109 | 111 | 108 | 112 | 107 | 113 | 106 | 114 | 113 | 114 | 112 | 115 | 111 | 116 | 110 | 117 | 109 |
| 13 | 119 | 118 | 120 | 117 | 121 | 116 | 122 | 115 | 123 | 123 | 122 | 124 | 121 | 125 | 120 | 126 | 119 | 127 |
| 14 | 128 | 127 | 129 | 126 | 130 | 125 | 131 | 124 | 132 | 132 | 133 | 131 | 134 | 130 | 135 | 129 | 136 | 128 |
| 15 | 137 | 136 | 138 | 135 | 139 | 134 | 140 | 133 | 141 | 142 | 141 | 143 | 140 | 144 | 139 | 145 | 138 | 146 |
| 16 | 146 | 147 | 145 | 148 | 144 | 149 | 143 | 150 | 142 | 151 | 152 | 150 | 153 | 149 | 154 | 148 | 155 | 147 |
| 17 | 155 | 156 | 154 | 157 | 153 | 158 | 152 | 159 | 151 | 161 | 160 | 162 | 159 | 163 | 158 | 164 | 157 | 165 |
| 18 | 164 | 165 | 163 | 166 | 162 | 167 | 161 | 168 | 160 | 170 | 171 | 169 | 172 | 168 | 173 | 167 | 174 | 166 |
| 19 | 173 | 174 | 172 | 175 | 171 | 176 | 170 | 177 | 169 | 180 | 179 | 181 | 178 | 182 | 177 | 183 | 176 | 184 |
| 20 | 183 | 182 | 184 | 181 | 185 | 180 | 186 | 179 | 187 | 189 | 190 | 188 | 191 | 187 | 192 | 186 | 193 | 185 |
| 21 | 192 | 191 | 193 | 190 | 194 | 189 | 195 | 188 | 196 | 198 | 199 | 197 | 200 | 196 | 201 | 195 | 202 | 194 |
| 22 | 201 | 200 | 202 | 199 | 203 | 198 | 204 | 197 | 205 | 208 | 207 | 209 | 206 | 210 | 205 | 211 | 204 | 212 |
| 23 | 210 | 209 | 211 | 208 | 212 | 207 | 213 | 206 | 214 | 217 | 218 | 216 | 219 | 215 | 220 | 214 | 221 | 213 |
| 24 | 219 | 220 | 218 | 221 | 217 | 222 | 216 | 223 | 215 | 227 | 226 | 228 | 225 | 229 | 224 | 230 | 223 | 231 |
| 25 | 228 | 229 | 227 | 230 | 226 | 231 | 225 | 232 | 224 | 236 | 237 | 235 | 238 | 234 | 239 | 233 | 240 | 232 |
| 26 | 237 | 238 | 236 | 239 | 235 | 240 | 234 | 241 | 233 | 246 | 245 | 247 | 244 | 248 | 243 | 249 | 242 | 250 |
| 27 | 246 | 247 | 245 | 248 | 244 | 249 | 243 | 250 | 242 | 255 | 256 | 254 | 257 | 253 | 258 | 252 | 259 | 251 |
| 28 | 256 | 255 | 257 | 254 | 258 | 253 | 259 | 252 | 260 | 265 | 264 | 266 | 263 | 267 | 262 | 268 | 261 | 269 |
| 29 | 265 | 264 | 266 | 263 | 267 | 262 | 268 | 261 | 269 | 274 | 275 | 273 | 276 | 272 | 277 | 271 | 278 | 270 |
| 30 | 274 | 273 | 275 | 272 | 276 | 271 | 277 | 270 | 278 | 284 | 283 | 285 | 282 | 286 | 281 | 287 | 280 | 288 |

As like the tables 1~5, in the tables 6~8, 1 RB and 2 RB length sequence are not shown because 1 RB and 2 RB length sequence are differently defined.

In another embodiment of this invention, the maximum number of sequences per each group can be predetermined for various reasons. The following tables 9 and 10 show the example of the case when the maximum number of sequences per group is limited to 5 sequences.

TABLE 9

| Gr. Idx 3RBs | 3RB | 4RB | 5RB | 6RB | | 8RB | | 9RB | | 10RB | | |
|---|---|---|---|---|---|---|---|---|---|---|---|---|
| 1  | 1  | 2  | 2  | 2  | 3  | 3  | 2  | 3  | 4  | 2  | 4  | 3  | 5  |
| 2  | 2  | 3  | 4  | 5  | 4  | 6  | 5  | 7  | 6  | 8  | 7  | 8  | 6  |
| 3  | 3  | 5  | 6  | 7  | 6  | 9  | 8  | 10 | 11 | 9  | 11 | 10 | 12 |
| 4  | 4  | 6  | 8  | 9  | 10 | 11 | 12 | 14 | 13 | 15 | 15 | 14 | 16 |
| 5  | 5  | 8  | 10 | 11 | 12 | 14 | 15 | 17 | 18 | 16 | 18 | 19 | 17 |
| 6  | 6  | 9  | 11 | 14 | 13 | 17 | 18 | 21 | 20 | 22 | 22 | 21 | 23 |
| 7  | 7  | 11 | 13 | 16 | 17 | 20 | 21 | 24 | 25 | 23 | 26 | 25 | 27 |
| 8  | 8  | 12 | 15 | 18 | 19 | 23 | 22 | 28 | 27 | 29 | 29 | 30 | 28 |
| 9  | 9  | 14 | 17 | 21 | 20 | 26 | 25 | 31 | 32 | 30 | 33 | 32 | 34 |
| 10 | 10 | 15 | 19 | 23 | 22 | 29 | 28 | 35 | 34 | 36 | 36 | 37 | 35 |
| 11 | 11 | 17 | 21 | 25 | 26 | 32 | 31 | 38 | 37 | 39 | 40 | 41 | 39 |
| 12 | 12 | 18 | 23 | 27 | 28 | 34 | 35 | 41 | 42 | 40 | 44 | 43 | 45 |
| 13 | 13 | 20 | 25 | 30 | 29 | 37 | 38 | 45 | 44 | 46 | 47 | 48 | 46 |
| 14 | 14 | 21 | 27 | 32 | 33 | 40 | 41 | 48 | 49 | 47 | 51 | 52 | 50 |
| 15 | 15 | 23 | 29 | 34 | 35 | 43 | 44 | 52 | 51 | 53 | 55 | 54 | 56 |
| 16 | 16 | 24 | 30 | 37 | 36 | 46 | 45 | 55 | 56 | 54 | 58 | 59 | 57 |
| 17 | 17 | 26 | 32 | 39 | 38 | 49 | 48 | 59 | 58 | 60 | 62 | 61 | 63 |
| 18 | 18 | 27 | 34 | 41 | 42 | 52 | 51 | 62 | 63 | 61 | 66 | 65 | 67 |
| 19 | 19 | 29 | 36 | 44 | 43 | 55 | 54 | 66 | 65 | 67 | 69 | 70 | 68 |
| 20 | 20 | 30 | 38 | 46 | 45 | 57 | 58 | 69 | 70 | 68 | 73 | 72 | 74 |
| 21 | 21 | 32 | 40 | 48 | 49 | 60 | 61 | 72 | 73 | 71 | 77 | 76 | 78 |
| 22 | 22 | 33 | 42 | 50 | 51 | 63 | 64 | 76 | 75 | 77 | 80 | 81 | 79 |
| 23 | 23 | 35 | 44 | 53 | 52 | 66 | 67 | 79 | 80 | 78 | 84 | 83 | 85 |
| 24 | 24 | 36 | 46 | 55 | 54 | 69 | 68 | 83 | 82 | 84 | 87 | 88 | 86 |
| 25 | 25 | 38 | 48 | 57 | 58 | 72 | 71 | 86 | 87 | 85 | 91 | 92 | 90 |
| 26 | 26 | 39 | 49 | 60 | 59 | 75 | 74 | 90 | 89 | 91 | 95 | 94 | 96 |
| 27 | 27 | 41 | 51 | 62 | 61 | 78 | 77 | 93 | 94 | 92 | 98 | 99 | 97 |
| 28 | 28 | 42 | 53 | 64 | 65 | 80 | 81 | 97 | 96 | 98 | 102 | 103 | 101 |

TABLE 9-continued

| | | | | | | | | | | | | | |
|---|---|---|---|---|---|---|---|---|---|---|---|---|---|
| 29 | 29 | 44 | 55 | 66 | 67 | 83 | 84 | 100 | 101 | 99 | 106 | 105 | 107 |
| 30 | 30 | 45 | 57 | 69 | 68 | 86 | 87 | 104 | 103 | 105 | 109 | 110 | 108 |

| Gr. Idx 3RBs | 12RB | | | | | 15RB | | | |
|---|---|---|---|---|---|---|---|---|---|
| 1 | 4 | 5 | 3 | 6 | 6 | 5 | 7 | 4 | 8 |
| 2 | 9 | 8 | 10 | 7 | 12 | 11 | 13 | 10 | 14 |
| 3 | 13 | 14 | 12 | 15 | 17 | 18 | 16 | 19 | 15 |
| 4 | 18 | 17 | 19 | 16 | 23 | 24 | 22 | 25 | 21 |
| 5 | 22 | 23 | 21 | 24 | 29 | 28 | 30 | 27 | 31 |
| 6 | 27 | 26 | 28 | 25 | 35 | 34 | 36 | 33 | 37 |
| 7 | 31 | 32 | 30 | 33 | 40 | 41 | 39 | 42 | 38 |
| 8 | 36 | 35 | 37 | 34 | 46 | 47 | 45 | 48 | 44 |
| 9 | 40 | 41 | 39 | 42 | 52 | 51 | 53 | 50 | 54 |
| 10 | 45 | 44 | 46 | 43 | 58 | 57 | 59 | 56 | 60 |
| 11 | 49 | 50 | 48 | 51 | 64 | 63 | 65 | 62 | 66 |
| 12 | 54 | 53 | 55 | 52 | 69 | 70 | 68 | 71 | 67 |
| 13 | 58 | 59 | 57 | 60 | 75 | 76 | 74 | 77 | 73 |
| 14 | 63 | 62 | 64 | 61 | 81 | 80 | 82 | 79 | 83 |
| 15 | 67 | 68 | 66 | 69 | 87 | 86 | 88 | 85 | 89 |
| 16 | 72 | 71 | 73 | 70 | 92 | 93 | 91 | 94 | 90 |
| 17 | 76 | 77 | 75 | 78 | 98 | 99 | 97 | 100 | 96 |
| 18 | 81 | 80 | 82 | 79 | 104 | 103 | 105 | 102 | 106 |
| 19 | 85 | 86 | 84 | 87 | 110 | 109 | 111 | 108 | 112 |
| 20 | 90 | 89 | 91 | 88 | 115 | 116 | 114 | 117 | 113 |
| 21 | 94 | 95 | 93 | 96 | 121 | 122 | 120 | 123 | 119 |
| 22 | 99 | 98 | 100 | 97 | 127 | 128 | 126 | 129 | 125 |
| 23 | 103 | 104 | 102 | 105 | 133 | 132 | 134 | 131 | 135 |
| 24 | 108 | 107 | 109 | 106 | 139 | 138 | 140 | 137 | 141 |
| 25 | 112 | 113 | 111 | 114 | 144 | 145 | 143 | 146 | 142 |
| 26 | 117 | 116 | 118 | 115 | 150 | 151 | 149 | 152 | 148 |
| 27 | 121 | 122 | 120 | 123 | 156 | 155 | 157 | 154 | 158 |
| 28 | 126 | 125 | 127 | 124 | 162 | 161 | 163 | 160 | 164 |
| 29 | 130 | 131 | 129 | 132 | 167 | 168 | 166 | 169 | 165 |
| 30 | 135 | 134 | 136 | 133 | 173 | 174 | 172 | 175 | 171 |

TABLE 10

| Group index based on 3RBs | 16RB | | | | | 18RB | | | | | 20RB | | | | |
|---|---|---|---|---|---|---|---|---|---|---|---|---|---|---|---|
| 1 | 6 | 7 | 5 | 8 | 4 | 7 | 6 | 8 | 5 | 9 | 8 | 7 | 9 | 6 | 10 |
| 2 | 12 | 13 | 11 | 14 | 10 | 14 | 13 | 15 | 12 | 16 | 15 | 16 | 14 | 17 | 13 |
| 3 | 18 | 19 | 17 | 20 | 16 | 20 | 21 | 19 | 22 | 18 | 23 | 24 | 22 | 25 | 21 |
| 4 | 25 | 24 | 26 | 23 | 27 | 27 | 28 | 26 | 29 | 25 | 31 | 30 | 32 | 29 | 33 |
| 5 | 31 | 30 | 32 | 29 | 33 | 34 | 35 | 33 | 36 | 32 | 39 | 38 | 40 | 37 | 41 |
| 6 | 37 | 36 | 38 | 35 | 39 | 41 | 40 | 42 | 39 | 43 | 46 | 47 | 45 | 48 | 44 |
| 7 | 43 | 44 | 42 | 45 | 41 | 48 | 47 | 49 | 46 | 50 | 54 | 53 | 55 | 52 | 56 |
| 8 | 49 | 50 | 48 | 51 | 47 | 54 | 55 | 53 | 56 | 52 | 62 | 61 | 63 | 60 | 64 |
| 9 | 55 | 56 | 54 | 57 | 53 | 61 | 62 | 60 | 63 | 59 | 69 | 70 | 68 | 71 | 67 |
| 10 | 62 | 61 | 63 | 60 | 64 | 68 | 69 | 67 | 70 | 66 | 77 | 78 | 76 | 79 | 75 |
| 11 | 68 | 67 | 69 | 66 | 70 | 75 | 74 | 76 | 73 | 77 | 85 | 84 | 86 | 83 | 87 |
| 12 | 74 | 73 | 75 | 72 | 76 | 82 | 81 | 83 | 80 | 84 | 93 | 92 | 94 | 91 | 95 |
| 13 | 80 | 81 | 79 | 82 | 78 | 88 | 89 | 87 | 90 | 86 | 100 | 101 | 99 | 102 | 98 |
| 14 | 86 | 87 | 85 | 88 | 84 | 95 | 96 | 94 | 97 | 93 | 108 | 107 | 109 | 106 | 110 |
| 15 | 92 | 93 | 91 | 94 | 90 | 102 | 103 | 101 | 104 | 100 | 116 | 115 | 117 | 114 | 118 |
| 16 | 99 | 98 | 100 | 97 | 101 | 109 | 108 | 110 | 107 | 111 | 123 | 124 | 122 | 125 | 121 |
| 17 | 105 | 104 | 106 | 103 | 107 | 116 | 115 | 117 | 114 | 118 | 131 | 132 | 130 | 133 | 129 |
| 18 | 111 | 110 | 112 | 109 | 113 | 123 | 122 | 124 | 121 | 125 | 139 | 138 | 140 | 137 | 141 |
| 19 | 117 | 118 | 116 | 119 | 115 | 129 | 130 | 128 | 131 | 127 | 146 | 147 | 145 | 148 | 144 |
| 20 | 123 | 124 | 122 | 125 | 121 | 136 | 137 | 135 | 138 | 134 | 154 | 155 | 153 | 156 | 152 |
| 21 | 129 | 130 | 128 | 131 | 127 | 143 | 142 | 144 | 141 | 145 | 162 | 161 | 163 | 160 | 164 |
| 22 | 136 | 135 | 137 | 134 | 138 | 150 | 149 | 151 | 148 | 152 | 170 | 169 | 171 | 168 | 172 |
| 23 | 142 | 141 | 143 | 140 | 144 | 157 | 156 | 158 | 155 | 159 | 177 | 178 | 176 | 179 | 175 |
| 24 | 148 | 147 | 149 | 146 | 150 | 163 | 164 | 162 | 165 | 161 | 185 | 186 | 184 | 187 | 183 |
| 25 | 154 | 155 | 153 | 156 | 152 | 170 | 171 | 169 | 172 | 168 | 193 | 192 | 194 | 191 | 195 |
| 26 | 160 | 161 | 159 | 162 | 158 | 177 | 176 | 178 | 175 | 179 | 200 | 201 | 199 | 202 | 198 |
| 27 | 166 | 167 | 165 | 168 | 164 | 184 | 183 | 185 | 182 | 186 | 208 | 209 | 207 | 210 | 206 |
| 28 | 173 | 172 | 174 | 171 | 175 | 191 | 190 | 192 | 189 | 193 | 216 | 215 | 217 | 214 | 218 |
| 29 | 179 | 178 | 180 | 177 | 181 | 197 | 198 | 196 | 199 | 195 | 224 | 223 | 225 | 222 | 226 |
| 30 | 185 | 184 | 186 | 183 | 187 | 204 | 205 | 203 | 206 | 202 | 231 | 232 | 230 | 233 | 229 |

TABLE 10-continued

| Group index based on 3RBs | 24RB | | | | | 25RBs | | | | |
|---|---|---|---|---|---|---|---|---|---|---|
| 1  | 9   | 10  | 8   | 11  | 7   | 9   | 10  | 8   | 11  | 7   |
| 2  | 18  | 19  | 17  | 20  | 16  | 19  | 18  | 20  | 17  | 21  |
| 3  | 27  | 28  | 26  | 29  | 25  | 28  | 29  | 27  | 30  | 26  |
| 4  | 37  | 36  | 38  | 35  | 39  | 38  | 37  | 39  | 36  | 40  |
| 5  | 46  | 45  | 47  | 44  | 48  | 47  | 48  | 46  | 49  | 45  |
| 6  | 55  | 54  | 56  | 53  | 57  | 57  | 56  | 58  | 55  | 59  |
| 7  | 64  | 63  | 65  | 62  | 66  | 66  | 67  | 65  | 68  | 64  |
| 8  | 73  | 74  | 72  | 75  | 71  | 76  | 75  | 77  | 74  | 78  |
| 9  | 82  | 83  | 81  | 84  | 80  | 85  | 86  | 84  | 87  | 83  |
| 10 | 91  | 92  | 90  | 93  | 89  | 95  | 94  | 96  | 93  | 97  |
| 11 | 100 | 101 | 99  | 102 | 98  | 104 | 103 | 105 | 102 | 106 |
| 12 | 110 | 109 | 111 | 108 | 112 | 113 | 114 | 112 | 115 | 111 |
| 13 | 119 | 118 | 120 | 117 | 121 | 123 | 122 | 124 | 121 | 125 |
| 14 | 128 | 127 | 129 | 126 | 130 | 132 | 133 | 131 | 134 | 130 |
| 15 | 137 | 136 | 138 | 135 | 139 | 142 | 141 | 143 | 140 | 144 |
| 16 | 146 | 147 | 145 | 148 | 144 | 151 | 152 | 150 | 153 | 149 |
| 17 | 155 | 156 | 154 | 157 | 153 | 161 | 160 | 162 | 159 | 163 |
| 18 | 164 | 165 | 163 | 166 | 162 | 170 | 171 | 169 | 172 | 168 |
| 19 | 173 | 174 | 172 | 175 | 171 | 180 | 179 | 181 | 178 | 182 |
| 20 | 183 | 182 | 184 | 181 | 185 | 189 | 190 | 188 | 191 | 187 |
| 21 | 192 | 191 | 193 | 190 | 194 | 198 | 199 | 197 | 200 | 196 |
| 22 | 201 | 200 | 202 | 199 | 203 | 208 | 207 | 209 | 206 | 210 |
| 23 | 210 | 209 | 211 | 208 | 212 | 217 | 218 | 216 | 219 | 215 |
| 24 | 219 | 220 | 218 | 221 | 217 | 227 | 226 | 228 | 225 | 229 |
| 25 | 228 | 229 | 227 | 230 | 226 | 236 | 237 | 235 | 238 | 234 |
| 26 | 237 | 238 | 236 | 239 | 235 | 246 | 245 | 247 | 244 | 248 |
| 27 | 246 | 247 | 245 | 248 | 244 | 255 | 256 | 254 | 257 | 253 |
| 28 | 256 | 255 | 257 | 254 | 258 | 265 | 264 | 266 | 263 | 267 |
| 29 | 265 | 264 | 266 | 263 | 267 | 274 | 275 | 273 | 276 | 272 |
| 30 | 274 | 273 | 275 | 272 | 276 | 284 | 283 | 285 | 282 | 286 |

And, in another example, the maximum number of sequences can be predetermined to 4. The following tables 11 and 12 show this case.

TABLE 11

| Group index based on 3RBs | 3RB | 4RB | 5RB | 6RB | | 8RB | | 9RB | | 10RB | |
|---|---|---|---|---|---|---|---|---|---|---|---|
| 1  | 1  | 2  | 2  | 2  | 3  | 3  | 2  | 3  | 4  | 2  | 4  | 3  | 5  |
| 2  | 2  | 3  | 4  | 5  | 4  | 6  | 5  | 7  | 6  | 8  | 7  | 8  | 6  |
| 3  | 3  | 5  | 6  | 7  | 6  | 9  | 8  | 10 | 11 | 9  | 11 | 10 | 12 |
| 4  | 4  | 6  | 8  | 9  | 10 | 11 | 12 | 14 | 13 | 15 | 15 | 14 | 16 |
| 5  | 5  | 8  | 10 | 11 | 12 | 14 | 15 | 17 | 18 | 16 | 18 | 19 | 17 |
| 6  | 6  | 9  | 11 | 14 | 13 | 17 | 18 | 21 | 20 | 22 | 22 | 21 | 23 |
| 7  | 7  | 11 | 13 | 16 | 17 | 20 | 21 | 24 | 25 | 23 | 26 | 25 | 27 |
| 8  | 8  | 12 | 15 | 18 | 19 | 23 | 22 | 28 | 27 | 29 | 29 | 30 | 28 |
| 9  | 9  | 14 | 17 | 21 | 20 | 26 | 25 | 31 | 32 | 30 | 33 | 32 | 34 |
| 10 | 10 | 15 | 19 | 23 | 22 | 29 | 28 | 35 | 34 | 36 | 36 | 37 | 35 |
| 11 | 11 | 17 | 21 | 25 | 26 | 32 | 31 | 38 | 37 | 39 | 40 | 41 | 39 |
| 12 | 12 | 18 | 23 | 27 | 28 | 34 | 35 | 41 | 42 | 40 | 44 | 43 | 45 |
| 13 | 13 | 20 | 25 | 30 | 29 | 37 | 38 | 45 | 44 | 46 | 47 | 48 | 46 |
| 14 | 14 | 21 | 27 | 32 | 33 | 40 | 41 | 48 | 49 | 47 | 51 | 52 | 50 |
| 15 | 15 | 23 | 29 | 34 | 35 | 43 | 44 | 52 | 51 | 53 | 55 | 54 | 56 |
| 16 | 16 | 24 | 30 | 37 | 36 | 46 | 45 | 55 | 56 | 54 | 58 | 59 | 57 |
| 17 | 17 | 26 | 32 | 39 | 38 | 49 | 48 | 59 | 58 | 60 | 62 | 61 | 63 |
| 18 | 18 | 27 | 34 | 41 | 42 | 52 | 51 | 62 | 63 | 61 | 66 | 65 | 67 |
| 19 | 19 | 29 | 36 | 44 | 43 | 55 | 54 | 66 | 65 | 67 | 69 | 70 | 68 |
| 20 | 20 | 30 | 38 | 46 | 45 | 57 | 58 | 69 | 70 | 68 | 73 | 72 | 74 |
| 21 | 21 | 32 | 40 | 48 | 49 | 60 | 61 | 72 | 73 | 71 | 77 | 76 | 78 |
| 22 | 22 | 33 | 42 | 50 | 51 | 63 | 64 | 76 | 75 | 77 | 80 | 81 | 79 |
| 23 | 23 | 35 | 44 | 53 | 52 | 66 | 67 | 79 | 80 | 78 | 84 | 83 | 85 |
| 24 | 24 | 36 | 46 | 55 | 54 | 69 | 68 | 83 | 82 | 84 | 87 | 88 | 86 |
| 25 | 25 | 38 | 48 | 57 | 58 | 72 | 71 | 86 | 87 | 85 | 91 | 92 | 90 |
| 26 | 26 | 39 | 49 | 60 | 59 | 75 | 74 | 90 | 89 | 91 | 95 | 94 | 96 |
| 27 | 27 | 41 | 51 | 62 | 61 | 78 | 77 | 93 | 94 | 92 | 98 | 99 | 97 |
| 28 | 28 | 42 | 53 | 64 | 65 | 80 | 81 | 97 | 96 | 98 | 102 | 103 | 101 |
| 29 | 29 | 44 | 55 | 66 | 67 | 83 | 84 | 100 | 101 | 99 | 106 | 105 | 107 |
| 30 | 30 | 45 | 57 | 69 | 68 | 86 | 87 | 104 | 103 | 105 | 109 | 110 | 108 |

TABLE 11-continued

| Groupindex based on 3RBs | 12RB | | | | 15RB | | | |
|---|---|---|---|---|---|---|---|---|
| 1 | 4 | 5 | 3 | 6 | 6 | 5 | 7 | 4 |
| 2 | 9 | 8 | 10 | 7 | 12 | 11 | 13 | 10 |
| 3 | 13 | 14 | 12 | 15 | 17 | 18 | 16 | 19 |
| 4 | 18 | 17 | 19 | 16 | 23 | 24 | 22 | 25 |
| 5 | 22 | 23 | 21 | 24 | 29 | 28 | 30 | 27 |
| 6 | 27 | 26 | 28 | 25 | 35 | 34 | 36 | 33 |
| 7 | 31 | 32 | 30 | 33 | 40 | 41 | 39 | 42 |
| 8 | 36 | 35 | 37 | 34 | 46 | 47 | 45 | 48 |
| 9 | 40 | 41 | 39 | 42 | 52 | 51 | 53 | 50 |
| 10 | 45 | 44 | 46 | 43 | 58 | 57 | 59 | 56 |
| 11 | 49 | 50 | 48 | 51 | 64 | 63 | 65 | 62 |
| 12 | 54 | 53 | 55 | 52 | 69 | 70 | 68 | 71 |
| 13 | 58 | 59 | 57 | 60 | 75 | 76 | 74 | 77 |
| 14 | 63 | 62 | 64 | 61 | 81 | 80 | 82 | 79 |
| 15 | 67 | 68 | 66 | 69 | 87 | 86 | 88 | 85 |
| 16 | 72 | 71 | 73 | 70 | 92 | 93 | 91 | 94 |
| 17 | 76 | 77 | 75 | 78 | 98 | 99 | 97 | 100 |
| 18 | 81 | 80 | 82 | 79 | 104 | 103 | 105 | 102 |
| 19 | 85 | 86 | 84 | 87 | 110 | 109 | 111 | 108 |
| 20 | 90 | 89 | 91 | 88 | 115 | 116 | 114 | 117 |
| 21 | 94 | 95 | 93 | 96 | 121 | 122 | 120 | 123 |
| 22 | 99 | 98 | 100 | 97 | 127 | 128 | 126 | 129 |
| 23 | 103 | 104 | 102 | 105 | 133 | 132 | 134 | 131 |
| 24 | 108 | 107 | 109 | 106 | 139 | 138 | 140 | 137 |
| 25 | 112 | 113 | 111 | 114 | 144 | 145 | 143 | 146 |
| 26 | 117 | 116 | 118 | 115 | 150 | 151 | 149 | 152 |
| 27 | 121 | 122 | 120 | 123 | 156 | 155 | 157 | 154 |
| 28 | 126 | 125 | 127 | 124 | 162 | 161 | 163 | 160 |
| 29 | 130 | 131 | 129 | 132 | 167 | 168 | 166 | 169 |
| 30 | 135 | 134 | 136 | 133 | 173 | 174 | 172 | 175 |

TABLE 12

| Groupindex based on 3RBs | 16RB | | | | 18RB | | | | 20RB | | | |
|---|---|---|---|---|---|---|---|---|---|---|---|---|
| 1 | 6 | 7 | 5 | 8 | 7 | 6 | 8 | 5 | 8 | 7 | 9 | 6 |
| 2 | 12 | 13 | 11 | 14 | 14 | 13 | 15 | 12 | 15 | 16 | 14 | 17 |
| 3 | 18 | 19 | 17 | 20 | 20 | 21 | 19 | 22 | 23 | 24 | 22 | 25 |
| 4 | 25 | 24 | 26 | 23 | 27 | 28 | 26 | 29 | 31 | 30 | 32 | 29 |
| 5 | 31 | 30 | 32 | 29 | 34 | 35 | 33 | 36 | 39 | 38 | 40 | 37 |
| 6 | 37 | 36 | 38 | 35 | 41 | 40 | 42 | 39 | 46 | 47 | 45 | 48 |
| 7 | 43 | 44 | 42 | 45 | 48 | 47 | 49 | 46 | 54 | 53 | 55 | 52 |
| 8 | 49 | 50 | 48 | 51 | 54 | 55 | 53 | 56 | 62 | 61 | 63 | 60 |
| 9 | 55 | 56 | 54 | 57 | 61 | 62 | 60 | 63 | 69 | 70 | 68 | 71 |
| 10 | 62 | 61 | 63 | 60 | 68 | 69 | 67 | 70 | 77 | 78 | 76 | 79 |
| 11 | 68 | 67 | 69 | 66 | 75 | 74 | 76 | 73 | 85 | 84 | 86 | 83 |
| 12 | 74 | 73 | 75 | 72 | 82 | 81 | 83 | 80 | 93 | 92 | 94 | 91 |
| 13 | 80 | 81 | 79 | 82 | 88 | 89 | 87 | 90 | 100 | 101 | 99 | 102 |
| 14 | 86 | 87 | 85 | 88 | 95 | 96 | 94 | 97 | 108 | 107 | 109 | 106 |
| 15 | 92 | 93 | 91 | 94 | 102 | 103 | 101 | 104 | 116 | 115 | 117 | 114 |
| 16 | 99 | 98 | 100 | 97 | 109 | 108 | 110 | 107 | 123 | 124 | 122 | 125 |
| 17 | 105 | 104 | 106 | 103 | 116 | 115 | 117 | 114 | 131 | 132 | 130 | 133 |
| 18 | 111 | 110 | 112 | 109 | 123 | 122 | 124 | 121 | 139 | 138 | 140 | 137 |
| 19 | 117 | 118 | 116 | 119 | 129 | 130 | 128 | 131 | 146 | 147 | 145 | 148 |
| 20 | 123 | 124 | 122 | 125 | 136 | 137 | 135 | 138 | 154 | 155 | 153 | 156 |
| 21 | 129 | 130 | 128 | 131 | 143 | 142 | 144 | 141 | 162 | 161 | 163 | 160 |
| 22 | 136 | 135 | 137 | 134 | 150 | 149 | 151 | 148 | 170 | 169 | 171 | 168 |
| 23 | 142 | 141 | 143 | 140 | 157 | 156 | 158 | 155 | 177 | 178 | 176 | 179 |
| 24 | 148 | 147 | 149 | 146 | 163 | 164 | 162 | 165 | 185 | 186 | 184 | 187 |
| 25 | 154 | 155 | 153 | 156 | 170 | 171 | 169 | 172 | 193 | 192 | 194 | 191 |
| 26 | 160 | 161 | 159 | 162 | 177 | 176 | 178 | 175 | 200 | 201 | 199 | 202 |
| 27 | 166 | 167 | 165 | 168 | 184 | 183 | 185 | 182 | 208 | 209 | 207 | 210 |
| 28 | 173 | 172 | 174 | 171 | 191 | 190 | 192 | 189 | 216 | 215 | 217 | 214 |
| 29 | 179 | 178 | 180 | 177 | 197 | 198 | 196 | 199 | 224 | 223 | 225 | 222 |
| 30 | 185 | 184 | 186 | 183 | 204 | 205 | 203 | 206 | 231 | 232 | 230 | 233 |

| Groupindex based on 3RBs | 24RB | | | | 25RBs | | | |
|---|---|---|---|---|---|---|---|---|
| 1 | 9 | 10 | 8 | 11 | 9 | 10 | 8 | 11 |
| 2 | 18 | 19 | 17 | 20 | 19 | 18 | 20 | 17 |
| 3 | 27 | 28 | 26 | 29 | 28 | 29 | 27 | 30 |
| 4 | 37 | 36 | 38 | 35 | 38 | 37 | 39 | 36 |

TABLE 12-continued

| | | | | | | | | |
|---|---|---|---|---|---|---|---|---|
| 5 | 46 | 45 | 47 | 44 | 47 | 48 | 46 | 49 |
| 6 | 55 | 54 | 56 | 53 | 57 | 56 | 58 | 55 |
| 7 | 64 | 63 | 65 | 62 | 66 | 67 | 65 | 68 |
| 8 | 73 | 74 | 72 | 75 | 76 | 75 | 77 | 74 |
| 9 | 82 | 83 | 81 | 84 | 85 | 86 | 84 | 87 |
| 10 | 91 | 92 | 90 | 93 | 95 | 94 | 96 | 93 |
| 11 | 100 | 101 | 99 | 102 | 104 | 103 | 105 | 102 |
| 12 | 110 | 109 | 111 | 108 | 113 | 114 | 112 | 115 |
| 13 | 119 | 118 | 120 | 117 | 123 | 122 | 124 | 121 |
| 14 | 128 | 127 | 129 | 126 | 132 | 133 | 131 | 134 |
| 15 | 137 | 136 | 138 | 135 | 142 | 141 | 143 | 140 |
| 16 | 146 | 147 | 145 | 148 | 151 | 152 | 150 | 153 |
| 17 | 155 | 156 | 154 | 157 | 161 | 160 | 162 | 159 |
| 18 | 164 | 165 | 163 | 166 | 170 | 171 | 169 | 172 |
| 19 | 173 | 174 | 172 | 175 | 180 | 179 | 181 | 178 |
| 20 | 183 | 182 | 184 | 181 | 189 | 190 | 188 | 191 |
| 21 | 192 | 191 | 193 | 190 | 198 | 199 | 197 | 200 |
| 22 | 201 | 200 | 202 | 199 | 208 | 207 | 209 | 206 |
| 23 | 210 | 209 | 211 | 208 | 217 | 218 | 216 | 219 |
| 24 | 219 | 220 | 218 | 221 | 227 | 226 | 228 | 225 |
| 25 | 228 | 229 | 227 | 230 | 236 | 237 | 235 | 238 |
| 26 | 237 | 238 | 236 | 239 | 246 | 245 | 247 | 244 |
| 27 | 246 | 247 | 245 | 248 | 255 | 256 | 254 | 257 |
| 28 | 256 | 255 | 257 | 254 | 265 | 264 | 266 | 263 |
| 29 | 265 | 264 | 266 | 263 | 274 | 275 | 273 | 276 |
| 30 | 274 | 273 | 275 | 272 | 284 | 283 | 285 | 282 |

And, in another example, the maximum number of sequences can be predetermined to 3. The following tables 13 and 14 show this case.

TABLE 13

| Groupindex based on 3RBs | 3RB | 4RB | 5RB | 6RB | 8RB | | 9RB | | | 10RB | | | 12RB | | |
|---|---|---|---|---|---|---|---|---|---|---|---|---|---|---|---|
| 1 | 1 | 2 | 2 | 2 | 3 | 3 | 2 | 3 | 4 | 2 | 4 | 3 | 5 | 4 | 5 | 3 |
| 2 | 2 | 3 | 4 | 5 | 4 | 6 | 5 | 7 | 6 | 8 | 7 | 8 | 6 | 9 | 8 | 10 |
| 3 | 3 | 5 | 6 | 7 | 6 | 9 | 8 | 10 | 11 | 9 | 11 | 10 | 12 | 13 | 14 | 12 |
| 4 | 4 | 6 | 8 | 9 | 10 | 11 | 12 | 14 | 13 | 15 | 15 | 14 | 16 | 18 | 17 | 19 |
| 5 | 5 | 8 | 10 | 11 | 12 | 14 | 15 | 17 | 18 | 16 | 18 | 19 | 17 | 22 | 23 | 21 |
| 6 | 6 | 9 | 11 | 14 | 13 | 17 | 18 | 21 | 20 | 22 | 22 | 21 | 23 | 27 | 26 | 28 |
| 7 | 7 | 11 | 13 | 16 | 17 | 20 | 21 | 24 | 25 | 23 | 26 | 25 | 27 | 31 | 32 | 30 |
| 8 | 8 | 12 | 15 | 18 | 19 | 23 | 22 | 28 | 27 | 29 | 29 | 30 | 28 | 36 | 35 | 37 |
| 9 | 9 | 14 | 17 | 21 | 20 | 26 | 25 | 31 | 32 | 30 | 33 | 32 | 34 | 40 | 41 | 39 |
| 10 | 10 | 15 | 19 | 23 | 22 | 29 | 28 | 35 | 34 | 36 | 36 | 37 | 35 | 45 | 44 | 46 |
| 11 | 11 | 17 | 21 | 25 | 26 | 32 | 31 | 38 | 37 | 39 | 40 | 41 | 39 | 49 | 50 | 48 |
| 12 | 12 | 18 | 23 | 27 | 28 | 34 | 35 | 41 | 42 | 40 | 44 | 43 | 45 | 54 | 53 | 55 |
| 13 | 13 | 20 | 25 | 30 | 29 | 37 | 38 | 45 | 44 | 46 | 47 | 48 | 46 | 58 | 59 | 57 |
| 14 | 14 | 21 | 27 | 32 | 33 | 40 | 41 | 48 | 49 | 47 | 51 | 52 | 50 | 63 | 62 | 64 |
| 15 | 15 | 23 | 29 | 34 | 35 | 43 | 44 | 52 | 51 | 53 | 55 | 54 | 56 | 67 | 68 | 66 |
| 16 | 16 | 24 | 30 | 37 | 36 | 46 | 45 | 55 | 56 | 54 | 58 | 59 | 57 | 72 | 71 | 73 |
| 17 | 17 | 26 | 32 | 39 | 38 | 49 | 48 | 59 | 58 | 60 | 62 | 61 | 63 | 76 | 77 | 75 |
| 18 | 18 | 27 | 34 | 41 | 42 | 52 | 51 | 62 | 63 | 61 | 66 | 65 | 67 | 81 | 80 | 82 |
| 19 | 19 | 29 | 36 | 44 | 43 | 55 | 54 | 66 | 65 | 67 | 69 | 70 | 68 | 85 | 86 | 84 |
| 20 | 20 | 30 | 38 | 46 | 45 | 57 | 58 | 69 | 70 | 68 | 73 | 72 | 74 | 90 | 89 | 91 |
| 21 | 21 | 32 | 40 | 48 | 49 | 60 | 61 | 72 | 73 | 71 | 77 | 76 | 78 | 94 | 95 | 93 |
| 22 | 22 | 33 | 42 | 50 | 51 | 63 | 64 | 76 | 75 | 77 | 80 | 81 | 79 | 99 | 98 | 100 |
| 23 | 23 | 35 | 44 | 53 | 52 | 66 | 67 | 79 | 80 | 78 | 84 | 83 | 85 | 103 | 104 | 102 |
| 24 | 24 | 36 | 46 | 55 | 54 | 69 | 68 | 83 | 82 | 84 | 87 | 88 | 86 | 108 | 107 | 109 |
| 25 | 25 | 38 | 48 | 57 | 58 | 72 | 71 | 86 | 87 | 85 | 91 | 92 | 90 | 112 | 113 | 111 |
| 26 | 26 | 39 | 49 | 60 | 59 | 75 | 74 | 90 | 89 | 91 | 95 | 94 | 96 | 117 | 116 | 118 |
| 27 | 27 | 41 | 51 | 62 | 61 | 78 | 77 | 93 | 94 | 92 | 98 | 99 | 97 | 121 | 122 | 120 |
| 28 | 28 | 42 | 53 | 64 | 65 | 80 | 81 | 97 | 96 | 98 | 102 | 103 | 101 | 126 | 125 | 127 |
| 29 | 29 | 44 | 55 | 66 | 67 | 83 | 84 | 100 | 101 | 99 | 106 | 105 | 107 | 130 | 131 | 129 |
| 30 | 30 | 45 | 57 | 69 | 68 | 86 | 87 | 104 | 103 | 105 | 109 | 110 | 108 | 135 | 134 | 136 |

| Groupindex based on 3RBs | 15RB | | | 16RB | | | 18RB | | |
|---|---|---|---|---|---|---|---|---|---|
| 1 | 6 | 5 | 7 | 6 | 7 | 5 | 7 | 6 | 8 |
| 2 | 12 | 11 | 13 | 12 | 13 | 11 | 14 | 13 | 15 |
| 3 | 17 | 18 | 16 | 18 | 19 | 17 | 20 | 21 | 19 |
| 4 | 23 | 24 | 22 | 25 | 24 | 26 | 27 | 28 | 26 |
| 5 | 29 | 28 | 30 | 31 | 30 | 32 | 34 | 35 | 33 |
| 6 | 35 | 34 | 36 | 37 | 36 | 38 | 41 | 40 | 42 |
| 7 | 40 | 41 | 39 | 43 | 44 | 42 | 48 | 47 | 49 |

TABLE 13-continued

| | | | | | | | | |
|---|---|---|---|---|---|---|---|---|
| 8 | 46 | 47 | 45 | 49 | 50 | 48 | 54 | 55 | 53 |
| 9 | 52 | 51 | 53 | 55 | 56 | 54 | 61 | 62 | 60 |
| 10 | 58 | 57 | 59 | 62 | 61 | 63 | 68 | 69 | 67 |
| 11 | 64 | 63 | 65 | 68 | 67 | 69 | 75 | 74 | 76 |
| 12 | 69 | 70 | 68 | 74 | 73 | 75 | 82 | 81 | 83 |
| 13 | 75 | 76 | 74 | 80 | 81 | 79 | 88 | 89 | 87 |
| 14 | 81 | 80 | 82 | 86 | 87 | 85 | 95 | 96 | 94 |
| 15 | 87 | 86 | 88 | 92 | 93 | 91 | 102 | 103 | 101 |
| 16 | 92 | 93 | 91 | 99 | 98 | 100 | 109 | 108 | 110 |
| 17 | 98 | 99 | 97 | 105 | 104 | 106 | 116 | 115 | 117 |
| 18 | 104 | 103 | 105 | 111 | 110 | 112 | 123 | 122 | 124 |
| 19 | 110 | 109 | 111 | 117 | 118 | 116 | 129 | 130 | 128 |
| 20 | 115 | 116 | 114 | 123 | 124 | 122 | 136 | 137 | 135 |
| 21 | 121 | 122 | 120 | 129 | 130 | 128 | 143 | 142 | 144 |
| 22 | 127 | 128 | 126 | 136 | 135 | 137 | 150 | 149 | 151 |
| 23 | 133 | 132 | 134 | 142 | 141 | 143 | 157 | 156 | 158 |
| 24 | 139 | 138 | 140 | 148 | 147 | 149 | 163 | 164 | 162 |
| 25 | 144 | 145 | 143 | 154 | 155 | 153 | 170 | 171 | 169 |
| 26 | 150 | 151 | 149 | 160 | 161 | 159 | 177 | 176 | 178 |
| 27 | 156 | 155 | 157 | 166 | 167 | 165 | 184 | 183 | 185 |
| 28 | 162 | 161 | 163 | 173 | 172 | 174 | 191 | 190 | 192 |
| 29 | 167 | 168 | 166 | 179 | 178 | 180 | 197 | 198 | 196 |
| 30 | 173 | 174 | 172 | 185 | 184 | 186 | 204 | 205 | 203 |

TABLE 14

| Group-index based on 3RBs | 20RB | | | 24RB | | | 25RBs | | |
|---|---|---|---|---|---|---|---|---|---|
| 1 | 8 | 7 | 9 | 9 | 10 | 8 | 9 | 10 | 8 |
| 2 | 15 | 16 | 14 | 18 | 19 | 17 | 19 | 18 | 20 |
| 3 | 23 | 24 | 22 | 27 | 28 | 26 | 28 | 29 | 27 |
| 4 | 31 | 30 | 32 | 37 | 36 | 38 | 38 | 37 | 39 |
| 5 | 39 | 38 | 40 | 46 | 45 | 47 | 47 | 48 | 46 |
| 6 | 46 | 47 | 45 | 55 | 54 | 56 | 57 | 56 | 58 |
| 7 | 54 | 53 | 55 | 64 | 63 | 65 | 66 | 67 | 65 |
| 8 | 62 | 61 | 63 | 73 | 74 | 72 | 76 | 75 | 77 |
| 9 | 69 | 70 | 68 | 82 | 83 | 81 | 85 | 86 | 84 |
| 10 | 77 | 78 | 76 | 91 | 92 | 90 | 95 | 94 | 96 |
| 11 | 85 | 84 | 86 | 100 | 101 | 99 | 104 | 103 | 105 |
| 12 | 93 | 92 | 94 | 110 | 109 | 111 | 113 | 114 | 112 |
| 13 | 100 | 101 | 99 | 119 | 118 | 120 | 123 | 122 | 124 |
| 14 | 108 | 107 | 109 | 128 | 127 | 129 | 132 | 133 | 131 |
| 15 | 116 | 115 | 117 | 137 | 136 | 138 | 142 | 141 | 143 |
| 16 | 123 | 124 | 122 | 146 | 147 | 145 | 151 | 152 | 150 |
| 17 | 131 | 132 | 130 | 155 | 156 | 154 | 161 | 160 | 162 |
| 18 | 139 | 138 | 140 | 164 | 165 | 163 | 170 | 171 | 169 |
| 19 | 146 | 147 | 145 | 173 | 174 | 172 | 180 | 179 | 181 |
| 20 | 154 | 155 | 153 | 183 | 182 | 184 | 189 | 190 | 188 |
| 21 | 162 | 161 | 163 | 192 | 191 | 193 | 198 | 199 | 197 |
| 22 | 170 | 169 | 171 | 201 | 200 | 202 | 208 | 207 | 209 |
| 23 | 177 | 178 | 176 | 210 | 209 | 211 | 217 | 218 | 216 |
| 24 | 185 | 186 | 184 | 219 | 220 | 218 | 227 | 226 | 228 |
| 25 | 193 | 192 | 194 | 228 | 229 | 227 | 236 | 237 | 235 |
| 26 | 200 | 201 | 199 | 237 | 238 | 236 | 246 | 245 | 247 |
| 27 | 208 | 209 | 207 | 246 | 247 | 245 | 255 | 256 | 254 |
| 28 | 216 | 215 | 217 | 256 | 255 | 257 | 265 | 264 | 266 |
| 29 | 224 | 223 | 225 | 265 | 264 | 266 | 274 | 275 | 273 |
| 30 | 231 | 232 | 230 | 274 | 273 | 275 | 284 | 283 | 285 |

And, in another example, the maximum number of sequences can be predetermined to 2. The following tables 15 and 16 show this case.

TABLE 15

| Groupindex based on 3RBs | 3RB | | 4RB | | 5RB | | 6RB | | 8RB | | 9RB | | 10RB | | 12RB | | 15RB | |
|---|---|---|---|---|---|---|---|---|---|---|---|---|---|---|---|---|---|---|
| 1 | 1 | 2 | 2 | 2 | 3 | 3 | 2 | 3 | 4 | 4 | 3 | 4 | 5 | 6 | 5 | | | |
| 2 | 2 | 3 | 4 | 5 | 4 | 6 | 5 | 7 | 6 | 7 | 8 | 9 | 8 | 12 | 11 | | | |
| 3 | 3 | 5 | 6 | 7 | 6 | 9 | 8 | 10 | 11 | 11 | 10 | 13 | 14 | 17 | 18 | | | |
| 4 | 4 | 6 | 8 | 9 | 10 | 11 | 12 | 14 | 13 | 15 | 14 | 18 | 17 | 23 | 24 | | | |
| 5 | 5 | 8 | 10 | 11 | 12 | 14 | 15 | 17 | 18 | 18 | 19 | 22 | 23 | 29 | 28 | | | |
| 6 | 6 | 9 | 11 | 14 | 13 | 17 | 18 | 21 | 20 | 22 | 21 | 27 | 26 | 35 | 34 | | | |
| 7 | 7 | 11 | 13 | 16 | 17 | 20 | 21 | 24 | 25 | 26 | 25 | 31 | 32 | 40 | 41 | | | |
| 8 | 8 | 12 | 15 | 18 | 19 | 23 | 22 | 28 | 27 | 29 | 30 | 36 | 35 | 46 | 47 | | | |
| 9 | 9 | 14 | 17 | 21 | 20 | 26 | 25 | 31 | 32 | 33 | 32 | 40 | 41 | 52 | 51 | | | |
| 10 | 10 | 15 | 19 | 23 | 22 | 29 | 28 | 35 | 34 | 36 | 37 | 45 | 44 | 58 | 57 | | | |
| 11 | 11 | 17 | 21 | 25 | 26 | 32 | 31 | 38 | 37 | 40 | 41 | 49 | 50 | 64 | 63 | | | |
| 12 | 12 | 18 | 23 | 27 | 28 | 34 | 35 | 41 | 42 | 44 | 43 | 54 | 53 | 69 | 70 | | | |
| 13 | 13 | 20 | 25 | 30 | 29 | 37 | 38 | 45 | 44 | 47 | 48 | 58 | 59 | 75 | 76 | | | |
| 14 | 14 | 21 | 27 | 32 | 33 | 40 | 41 | 48 | 49 | 51 | 52 | 63 | 62 | 81 | 80 | | | |
| 15 | 15 | 23 | 29 | 34 | 35 | 43 | 44 | 52 | 51 | 55 | 54 | 67 | 68 | 87 | 86 | | | |
| 16 | 16 | 24 | 30 | 37 | 36 | 46 | 45 | 55 | 56 | 58 | 49 | 72 | 71 | 92 | 93 | | | |
| 17 | 17 | 26 | 32 | 39 | 38 | 49 | 48 | 59 | 58 | 62 | 61 | 76 | 77 | 98 | 99 | | | |
| 18 | 18 | 27 | 34 | 41 | 42 | 52 | 51 | 62 | 63 | 66 | 65 | 81 | 80 | 104 | 103 | | | |
| 19 | 19 | 29 | 36 | 44 | 43 | 55 | 54 | 66 | 65 | 69 | 70 | 85 | 86 | 110 | 109 | | | |
| 20 | 20 | 30 | 38 | 46 | 45 | 57 | 58 | 69 | 70 | 73 | 72 | 90 | 89 | 115 | 116 | | | |
| 21 | 21 | 32 | 40 | 48 | 49 | 60 | 61 | 72 | 73 | 77 | 76 | 94 | 95 | 121 | 122 | | | |

TABLE 15-continued

| Group index based on 3RBs | 3RB | 4RB | 5RB | 6RB | | 8RB | | 9RB | | 10RB | | 12RB | | 15RB | |
|---|---|---|---|---|---|---|---|---|---|---|---|---|---|---|---|
| 22 | 22 | 33 | 42 | 50 | 51 | 63 | 64 | 76 | 75 | 80 | 81 | 99 | 98 | 127 | 128 |
| 23 | 23 | 35 | 44 | 53 | 52 | 66 | 67 | 79 | 80 | 84 | 83 | 103 | 104 | 133 | 132 |
| 24 | 24 | 36 | 46 | 55 | 54 | 69 | 68 | 83 | 82 | 87 | 88 | 108 | 107 | 139 | 138 |
| 25 | 25 | 38 | 48 | 57 | 58 | 72 | 71 | 86 | 87 | 91 | 92 | 112 | 113 | 144 | 145 |
| 26 | 26 | 39 | 49 | 60 | 59 | 75 | 74 | 90 | 89 | 95 | 94 | 117 | 116 | 150 | 151 |
| 27 | 27 | 41 | 51 | 62 | 61 | 78 | 77 | 93 | 94 | 98 | 99 | 121 | 122 | 156 | 155 |
| 28 | 28 | 42 | 53 | 64 | 65 | 80 | 81 | 97 | 96 | 102 | 103 | 126 | 125 | 162 | 161 |
| 29 | 29 | 44 | 55 | 66 | 67 | 83 | 84 | 100 | 101 | 106 | 105 | 130 | 131 | 167 | 168 |
| 30 | 30 | 45 | 57 | 69 | 68 | 86 | 87 | 104 | 103 | 109 | 110 | 135 | 134 | 173 | 174 |

TABLE 16

| Gr. Idx 3RBs | 16RB | | 18RB | | 20RB | | 24RB | | 25RB | |
|---|---|---|---|---|---|---|---|---|---|---|
| 1 | 6 | 7 | 7 | 6 | 8 | 7 | 9 | 10 | 9 | 10 |
| 2 | 12 | 13 | 14 | 13 | 15 | 16 | 18 | 19 | 19 | 18 |
| 3 | 18 | 19 | 20 | 21 | 23 | 24 | 27 | 28 | 28 | 29 |
| 4 | 25 | 24 | 27 | 28 | 31 | 30 | 37 | 36 | 38 | 37 |
| 5 | 31 | 30 | 34 | 35 | 39 | 38 | 46 | 45 | 47 | 48 |
| 6 | 37 | 36 | 41 | 40 | 46 | 47 | 55 | 54 | 57 | 56 |
| 7 | 43 | 44 | 48 | 47 | 54 | 53 | 64 | 63 | 66 | 67 |
| 8 | 49 | 50 | 54 | 55 | 62 | 61 | 73 | 74 | 76 | 75 |
| 9 | 55 | 56 | 61 | 62 | 69 | 70 | 82 | 83 | 85 | 86 |
| 10 | 62 | 61 | 68 | 69 | 77 | 78 | 91 | 92 | 95 | 94 |
| 11 | 68 | 67 | 75 | 74 | 85 | 84 | 100 | 101 | 104 | 103 |
| 12 | 74 | 73 | 82 | 81 | 93 | 92 | 110 | 109 | 113 | 114 |
| 13 | 80 | 81 | 88 | 89 | 100 | 101 | 119 | 118 | 123 | 122 |
| 14 | 86 | 87 | 95 | 96 | 108 | 107 | 128 | 127 | 132 | 133 |
| 15 | 92 | 93 | 102 | 103 | 116 | 115 | 137 | 136 | 142 | 141 |
| 16 | 99 | 98 | 109 | 108 | 123 | 124 | 146 | 147 | 151 | 152 |
| 17 | 105 | 104 | 116 | 115 | 131 | 132 | 155 | 156 | 161 | 160 |
| 18 | 111 | 110 | 123 | 122 | 139 | 138 | 164 | 165 | 170 | 171 |
| 19 | 117 | 118 | 129 | 130 | 146 | 147 | 173 | 174 | 180 | 179 |
| 20 | 123 | 124 | 136 | 137 | 154 | 155 | 183 | 182 | 189 | 190 |
| 21 | 129 | 130 | 143 | 142 | 162 | 161 | 192 | 191 | 198 | 199 |
| 22 | 136 | 135 | 150 | 149 | 170 | 169 | 201 | 200 | 208 | 207 |
| 23 | 142 | 141 | 157 | 156 | 177 | 178 | 210 | 209 | 217 | 218 |
| 24 | 148 | 147 | 163 | 164 | 185 | 186 | 219 | 220 | 227 | 226 |
| 25 | 154 | 155 | 170 | 171 | 193 | 192 | 228 | 229 | 236 | 237 |
| 26 | 160 | 161 | 177 | 176 | 200 | 201 | 237 | 238 | 246 | 245 |
| 27 | 166 | 167 | 184 | 183 | 208 | 209 | 246 | 247 | 255 | 256 |
| 28 | 173 | 172 | 191 | 190 | 216 | 215 | 256 | 255 | 265 | 264 |
| 29 | 179 | 178 | 197 | 198 | 224 | 223 | 265 | 264 | 274 | 275 |
| 30 | 185 | 184 | 204 | 205 | 231 | 232 | 274 | 273 | 284 | 283 |

And, in another example, the maximum number of sequences can be predetermined to 1. The following table 17 shows this case.

TABLE 17

| Gr. Idx 3RBs | 3RB | 4RB | 5RB | 6RB | 8RB | 9RB | 10RB | 12RB | 15RB | 16RB | 18RB | 20RB | 24RB | 25RB |
|---|---|---|---|---|---|---|---|---|---|---|---|---|---|---|
| 1 | 1 | 2 | 2 | 2 | 3 | 3 | 4 | 4 | 6 | 6 | 7 | 8 | 9 | 9 |
| 2 | 2 | 3 | 4 | 5 | 6 | 7 | 7 | 9 | 12 | 12 | 14 | 15 | 18 | 19 |
| 3 | 3 | 5 | 6 | 7 | 9 | 10 | 11 | 13 | 17 | 18 | 20 | 23 | 27 | 28 |
| 4 | 4 | 6 | 8 | 9 | 11 | 14 | 15 | 18 | 23 | 25 | 27 | 31 | 37 | 38 |
| 5 | 5 | 8 | 10 | 11 | 14 | 17 | 18 | 22 | 29 | 31 | 34 | 39 | 46 | 47 |
| 6 | 6 | 9 | 11 | 14 | 17 | 21 | 22 | 27 | 35 | 37 | 41 | 46 | 55 | 57 |
| 7 | 7 | 11 | 13 | 16 | 20 | 24 | 26 | 31 | 40 | 43 | 48 | 54 | 64 | 66 |
| 8 | 8 | 12 | 15 | 18 | 23 | 28 | 29 | 36 | 46 | 49 | 54 | 62 | 73 | 76 |
| 9 | 9 | 14 | 17 | 21 | 26 | 31 | 33 | 40 | 52 | 55 | 61 | 69 | 82 | 85 |
| 10 | 10 | 15 | 19 | 23 | 29 | 35 | 36 | 45 | 58 | 62 | 68 | 77 | 91 | 95 |
| 11 | 11 | 17 | 21 | 25 | 32 | 38 | 40 | 49 | 64 | 68 | 75 | 85 | 100 | 104 |
| 12 | 12 | 18 | 23 | 27 | 34 | 41 | 44 | 54 | 69 | 74 | 82 | 93 | 110 | 113 |
| 13 | 13 | 20 | 25 | 30 | 37 | 45 | 47 | 58 | 75 | 80 | 88 | 100 | 119 | 123 |
| 14 | 14 | 21 | 27 | 32 | 40 | 48 | 51 | 63 | 81 | 86 | 95 | 108 | 128 | 132 |
| 15 | 15 | 23 | 29 | 34 | 43 | 52 | 55 | 67 | 87 | 92 | 102 | 116 | 137 | 142 |
| 16 | 16 | 24 | 30 | 37 | 46 | 55 | 58 | 72 | 92 | 99 | 109 | 123 | 146 | 151 |
| 17 | 17 | 26 | 32 | 39 | 49 | 59 | 62 | 76 | 98 | 105 | 116 | 131 | 155 | 161 |
| 18 | 18 | 27 | 34 | 41 | 52 | 62 | 66 | 81 | 104 | 111 | 123 | 139 | 164 | 170 |

TABLE 17-continued

| Gr. Idx 3RBs | 3RB | 4RB | 5RB | 6RB | 8RB | 9RB | 10RB | 12RB | 15RB | 16RB | 18RB | 20RB | 24RB | 25RB |
|---|---|---|---|---|---|---|---|---|---|---|---|---|---|---|
| 19 | 19 | 29 | 36 | 44 | 55 | 66 | 69 | 85 | 110 | 117 | 129 | 146 | 173 | 180 |
| 20 | 20 | 30 | 38 | 46 | 57 | 69 | 73 | 90 | 115 | 123 | 136 | 154 | 183 | 189 |
| 21 | 21 | 32 | 40 | 48 | 60 | 72 | 77 | 94 | 121 | 129 | 143 | 162 | 192 | 198 |
| 22 | 22 | 33 | 42 | 50 | 63 | 76 | 80 | 99 | 127 | 136 | 150 | 170 | 201 | 208 |
| 23 | 23 | 35 | 44 | 53 | 66 | 79 | 84 | 103 | 133 | 142 | 157 | 177 | 210 | 217 |
| 24 | 24 | 36 | 46 | 55 | 69 | 83 | 87 | 108 | 139 | 148 | 163 | 185 | 219 | 227 |
| 25 | 25 | 38 | 48 | 57 | 72 | 86 | 91 | 112 | 144 | 154 | 170 | 193 | 228 | 236 |
| 26 | 26 | 39 | 49 | 60 | 75 | 90 | 95 | 117 | 150 | 160 | 177 | 200 | 237 | 246 |
| 27 | 27 | 41 | 51 | 62 | 78 | 93 | 98 | 121 | 156 | 166 | 184 | 208 | 246 | 255 |
| 28 | 28 | 42 | 53 | 64 | 80 | 97 | 102 | 126 | 162 | 173 | 191 | 216 | 256 | 265 |
| 29 | 29 | 44 | 55 | 66 | 83 | 100 | 106 | 130 | 167 | 179 | 197 | 224 | 265 | 274 |
| 30 | 30 | 45 | 57 | 69 | 86 | 104 | 109 | 135 | 173 | 185 | 204 | 231 | 274 | 284 |

Considering the complexity of configuration and the flexibility for supporting UE(s) to use variable length reference signal sequence, one embodiment of this invention proposes to perform grouping such that each of the groups contains one base sequence of each length corresponding to 1 to 5 RB length, and two base sequences of each length corresponding to 6 RB or more length. This corresponds to the tables 15 and 16.

Here, base sequence means the ZC sequence indicated by the root index, and is used for applying the cyclic shift corresponding to various cyclic shift values. And, the base sequence with cyclic shift can be used as a reference signal sequence.

The above tables 1~17 is the case when the root index(es) is selected by using the term of $(s_1/N_1 - s_2/N_2)$. But in another embodiment of this invention, the root index(es) can be selected by actual cross correlation value calculation. The following tables 18~20 correspond to the tables 6~8, but the root indexes are selected by actual cross correlation value calculation.

TABLE 18

| Gr. Idx 3RBs | 3RB | 4RB | 5RB | 6RB | | 8RB | | 9RB | | 10RB | |
|---|---|---|---|---|---|---|---|---|---|---|---|
| 1 | 1 | 25 | 2 | 20 | 2 | 3 | 25 | 57 | 4 | 75 | 60 | 79 | 4 |
| 2 | 2 | 3 | 4 | 40 | 33 | 65 | 28 | 7 | 71 | 96 | 64 | 45 | 75 |
| 3 | 3 | 14 | 6 | 7 | 21 | 53 | 9 | 46 | 10 | 37 | 11 | 39 | 86 |
| 4 | 4 | 6 | 47 | 9 | 66 | 56 | 41 | 14 | 85 | 78 | 15 | 71 | 14 |
| 5 | 5 | 39 | 39 | 47 | 54 | 44 | 50 | 71 | 44 | 60 | 56 | 75 | 103 |
| 6 | 6 | 9 | 31 | 61 | 14 | 17 | 84 | 21 | 92 | 85 | 97 | 50 | 67 |
| 7 | 7 | 42 | 33 | 16 | 28 | 20 | 87 | 24 | 51 | 60 | 82 | 63 | 26 |
| 8 | 8 | 12 | 30 | 42 | 54 | 23 | 5 | 28 | 99 | 49 | 67 | 86 | 1 |
| 9 | 9 | 45 | 17 | 68 | 21 | 48 | 85 | 31 | 74 | 58 | 61 | 89 | 78 |
| 10 | 10 | 15 | 19 | 23 | 5 | 73 | 29 | 106 | 70 | 34 | 93 | 112 | 36 |
| 11 | 11 | 1 | 21 | 11 | 25 | 32 | 2 | 38 | 102 | 11 | 40 | 78 | 12 |
| 12 | 12 | 37 | 23 | 51 | 63 | 79 | 64 | 96 | 77 | 41 | 72 | 44 | 100 |
| 13 | 13 | 4 | 5 | 6 | 30 | 67 | 37 | 45 | 9 | 18 | 104 | 47 | 85 |
| 14 | 14 | 21 | 7 | 32 | 22 | 40 | 58 | 102 | 84 | 48 | 51 | 6 | 23 |
| 15 | 15 | 23 | 58 | 58 | 34 | 43 | 61 | 105 | 16 | 25 | 17 | 111 | 83 |
| 16 | 16 | 24 | 1 | 13 | 65 | 46 | 28 | 91 | 2 | 82 | 96 | 2 | 30 |
| 17 | 17 | 26 | 52 | 39 | 49 | 31 | 49 | 23 | 59 | 16 | 62 | 107 | 90 |
| 18 | 18 | 43 | 54 | 65 | 41 | 22 | 52 | 62 | 98 | 89 | 9 | 66 | 28 |
| 19 | 19 | 29 | 36 | 8 | 20 | 10 | 25 | 30 | 12 | 87 | 41 | 24 | 70 |
| 20 | 20 | 46 | 38 | 46 | 60 | 87 | 57 | 69 | 5 | 96 | 73 | 35 | 101 |
| 21 | 21 | 32 | 40 | 48 | 66 | 16 | 60 | 1 | 37 | 73 | 20 | 1 | 39 |
| 22 | 22 | 2 | 42 | 3 | 50 | 41 | 78 | 76 | 49 | 33 | 52 | 24 | 35 |
| 23 | 23 | 35 | 29 | 29 | 17 | 66 | 55 | 79 | 8 | 58 | 46 | 27 | 112 |
| 24 | 24 | 5 | 26 | 55 | 43 | 69 | 2 | 83 | 56 | 47 | 31 | 12 | 88 |
| 25 | 25 | 38 | 28 | 10 | 57 | 72 | 27 | 15 | 65 | 86 | 63 | 46 | 16 |
| 26 | 26 | 8 | 20 | 24 | 17 | 45 | 75 | 63 | 54 | 90 | 95 | 57 | 38 |
| 27 | 27 | 41 | 22 | 62 | 44 | 33 | 48 | 93 | 22 | 29 | 23 | 98 | 42 |
| 28 | 28 | 33 | 53 | 64 | 50 | 36 | 80 | 61 | 97 | 70 | 102 | 57 | 74 |
| 29 | 29 | 44 | 8 | 31 | 38 | 24 | 39 | 100 | 36 | 11 | 49 | 68 | 106 |
| 30 | 30 | 22 | 55 | 69 | 51 | 86 | 64 | 50 | 103 | 18 | 34 | 109 | 81 |

| Gr. Idx 3RBs | 12RB | | | | 15RB | | | |
|---|---|---|---|---|---|---|---|---|
| 1 | 74 | 51 | 4 | 5 | 6 | 95 | 140 | 125 | 5 |
| 2 | 9 | 120 | 44 | 8 | 101 | 71 | 131 | 12 | 11 |
| 3 | 83 | 13 | 14 | 48 | 17 | 107 | 77 | 18 | 62 |
| 4 | 18 | 122 | 87 | 129 | 23 | 83 | 113 | 68 | 24 |
| 5 | 92 | 23 | 115 | 78 | 29 | 118 | 148 | 28 | 163 |
| 6 | 27 | 96 | 131 | 73 | 35 | 154 | 124 | 34 | 94 |
| 7 | 101 | 124 | 32 | 66 | 40 | 130 | 160 | 41 | 100 |
| 8 | 36 | 105 | 8 | 59 | 46 | 136 | 106 | 47 | 91 |
| 9 | 133 | 110 | 41 | 75 | 52 | 141 | 171 | 142 | 7 |

TABLE 18-continued

| | | | | | | | | |
|---|---|---|---|---|---|---|---|---|
| 10 | 45 | 114 | 91 | 17 | 58 | 147 | 57 | 177 | 13 |
| 11 | 119 | 3 | 50 | 77 | 64 | 153 | 4 | 63 | 19 |
| 12 | 54 | 100 | 123 | 26 | 69 | 159 | 129 | 114 | 10 |
| 13 | 12 | 58 | 128 | 114 | 75 | 165 | 153 | 120 | 76 |
| 14 | 63 | 132 | 7 | 35 | 81 | 21 | 170 | 36 | 80 |
| 15 | 67 | 137 | 21 | 68 | 86 | 27 | 176 | 146 | 42 |
| 16 | 2 | 118 | 71 | 16 | 93 | 152 | 3 | 33 | 137 |
| 17 | 7 | 76 | 77 | 132 | 158 | 98 | 9 | 143 | 134 |
| 18 | 11 | 127 | 81 | 25 | 104 | 14 | 44 | 59 | 103 |
| 19 | 85 | 39 | 16 | 113 | 20 | 50 | 110 | 65 | 169 |
| 20 | 136 | 20 | 89 | 43 | 115 | 26 | 175 | 116 | 71 |
| 21 | 94 | 48 | 25 | 129 | 121 | 32 | 122 | 2 | 166 |
| 22 | 6 | 64 | 52 | 99 | 127 | 38 | 8 | 172 | 67 |
| 23 | 103 | 34 | 131 | 80 | 133 | 73 | 132 | 88 | 43 |
| 24 | 38 | 15 | 73 | 108 | 139 | 49 | 19 | 138 | 79 |
| 25 | 112 | 66 | 43 | 113 | 144 | 25 | 55 | 145 | 85 |
| 26 | 47 | 116 | 24 | 61 | 150 | 61 | 31 | 151 | 16 |
| 27 | 121 | 75 | 52 | 17 | 156 | 96 | 155 | 66 | 111 |
| 28 | 56 | 79 | 126 | 125 | 162 | 72 | 102 | 42 | 161 |
| 29 | 130 | 95 | 19 | 131 | 78 | 48 | 108 | 167 | 168 |
| 30 | 65 | 135 | 134 | 100 | 173 | 54 | 84 | 39 | 174 |

TABLE 19

| Gr. Idx 3RBs | 16RB | | | | | | 18RB | | | | | | 20RB | | | | | |
|---|---|---|---|---|---|---|---|---|---|---|---|---|---|---|---|---|---|---|
| 1 | 6 | 102 | 70 | 54 | 7 | 159 | 112 | 7 | 6 | 165 | 49 | 147 | 8 | 8 | 7 | 167 | 127 | 87 | 9 | 187 |
| 2 | 76 | 12 | 108 | 140 | 60 | 13 | 119 | 14 | 84 | 154 | 98 | 56 | 13 | 15 | 135 | 95 | 175 | 75 | 16 | 111 |
| 3 | 18 | 114 | 19 | 82 | 66 | 146 | 20 | 126 | 91 | 161 | 21 | 73 | 147 | 23 | 143 | 103 | 24 | 142 | 22 | 71 |
| 4 | 25 | 152 | 120 | 24 | 88 | 168 | 133 | 28 | 168 | 98 | 196 | 80 | 154 | 31 | 150 | 190 | 30 | 32 | 210 | 111 |
| 5 | 30 | 158 | 174 | 69 | 31 | 107 | 34 | 175 | 139 | 33 | 35 | 87 | 203 | 39 | 38 | 158 | 118 | 218 | 198 | 98 |
| 6 | 37 | 132 | 101 | 133 | 180 | 38 | 41 | 146 | 40 | 199 | 182 | 181 | 83 | 46 | 126 | 47 | 45 | 106 | 94 | 206 |
| 7 | 43 | 139 | 107 | 91 | 44 | 170 | 48 | 153 | 118 | 188 | 206 | 47 | 174 | 54 | 174 | 173 | 134 | 53 | 55 | 213 |
| 8 | 49 | 113 | 145 | 50 | 97 | 177 | 54 | 195 | 139 | 181 | 2 | 55 | 53 | 62 | 181 | 221 | 61 | 2 | 141 | 63 |
| 9 | 151 | 103 | 56 | 132 | 183 | 8 | 61 | 202 | 62 | 132 | 114 | 19 | 167 | 69 | 189 | 70 | 149 | 129 | 229 | 10 |
| 10 | 62 | 157 | 189 | 61 | 14 | 125 | 68 | 174 | 209 | 173 | 138 | 121 | 69 | 77 | 197 | 157 | 196 | 76 | 236 | 137 |
| 11 | 68 | 67 | 163 | 20 | 106 | 4 | 75 | 74 | 76 | 5 | 181 | 180 | 159 | 85 | 204 | 5 | 84 | 164 | 25 | 86 |
| 12 | 74 | 169 | 10 | 138 | 170 | 75 | 187 | 152 | 81 | 82 | 166 | 29 | 208 | 92 | 13 | 172 | 33 | 152 | 236 | 212 |
| 13 | 80 | 176 | 81 | 144 | 79 | 16 | 194 | 36 | 141 | 159 | 18 | 89 | 173 | 220 | 180 | 101 | 21 | 100 | 160 | 148 |
| 14 | 86 | 150 | 182 | 87 | 10 | 48 | 95 | 201 | 25 | 96 | 11 | 166 | 180 | 108 | 107 | 109 | 188 | 228 | 48 | 168 |
| 15 | 188 | 93 | 29 | 156 | 92 | 140 | 102 | 208 | 32 | 103 | 172 | 101 | 207 | 116 | 36 | 235 | 115 | 195 | 56 | 68 |
| 16 | 3 | 98 | 162 | 35 | 99 | 51 | 109 | 3 | 179 | 56 | 110 | 39 | 4 | 123 | 203 | 4 | 124 | 44 | 183 | 171 |
| 17 | 105 | 41 | 9 | 104 | 181 | 143 | 116 | 10 | 186 | 115 | 200 | 31 | 45 | 131 | 132 | 130 | 51 | 11 | 191 | 71 |
| 18 | 111 | 47 | 15 | 110 | 175 | 149 | 17 | 175 | 70 | 52 | 193 | 122 | 38 | 19 | 59 | 138 | 139 | 218 | 140 | 79 |
| 19 | 117 | 22 | 181 | 21 | 116 | 53 | 24 | 59 | 130 | 182 | 129 | 45 | 3 | 27 | 147 | 146 | 226 | 206 | 87 | 67 |
| 20 | 28 | 123 | 124 | 171 | 85 | 187 | 136 | 31 | 137 | 135 | 206 | 52 | 66 | 35 | 154 | 234 | 155 | 214 | 75 | 153 |
| 21 | 129 | 34 | 2 | 66 | 130 | 177 | 143 | 37 | 2 | 73 | 142 | 196 | 185 | 162 | 42 | 82 | 43 | 163 | 3 | 102 |
| 22 | 135 | 136 | 59 | 8 | 183 | 21 | 150 | 9 | 149 | 44 | 79 | 97 | 192 | 170 | 169 | 50 | 90 | 110 | 10 | 74 |
| 23 | 142 | 78 | 46 | 94 | 141 | 14 | 16 | 30 | 209 | 157 | 72 | 156 | 158 | 58 | 177 | 18 | 178 | 237 | 98 | 176 |
| 24 | 148 | 52 | 84 | 100 | 147 | 21 | 163 | 93 | 23 | 5 | 58 | 164 | 111 | 185 | 65 | 66 | 105 | 186 | 184 | 26 |
| 25 | 154 | 59 | 90 | 155 | 58 | 11 | 170 | 65 | 171 | 12 | 64 | 128 | 86 | 193 | 113 | 192 | 33 | 194 | 133 | 97 |
| 26 | 33 | 161 | 17 | 122 | 160 | 84 | 177 | 72 | 176 | 178 | 36 | 8 | 71 | 200 | 81 | 121 | 41 | 21 | 201 | 141 |
| 27 | 166 | 39 | 71 | 167 | 103 | 23 | 78 | 183 | 43 | 113 | 15 | 131 | 185 | 208 | 89 | 49 | 209 | 207 | 29 | 128 |
| 28 | 173 | 77 | 45 | 172 | 109 | 125 | 85 | 50 | 138 | 190 | 191 | 64 | 32 | 216 | 96 | 97 | 215 | 217 | 136 | 56 |
| 29 | 115 | 179 | 51 | 131 | 178 | 83 | 92 | 197 | 127 | 57 | 113 | 155 | 198 | 224 | 223 | 104 | 144 | 64 | 164 | 128 |
| 30 | 185 | 89 | 121 | 137 | 184 | 70 | 46 | 99 | 204 | 205 | 162 | 64 | 98 | 232 | 231 | 72 | 112 | 152 | 230 | 52 |

TABLE 20

| Gr. Idx 3RBs | 24RB | | | | | | | | | | 25RB | | | | | | | |
|---|---|---|---|---|---|---|---|---|---|---|---|---|---|---|---|---|---|---|
| 1 | 9 | 151 | 150 | 103 | 80 | 198 | 10 | 8 | 221 | 9 | 10 | 156 | 107 | 205 | 229 | 8 | 68 | 83 |
| 2 | 19 | 207 | 18 | 17 | 159 | 89 | 188 | 75 | 231 | 19 | 165 | 18 | 214 | 92 | 166 | 20 | 239 | 136 |
| 3 | 28 | 27 | 169 | 216 | 122 | 240 | 26 | 98 | 84 | 28 | 175 | 126 | 27 | 248 | 29 | 224 | 102 | 87 |
| 4 | 36 | 37 | 178 | 225 | 35 | 131 | 93 | 249 | 263 | 38 | 184 | 135 | 39 | 136 | 233 | 37 | 111 | 155 |
| 5 | 140 | 45 | 234 | 46 | 187 | 47 | 272 | 188 | 258 | 194 | 48 | 145 | 47 | 243 | 193 | 267 | 242 | 106 |
| 6 | 55 | 196 | 149 | 197 | 243 | 56 | 267 | 54 | 244 | 56 | 203 | 252 | 154 | 130 | 58 | 155 | 174 | 57 |
| 7 | 65 | 205 | 158 | 206 | 253 | 63 | 65 | 252 | 135 | 66 | 213 | 212 | 164 | 262 | 261 | 67 | 286 | 139 |
| 8 | 73 | 214 | 262 | 74 | 72 | 168 | 144 | 215 | 243 | 76 | 222 | 75 | 271 | 173 | 149 | 77 | 2 | 17 |
| 9 | 82 | 223 | 81 | 271 | 177 | 83 | 176 | 153 | 224 | 85 | 231 | 183 | 12 | 86 | 280 | 84 | 281 | 158 |
| 10 | 91 | 280 | 92 | 90 | 186 | 232 | 233 | 21 | 185 | 95 | 241 | 192 | 94 | 168 | 96 | 21 | 290 | 93 |
| 11 | 242 | 195 | 6 | 101 | 99 | 100 | 30 | 44 | 102 | 104 | 250 | 251 | 6 | 202 | 103 | 105 | 31 | 201 |

TABLE 20-continued

| Gr. Idx 3RBs | 24RB | | | | | | | | | | | 25RB | | | | | | |
|---|---|---|---|---|---|---|---|---|---|---|---|---|---|---|---|---|---|---|
| 12 | 109 | 110 | 204 | 39 | 15 | 251 | 111 | 180 | 166 | 113 | 260 | 211 | 16 | 112 | 40 | 114 | 115 | 187 |
| 13 | 119 | 213 | 260 | 24 | 120 | 48 | 118 | 261 | 232 | 123 | 269 | 25 | 270 | 221 | 196 | 220 | 122 | 124 |
| 14 | 128 | 33 | 270 | 34 | 222 | 269 | 127 | 129 | 71 | 132 | 230 | 133 | 131 | 279 | 278 | 34 | 191 | 35 |
| 15 | 137 | 136 | 138 | 278 | 66 | 43 | 231 | 42 | 208 | 288 | 142 | 44 | 239 | 289 | 240 | 143 | 83 | 259 |
| 16 | 146 | 147 | 4 | 145 | 5 | 217 | 240 | 52 | 75 | 5 | 151 | 249 | 54 | 4 | 53 | 34 | 210 | 150 |
| 17 | 155 | 13 | 249 | 61 | 14 | 156 | 154 | 250 | 212 | 161 | 63 | 160 | 162 | 15 | 14 | 102 | 259 | 258 |
| 18 | 164 | 70 | 23 | 259 | 163 | 165 | 22 | 51 | 108 | 170 | 24 | 268 | 23 | 72 | 97 | 73 | 171 | 169 |
| 19 | 174 | 173 | 32 | 79 | 172 | 244 | 268 | 103 | 117 | 180 | 33 | 179 | 82 | 277 | 181 | 253 | 178 | 106 |
| 20 | 41 | 183 | 277 | 182 | 88 | 184 | 253 | 239 | 181 | 189 | 43 | 42 | 287 | 91 | 190 | 188 | 262 | 92 |
| 21 | 192 | 50 | 3 | 191 | 193 | 97 | 262 | 135 | 98 | 198 | 52 | 101 | 199 | 125 | 200 | 197 | 3 | 272 |
| 22 | 201 | 60 | 202 | 12 | 106 | 59 | 200 | 107 | 130 | 208 | 62 | 110 | 281 | 207 | 13 | 209 | 12 | 135 |
| 23 | 210 | 69 | 21 | 209 | 211 | 139 | 68 | 40 | 97 | 218 | 71 | 22 | 120 | 217 | 144 | 216 | 291 | 276 |
| 24 | 219 | 78 | 125 | 77 | 30 | 220 | 31 | 218 | 148 | 227 | 80 | 81 | 129 | 228 | 31 | 32 | 226 | 7 |
| 25 | 87 | 228 | 134 | 86 | 40 | 227 | 39 | 229 | 16 | 237 | 90 | 41 | 139 | 163 | 235 | 138 | 236 | 119 |
| 26 | 96 | 143 | 49 | 237 | 25 | 238 | 236 | 11 | 124 | 99 | 245 | 148 | 246 | 50 | 247 | 100 | 26 | 51 |
| 27 | 247 | 246 | 105 | 58 | 248 | 152 | 190 | 34 | 20 | 255 | 109 | 254 | 158 | 157 | 60 | 256 | 182 | 108 |
| 28 | 256 | 114 | 67 | 161 | 255 | 185 | 257 | 43 | 199 | 265 | 118 | 167 | 266 | 45 | 264 | 69 | 119 | 191 |
| 29 | 264 | 76 | 265 | 123 | 266 | 194 | 124 | 95 | 208 | 274 | 128 | 275 | 127 | 79 | 273 | 201 | 157 | 54 |
| 30 | 274 | 132 | 180 | 85 | 273 | 275 | 133 | 104 | 62 | 284 | 283 | 137 | 186 | 88 | 64 | 282 | 285 | 210 |

In this case, if the maximum number of sequences per each group is predetermined to 5, the grouping can be performed as shown in the following tables 21 and 22. The tables 21 and 22 are also the case when the base sequences are selected by actual cross correlation calculation.

TABLE 21

| Gr. Idx 3RBs | 3RB | 4RB | 5RB | 6RB | 8RB | | 9RB | | 10RB | | |
|---|---|---|---|---|---|---|---|---|---|---|---|
| 1 | 1 | 25 | 2 | 20 | 2 | 3 | 25 | 57 | 4 | 75 | 60 | 79 | 4 |

Correcting above row structure - the table has columns: Gr.Idx 3RBs, 3RB, 4RB, 5RB, 6RB, 8RB (2 cols), 9RB (2 cols), 10RB (2 cols), plus one more.

| Gr. Idx 3RBs | 3RB | 4RB | 5RB | 6RB | 8RB | | 9RB | | 10RB | | |
|---|---|---|---|---|---|---|---|---|---|---|---|
| 1 | 1 | 25 | 2 | 20 | 2 | 3 | 25 | 57 | 4 | 75 | 60 | 79 | 4 |
| 2 | 2 | 3 | 4 | 40 | 33 | 65 | 28 | 7 | 71 | 96 | 64 | 45 | 75 |
| 3 | 3 | 14 | 6 | 7 | 21 | 53 | 9 | 46 | 10 | 37 | 11 | 39 | 86 |
| 4 | 4 | 6 | 47 | 9 | 66 | 56 | 41 | 14 | 85 | 78 | 15 | 71 | 14 |
| 5 | 5 | 39 | 39 | 47 | 54 | 44 | 50 | 71 | 44 | 60 | 56 | 75 | 103 |
| 6 | 6 | 9 | 31 | 61 | 14 | 17 | 84 | 21 | 92 | 85 | 97 | 50 | 67 |
| 7 | 7 | 42 | 33 | 16 | 28 | 20 | 87 | 24 | 51 | 60 | 82 | 63 | 26 |
| 8 | 8 | 12 | 30 | 42 | 54 | 23 | 5 | 28 | 99 | 49 | 67 | 86 | 1 |
| 9 | 9 | 45 | 17 | 68 | 21 | 48 | 85 | 31 | 74 | 58 | 61 | 89 | 78 |
| 10 | 10 | 15 | 19 | 23 | 5 | 73 | 29 | 106 | 70 | 34 | 93 | 112 | 36 |
| 11 | 11 | 1 | 21 | 11 | 25 | 32 | 2 | 38 | 102 | 11 | 40 | 78 | 12 |
| 12 | 12 | 37 | 23 | 51 | 63 | 79 | 64 | 95 | 77 | 41 | 72 | 44 | 100 |
| 13 | 13 | 4 | 5 | 6 | 30 | 67 | 37 | 45 | 9 | 18 | 104 | 47 | 85 |
| 14 | 14 | 21 | 7 | 32 | 22 | 40 | 58 | 102 | 84 | 48 | 51 | 6 | 23 |
| 15 | 15 | 23 | 58 | 58 | 34 | 43 | 61 | 105 | 16 | 25 | 17 | 111 | 83 |
| 16 | 16 | 24 | 1 | 13 | 65 | 46 | 28 | 91 | 2 | 82 | 96 | 2 | 30 |
| 17 | 17 | 26 | 52 | 39 | 49 | 31 | 49 | 23 | 59 | 16 | 62 | 107 | 90 |
| 18 | 18 | 43 | 54 | 65 | 41 | 22 | 52 | 62 | 98 | 89 | 9 | 66 | 28 |
| 19 | 19 | 29 | 36 | 8 | 20 | 10 | 25 | 30 | 12 | 87 | 41 | 24 | 70 |
| 20 | 20 | 46 | 38 | 46 | 60 | 87 | 57 | 69 | 5 | 96 | 73 | 35 | 101 |
| 21 | 21 | 32 | 40 | 48 | 66 | 16 | 60 | 1 | 37 | 73 | 20 | 1 | 39 |
| 22 | 22 | 2 | 42 | 3 | 50 | 41 | 78 | 76 | 49 | 33 | 52 | 24 | 35 |
| 23 | 23 | 35 | 29 | 29 | 17 | 66 | 55 | 79 | 8 | 58 | 46 | 27 | 112 |
| 24 | 24 | 5 | 26 | 55 | 43 | 69 | 2 | 83 | 56 | 47 | 31 | 12 | 88 |
| 25 | 25 | 38 | 28 | 10 | 57 | 72 | 27 | 15 | 65 | 86 | 63 | 46 | 16 |
| 26 | 26 | 8 | 20 | 24 | 17 | 45 | 75 | 63 | 54 | 90 | 95 | 57 | 38 |
| 27 | 27 | 41 | 22 | 62 | 44 | 33 | 48 | 93 | 22 | 29 | 23 | 98 | 42 |
| 28 | 28 | 33 | 53 | 64 | 50 | 36 | 80 | 61 | 97 | 70 | 102 | 57 | 74 |
| 29 | 29 | 44 | 8 | 31 | 38 | 24 | 39 | 100 | 39 | 11 | 49 | 68 | 106 |
| 30 | 30 | 22 | 55 | 69 | 51 | 86 | 64 | 50 | 103 | 18 | 34 | 109 | 81 |

| Gr. Idx 3RBs | 12RB | | | | 15RB | | | |
|---|---|---|---|---|---|---|---|---|
| 1 | 74 | 51 | 4 | 5 | 6 | 95 | 140 | 125 | 5 |
| 2 | 9 | 120 | 44 | 8 | 101 | 71 | 131 | 12 | 11 |
| 3 | 83 | 13 | 14 | 48 | 17 | 107 | 77 | 18 | 62 |
| 4 | 18 | 122 | 87 | 129 | 23 | 83 | 113 | 68 | 24 |
| 5 | 92 | 23 | 115 | 78 | 29 | 118 | 148 | 28 | 163 |
| 6 | 27 | 96 | 131 | 73 | 35 | 154 | 124 | 34 | 94 |
| 7 | 101 | 124 | 32 | 66 | 40 | 130 | 160 | 41 | 100 |
| 8 | 36 | 105 | 8 | 59 | 46 | 136 | 106 | 47 | 91 |
| 9 | 133 | 110 | 41 | 75 | 52 | 141 | 171 | 142 | 7 |

TABLE 21-continued

| | | | | | | | | |
|---|---|---|---|---|---|---|---|---|
| 10 | 45 | 114 | 91 | 17 | 58 | 147 | 57 | 177 | 13 |
| 11 | 119 | 3 | 50 | 77 | 64 | 153 | 4 | 63 | 19 |
| 12 | 54 | 100 | 123 | 26 | 69 | 159 | 129 | 114 | 10 |
| 13 | 12 | 58 | 128 | 114 | 75 | 165 | 135 | 120 | 76 |
| 14 | 63 | 132 | 7 | 35 | 81 | 21 | 170 | 36 | 80 |
| 15 | 67 | 137 | 21 | 68 | 86 | 27 | 176 | 146 | 42 |
| 16 | 2 | 118 | 71 | 16 | 93 | 152 | 3 | 33 | 137 |
| 17 | 7 | 76 | 77 | 132 | 158 | 98 | 9 | 143 | 134 |
| 18 | 11 | 127 | 81 | 25 | 104 | 14 | 44 | 59 | 103 |
| 19 | 85 | 39 | 16 | 113 | 20 | 50 | 110 | 65 | 169 |
| 20 | 136 | 20 | 89 | 43 | 115 | 26 | 175 | 116 | 71 |
| 21 | 94 | 48 | 25 | 129 | 121 | 32 | 122 | 2 | 166 |
| 22 | 6 | 64 | 52 | 99 | 127 | 38 | 8 | 172 | 67 |
| 23 | 103 | 34 | 131 | 80 | 133 | 73 | 132 | 88 | 43 |
| 24 | 38 | 15 | 73 | 108 | 139 | 49 | 19 | 138 | 79 |
| 25 | 112 | 66 | 43 | 113 | 144 | 25 | 55 | 145 | 85 |
| 26 | 47 | 116 | 24 | 61 | 150 | 61 | 31 | 151 | 16 |
| 27 | 121 | 75 | 52 | 17 | 156 | 96 | 155 | 66 | 111 |
| 28 | 56 | 79 | 126 | 125 | 162 | 72 | 102 | 42 | 161 |
| 29 | 130 | 95 | 19 | 131 | 78 | 48 | 108 | 167 | 168 |
| 30 | 65 | 135 | 134 | 100 | 173 | 54 | 84 | 39 | 174 |

TABLE 22

| Gr. Idx 3RBs | 16RB | | | | 18RB | | | | 20RB | | | |
|---|---|---|---|---|---|---|---|---|---|---|---|---|
| 1 | 6 | 102 | 70 | 54 | 7 | 112 | 7 | 6 | 165 | 49 | 8 | 7 | 167 | 127 | 87 |
| 2 | 76 | 12 | 108 | 140 | 60 | 119 | 14 | 84 | 154 | 98 | 15 | 135 | 95 | 175 | 75 |
| 3 | 18 | 114 | 19 | 82 | 66 | 20 | 126 | 91 | 161 | 21 | 23 | 143 | 103 | 24 | 142 |
| 4 | 25 | 152 | 120 | 24 | 88 | 133 | 28 | 168 | 98 | 196 | 31 | 150 | 190 | 30 | 32 |
| 5 | 30 | 158 | 174 | 69 | 31 | 34 | 175 | 139 | 33 | 35 | 39 | 38 | 158 | 118 | 218 |
| 6 | 37 | 132 | 101 | 133 | 180 | 41 | 146 | 40 | 199 | 182 | 46 | 126 | 47 | 45 | 106 |
| 7 | 43 | 139 | 107 | 91 | 44 | 48 | 153 | 118 | 188 | 206 | 54 | 174 | 173 | 134 | 53 |
| 8 | 49 | 113 | 145 | 50 | 97 | 54 | 195 | 139 | 181 | 2 | 62 | 181 | 221 | 61 | 2 |
| 9 | 151 | 103 | 56 | 132 | 183 | 61 | 202 | 62 | 132 | 114 | 69 | 189 | 70 | 149 | 129 |
| 10 | 62 | 157 | 189 | 61 | 14 | 68 | 174 | 209 | 173 | 138 | 77 | 197 | 157 | 196 | 76 |
| 11 | 68 | 67 | 163 | 20 | 106 | 75 | 74 | 76 | 5 | 181 | 85 | 204 | 5 | 84 | 164 |
| 12 | 74 | 169 | 10 | 138 | 170 | 187 | 152 | 81 | 82 | 166 | 92 | 13 | 172 | 33 | 152 |
| 13 | 80 | 176 | 81 | 144 | 79 | 194 | 36 | 141 | 159 | 18 | 220 | 180 | 101 | 21 | 100 |
| 14 | 86 | 150 | 182 | 87 | 10 | 95 | 201 | 25 | 96 | 11 | 108 | 107 | 109 | 188 | 228 |
| 15 | 188 | 93 | 29 | 156 | 92 | 102 | 208 | 32 | 103 | 172 | 116 | 36 | 235 | 115 | 195 |
| 16 | 3 | 98 | 162 | 35 | 99 | 109 | 3 | 179 | 56 | 110 | 123 | 203 | 4 | 124 | 44 |
| 17 | 105 | 41 | 9 | 104 | 181 | 116 | 10 | 186 | 115 | 200 | 131 | 132 | 130 | 51 | 11 |
| 18 | 111 | 47 | 15 | 110 | 175 | 17 | 175 | 70 | 52 | 193 | 19 | 59 | 138 | 139 | 218 |
| 19 | 117 | 22 | 181 | 21 | 116 | 24 | 59 | 130 | 182 | 129 | 27 | 147 | 146 | 226 | 206 |
| 20 | 28 | 123 | 124 | 171 | 85 | 136 | 31 | 137 | 135 | 206 | 35 | 154 | 234 | 155 | 214 |
| 21 | 129 | 34 | 2 | 66 | 130 | 143 | 37 | 2 | 73 | 142 | 162 | 42 | 82 | 43 | 163 |
| 22 | 135 | 136 | 59 | 8 | 183 | 150 | 9 | 149 | 44 | 79 | 170 | 169 | 50 | 90 | 110 |
| 23 | 142 | 78 | 46 | 94 | 141 | 16 | 30 | 209 | 157 | 72 | 58 | 177 | 18 | 178 | 237 |
| 24 | 148 | 52 | 84 | 100 | 147 | 163 | 93 | 23 | 5 | 58 | 185 | 65 | 66 | 105 | 186 |
| 25 | 154 | 59 | 90 | 155 | 58 | 170 | 65 | 171 | 12 | 64 | 193 | 113 | 192 | 33 | 194 |
| 26 | 33 | 161 | 17 | 122 | 160 | 177 | 72 | 176 | 178 | 36 | 200 | 81 | 121 | 41 | 21 |
| 27 | 166 | 39 | 71 | 167 | 103 | 78 | 183 | 43 | 113 | 15 | 208 | 89 | 49 | 209 | 207 |
| 28 | 173 | 77 | 45 | 172 | 109 | 85 | 50 | 138 | 190 | 191 | 216 | 96 | 97 | 215 | 217 |
| 29 | 115 | 179 | 51 | 131 | 178 | 92 | 197 | 127 | 57 | 113 | 224 | 223 | 104 | 144 | 64 |
| 30 | 185 | 89 | 121 | 137 | 184 | 46 | 99 | 204 | 205 | 162 | 232 | 231 | 72 | 112 | 152 |

| Gr. Idx 3RBs | 24RB | | | | | 25RBs | | | | |
|---|---|---|---|---|---|---|---|---|---|---|
| 1 | 9 | 151 | 150 | 103 | 80 | 9 | 10 | 156 | 107 | 205 |
| 2 | 19 | 207 | 18 | 17 | 159 | 19 | 165 | 18 | 214 | 92 |
| 3 | 28 | 27 | 169 | 216 | 122 | 28 | 175 | 126 | 27 | 248 |
| 4 | 36 | 37 | 178 | 225 | 35 | 38 | 184 | 135 | 39 | 136 |
| 5 | 140 | 45 | 234 | 46 | 187 | 194 | 48 | 145 | 47 | 243 |
| 6 | 55 | 196 | 149 | 197 | 243 | 56 | 203 | 252 | 154 | 130 |
| 7 | 64 | 205 | 158 | 206 | 253 | 66 | 213 | 212 | 164 | 262 |
| 8 | 73 | 214 | 262 | 74 | 72 | 76 | 222 | 75 | 271 | 173 |
| 9 | 82 | 223 | 81 | 271 | 177 | 85 | 231 | 183 | 12 | 86 |
| 10 | 91 | 280 | 92 | 90 | 186 | 95 | 241 | 192 | 94 | 168 |
| 11 | 242 | 195 | 6 | 101 | 99 | 104 | 250 | 251 | 6 | 202 |
| 12 | 109 | 110 | 204 | 39 | 15 | 113 | 260 | 211 | 16 | 112 |
| 13 | 119 | 213 | 260 | 24 | 120 | 123 | 269 | 25 | 270 | 221 |
| 14 | 128 | 33 | 270 | 34 | 222 | 132 | 230 | 133 | 131 | 279 |
| 15 | 137 | 136 | 138 | 278 | 66 | 288 | 142 | 44 | 239 | 289 |
| 16 | 146 | 147 | 4 | 145 | 5 | 5 | 151 | 249 | 54 | 4 |
| 17 | 155 | 13 | 249 | 61 | 14 | 161 | 63 | 160 | 162 | 15 |

TABLE 22-continued

| | | | | | | | | | | |
|---|---|---|---|---|---|---|---|---|---|---|
| 18 | 164 | 70 | 23 | 259 | 163 | 170 | 24 | 268 | 23 | 72 |
| 19 | 174 | 173 | 32 | 79 | 172 | 180 | 33 | 179 | 82 | 277 |
| 20 | 41 | 183 | 277 | 182 | 88 | 189 | 43 | 42 | 287 | 91 |
| 21 | 192 | 50 | 3 | 191 | 193 | 198 | 52 | 101 | 199 | 125 |
| 22 | 201 | 60 | 202 | 12 | 106 | 208 | 62 | 110 | 281 | 207 |
| 23 | 210 | 69 | 21 | 209 | 211 | 218 | 71 | 22 | 120 | 217 |
| 24 | 219 | 78 | 125 | 77 | 30 | 227 | 80 | 81 | 129 | 228 |
| 25 | 87 | 228 | 134 | 86 | 40 | 237 | 90 | 41 | 139 | 163 |
| 26 | 96 | 143 | 49 | 237 | 25 | 99 | 245 | 148 | 246 | 50 |
| 27 | 247 | 246 | 105 | 58 | 248 | 255 | 109 | 254 | 158 | 157 |
| 28 | 256 | 114 | 67 | 161 | 255 | 265 | 118 | 167 | 266 | 45 |
| 29 | 264 | 76 | 265 | 123 | 266 | 274 | 128 | 275 | 127 | 79 |
| 30 | 274 | 132 | 180 | 85 | 273 | 284 | 283 | 137 | 186 | 88 |

In another example, if the maximum number of sequences per each group is predetermined to 4, the grouping can be performed as shown in the following tables 23 and 24. The tables 23 and 24 are also the case when the base sequences are selected by actual Cross correlation calculation.

TABLE 23

| Gr. Idx 3RBs | 3RB | 4RB | 5RB | 6RB | | 8RB | | 9RB | | 10RB | | | 12RB | | | 15RB | | |
|---|---|---|---|---|---|---|---|---|---|---|---|---|---|---|---|---|---|---|
| 1 | 1 | 25 | 2 | 20 | 2 | 3 | 25 | 57 | 4 | 75 | 60 | 79 | 4 | 74 | 51 | 4 | 5 | 6 | 95 | 140 | 125 |
| 2 | 2 | 3 | 4 | 40 | 33 | 65 | 28 | 7 | 71 | 96 | 64 | 45 | 75 | 9 | 120 | 44 | 8 | 101 | 71 | 131 | 12 |
| 3 | 3 | 14 | 6 | 7 | 21 | 53 | 9 | 46 | 10 | 37 | 11 | 39 | 86 | 83 | 13 | 14 | 48 | 17 | 107 | 77 | 18 |
| 4 | 4 | 6 | 47 | 9 | 66 | 56 | 41 | 14 | 85 | 78 | 15 | 71 | 14 | 18 | 122 | 87 | 129 | 23 | 83 | 113 | 68 |
| 5 | 5 | 39 | 39 | 47 | 54 | 44 | 50 | 71 | 44 | 60 | 56 | 75 | 103 | 92 | 23 | 115 | 78 | 29 | 118 | 148 | 28 |
| 6 | 6 | 9 | 31 | 61 | 14 | 17 | 84 | 21 | 92 | 85 | 97 | 50 | 67 | 27 | 96 | 131 | 73 | 35 | 154 | 124 | 34 |
| 7 | 7 | 42 | 33 | 16 | 28 | 20 | 87 | 24 | 51 | 60 | 82 | 63 | 26 | 101 | 124 | 32 | 66 | 40 | 130 | 160 | 41 |
| 8 | 8 | 12 | 30 | 42 | 54 | 23 | 5 | 28 | 99 | 49 | 67 | 86 | 1 | 36 | 105 | 8 | 59 | 46 | 136 | 106 | 47 |
| 9 | 9 | 45 | 17 | 68 | 21 | 48 | 85 | 31 | 74 | 58 | 61 | 89 | 78 | 133 | 110 | 41 | 75 | 52 | 141 | 171 | 142 |
| 10 | 10 | 15 | 19 | 23 | 5 | 73 | 29 | 106 | 70 | 34 | 93 | 112 | 36 | 45 | 114 | 91 | 17 | 58 | 147 | 57 | 177 |
| 11 | 11 | 1 | 21 | 11 | 25 | 32 | 2 | 38 | 102 | 11 | 40 | 78 | 12 | 119 | 3 | 50 | 77 | 64 | 153 | 4 | 63 |
| 12 | 12 | 37 | 23 | 51 | 63 | 79 | 64 | 95 | 77 | 41 | 72 | 44 | 100 | 54 | 100 | 123 | 26 | 69 | 159 | 129 | 114 |
| 13 | 13 | 4 | 5 | 6 | 30 | 67 | 37 | 45 | 9 | 18 | 104 | 47 | 85 | 12 | 58 | 128 | 114 | 75 | 165 | 135 | 120 |
| 14 | 14 | 21 | 7 | 32 | 22 | 40 | 58 | 102 | 84 | 48 | 51 | 6 | 23 | 63 | 132 | 7 | 35 | 81 | 21 | 170 | 36 |
| 15 | 15 | 23 | 58 | 58 | 34 | 43 | 61 | 105 | 16 | 25 | 17 | 111 | 83 | 67 | 137 | 21 | 68 | 86 | 27 | 176 | 146 |
| 16 | 16 | 24 | 1 | 13 | 65 | 46 | 28 | 91 | 2 | 82 | 96 | 2 | 30 | 2 | 118 | 71 | 16 | 93 | 152 | 3 | 33 |
| 17 | 17 | 26 | 52 | 39 | 49 | 31 | 49 | 23 | 59 | 16 | 62 | 107 | 90 | 7 | 76 | 77 | 132 | 158 | 98 | 9 | 143 |
| 18 | 18 | 43 | 54 | 65 | 41 | 22 | 52 | 62 | 98 | 89 | 9 | 66 | 28 | 11 | 127 | 81 | 25 | 104 | 14 | 44 | 59 |
| 19 | 19 | 29 | 36 | 8 | 20 | 10 | 25 | 30 | 12 | 87 | 41 | 24 | 70 | 85 | 39 | 16 | 113 | 20 | 50 | 110 | 65 |
| 20 | 20 | 46 | 38 | 46 | 60 | 87 | 57 | 69 | 5 | 96 | 73 | 35 | 101 | 136 | 20 | 89 | 43 | 115 | 26 | 175 | 116 |
| 21 | 21 | 32 | 40 | 48 | 66 | 16 | 60 | 1 | 37 | 73 | 20 | 1 | 39 | 94 | 48 | 25 | 129 | 121 | 32 | 122 | 2 |
| 22 | 22 | 2 | 42 | 3 | 50 | 41 | 78 | 76 | 49 | 33 | 52 | 24 | 35 | 6 | 64 | 52 | 99 | 127 | 38 | 8 | 172 |
| 23 | 23 | 35 | 29 | 29 | 17 | 66 | 55 | 79 | 8 | 58 | 46 | 27 | 112 | 103 | 34 | 131 | 80 | 133 | 73 | 132 | 88 |
| 24 | 24 | 5 | 26 | 55 | 43 | 69 | 2 | 83 | 56 | 47 | 31 | 12 | 88 | 38 | 15 | 73 | 108 | 139 | 49 | 19 | 138 |
| 25 | 25 | 38 | 28 | 10 | 57 | 72 | 27 | 15 | 65 | 86 | 63 | 46 | 16 | 112 | 66 | 43 | 113 | 144 | 25 | 55 | 145 |
| 26 | 26 | 8 | 20 | 24 | 17 | 45 | 75 | 63 | 54 | 90 | 95 | 57 | 38 | 47 | 116 | 24 | 61 | 150 | 61 | 31 | 151 |
| 27 | 27 | 41 | 22 | 62 | 44 | 33 | 48 | 93 | 22 | 29 | 23 | 98 | 42 | 121 | 75 | 52 | 17 | 156 | 96 | 155 | 66 |
| 28 | 28 | 33 | 53 | 64 | 50 | 36 | 80 | 61 | 97 | 70 | 102 | 57 | 74 | 56 | 79 | 126 | 125 | 162 | 72 | 102 | 42 |
| 29 | 29 | 44 | 8 | 31 | 38 | 24 | 39 | 100 | 36 | 11 | 49 | 68 | 106 | 130 | 95 | 19 | 131 | 78 | 48 | 180 | 167 |
| 30 | 30 | 22 | 55 | 69 | 51 | 86 | 64 | 50 | 103 | 18 | 34 | 109 | 81 | 65 | 135 | 134 | 100 | 173 | 54 | 84 | 39 |

TABLE 24

| Gr. Idx 3RBs | 3RB | | | | 18RB | | | | 20RB | | | | 24RB | | | 25RBs | | |
|---|---|---|---|---|---|---|---|---|---|---|---|---|---|---|---|---|---|---|
| 1 | 6 | 102 | 70 | 54 | 112 | 7 | 6 | 165 | 8 | 7 | 167 | 127 | 9 | 151 | 150 | 103 | 9 | 10 | 156 | 107 |
| 2 | 76 | 12 | 108 | 140 | 119 | 14 | 84 | 154 | 15 | 135 | 95 | 175 | 19 | 207 | 18 | 17 | 19 | 165 | 18 | 214 |
| 3 | 18 | 114 | 19 | 82 | 20 | 126 | 91 | 161 | 23 | 143 | 103 | 24 | 28 | 27 | 169 | 216 | 28 | 175 | 126 | 27 |
| 4 | 25 | 152 | 120 | 24 | 133 | 28 | 168 | 98 | 31 | 150 | 190 | 30 | 36 | 37 | 178 | 225 | 38 | 184 | 135 | 39 |
| 5 | 30 | 158 | 174 | 69 | 34 | 175 | 139 | 33 | 39 | 38 | 158 | 118 | 140 | 45 | 234 | 46 | 194 | 48 | 145 | 47 |
| 6 | 37 | 132 | 101 | 133 | 41 | 146 | 40 | 199 | 46 | 126 | 47 | 45 | 55 | 196 | 149 | 197 | 56 | 203 | 252 | 154 |
| 7 | 43 | 139 | 107 | 91 | 48 | 153 | 118 | 188 | 54 | 174 | 173 | 134 | 64 | 205 | 158 | 206 | 66 | 213 | 212 | 164 |
| 8 | 49 | 113 | 145 | 50 | 54 | 195 | 139 | 181 | 62 | 181 | 221 | 61 | 73 | 214 | 262 | 74 | 76 | 222 | 75 | 271 |
| 9 | 151 | 103 | 56 | 132 | 61 | 202 | 62 | 132 | 69 | 189 | 70 | 149 | 82 | 223 | 81 | 271 | 85 | 231 | 183 | 12 |
| 10 | 62 | 157 | 189 | 61 | 68 | 174 | 209 | 173 | 77 | 197 | 157 | 196 | 91 | 280 | 92 | 90 | 95 | 241 | 192 | 94 |
| 11 | 68 | 67 | 163 | 20 | 75 | 74 | 76 | 5 | 85 | 204 | 5 | 84 | 242 | 195 | 6 | 101 | 104 | 250 | 251 | 6 |
| 12 | 74 | 169 | 10 | 138 | 187 | 152 | 81 | 82 | 92 | 13 | 172 | 33 | 109 | 110 | 204 | 39 | 113 | 260 | 211 | 16 |
| 13 | 80 | 176 | 81 | 144 | 194 | 36 | 141 | 159 | 220 | 180 | 101 | 21 | 119 | 213 | 260 | 24 | 123 | 269 | 25 | 270 |

TABLE 24-continued

| Gr. Idx 3RBs | 3RB | | | 18RB | | | | 20RB | | | | 24RB | | | | 25RBs | | | | |
|---|---|---|---|---|---|---|---|---|---|---|---|---|---|---|---|---|---|---|---|
| 14 | 86 | 150 | 182 | 87 | 95 | 201 | 25 | 96 | 108 | 107 | 109 | 188 | 128 | 33 | 270 | 34 | 132 | 230 | 133 | 131 |
| 15 | 188 | 93 | 29 | 156 | 102 | 208 | 32 | 103 | 116 | 36 | 235 | 115 | 137 | 136 | 138 | 278 | 288 | 142 | 44 | 239 |
| 16 | 3 | 98 | 162 | 35 | 109 | 3 | 179 | 56 | 123 | 203 | 4 | 124 | 146 | 147 | 4 | 145 | 5 | 151 | 249 | 54 |
| 17 | 105 | 41 | 9 | 104 | 116 | 10 | 186 | 115 | 131 | 132 | 130 | 51 | 155 | 13 | 249 | 61 | 161 | 63 | 160 | 162 |
| 18 | 111 | 47 | 15 | 110 | 17 | 175 | 70 | 52 | 19 | 59 | 138 | 139 | 164 | 70 | 23 | 259 | 170 | 24 | 268 | 23 |
| 19 | 117 | 22 | 181 | 21 | 24 | 59 | 130 | 182 | 27 | 147 | 146 | 226 | 174 | 173 | 32 | 79 | 180 | 33 | 179 | 82 |
| 20 | 28 | 123 | 124 | 171 | 136 | 31 | 137 | 135 | 35 | 154 | 234 | 155 | 41 | 183 | 277 | 182 | 189 | 43 | 42 | 287 |
| 21 | 129 | 34 | 2 | 66 | 143 | 37 | 2 | 73 | 162 | 42 | 82 | 43 | 192 | 50 | 3 | 191 | 198 | 52 | 101 | 199 |
| 22 | 135 | 136 | 59 | 8 | 150 | 9 | 149 | 44 | 170 | 169 | 50 | 90 | 201 | 60 | 202 | 12 | 208 | 62 | 110 | 281 |
| 23 | 142 | 78 | 46 | 94 | 16 | 30 | 209 | 157 | 58 | 177 | 18 | 178 | 210 | 69 | 21 | 209 | 218 | 71 | 22 | 120 |
| 24 | 148 | 52 | 84 | 100 | 163 | 93 | 23 | 5 | 185 | 65 | 66 | 105 | 219 | 78 | 125 | 77 | 227 | 80 | 81 | 129 |
| 25 | 154 | 59 | 90 | 155 | 170 | 65 | 171 | 12 | 193 | 113 | 192 | 33 | 87 | 228 | 134 | 86 | 237 | 90 | 41 | 139 |
| 26 | 33 | 161 | 17 | 122 | 177 | 72 | 176 | 178 | 200 | 81 | 121 | 41 | 96 | 143 | 49 | 237 | 99 | 245 | 148 | 246 |
| 27 | 166 | 39 | 71 | 167 | 78 | 183 | 43 | 113 | 208 | 89 | 49 | 209 | 247 | 246 | 105 | 58 | 255 | 109 | 254 | 158 |
| 28 | 173 | 77 | 45 | 172 | 85 | 50 | 138 | 190 | 216 | 96 | 97 | 215 | 256 | 114 | 67 | 161 | 265 | 118 | 167 | 266 |
| 29 | 115 | 179 | 51 | 131 | 92 | 197 | 127 | 57 | 224 | 223 | 104 | 144 | 264 | 76 | 265 | 123 | 274 | 128 | 275 | 127 |
| 30 | 185 | 89 | 121 | 137 | 46 | 99 | 204 | 205 | 232 | 231 | 72 | 112 | 274 | 132 | 180 | 85 | 284 | 283 | 137 | 186 |

In another example, if the maximum number of sequences per each group is predetermined to 3, the grouping can be performed as shown in the following tables 25 and 26. The tables 25 and 26 are also the case when the base sequences are selected by actual cross correlation calculation.

TABLE 25

| Gr. Idx 3RBs | 3RB | 4RB | 5RB | 6RB | | 8RB | | 9RB | | | 10RB | | |
|---|---|---|---|---|---|---|---|---|---|---|---|---|---|
| 1 | 1 | 25 | 2 | 20 | 2 | 3 | 25 | 57 | 4 | 75 | 60 | 79 | 4 |
| 2 | 2 | 3 | 4 | 40 | 33 | 65 | 28 | 7 | 71 | 96 | 64 | 45 | 75 |
| 3 | 3 | 14 | 6 | 7 | 21 | 53 | 9 | 46 | 10 | 37 | 11 | 39 | 86 |
| 4 | 4 | 6 | 47 | 9 | 66 | 56 | 41 | 14 | 85 | 78 | 15 | 71 | 14 |
| 5 | 5 | 39 | 39 | 47 | 54 | 44 | 50 | 71 | 44 | 60 | 56 | 75 | 103 |
| 6 | 6 | 9 | 31 | 61 | 14 | 17 | 84 | 21 | 92 | 85 | 97 | 50 | 67 |
| 7 | 7 | 42 | 33 | 16 | 28 | 20 | 87 | 24 | 51 | 60 | 82 | 63 | 26 |
| 8 | 8 | 12 | 30 | 42 | 54 | 23 | 5 | 28 | 99 | 49 | 67 | 86 | 1 |
| 9 | 9 | 45 | 17 | 68 | 21 | 48 | 85 | 31 | 74 | 58 | 61 | 89 | 78 |
| 10 | 10 | 15 | 19 | 23 | 5 | 73 | 29 | 106 | 70 | 34 | 93 | 112 | 36 |
| 11 | 11 | 1 | 21 | 11 | 25 | 32 | 2 | 38 | 102 | 11 | 40 | 78 | 12 |
| 12 | 12 | 37 | 23 | 51 | 63 | 79 | 64 | 95 | 77 | 41 | 72 | 44 | 100 |
| 13 | 13 | 4 | 5 | 6 | 30 | 67 | 37 | 45 | 9 | 18 | 104 | 47 | 85 |
| 14 | 14 | 21 | 7 | 32 | 22 | 40 | 58 | 102 | 84 | 48 | 51 | 6 | 23 |
| 15 | 15 | 23 | 58 | 58 | 34 | 43 | 61 | 105 | 16 | 25 | 17 | 111 | 83 |
| 16 | 16 | 24 | 1 | 13 | 65 | 46 | 28 | 91 | 2 | 82 | 96 | 2 | 30 |
| 17 | 17 | 26 | 52 | 39 | 49 | 31 | 49 | 23 | 59 | 16 | 62 | 107 | 90 |
| 18 | 18 | 43 | 54 | 65 | 41 | 22 | 52 | 62 | 98 | 89 | 9 | 66 | 28 |
| 19 | 19 | 29 | 36 | 8 | 20 | 10 | 25 | 30 | 12 | 87 | 41 | 24 | 70 |
| 20 | 20 | 46 | 38 | 46 | 60 | 87 | 57 | 69 | 5 | 96 | 73 | 35 | 101 |
| 21 | 21 | 32 | 40 | 48 | 66 | 16 | 60 | 1 | 37 | 73 | 20 | 1 | 39 |
| 22 | 22 | 2 | 42 | 3 | 50 | 41 | 78 | 76 | 49 | 33 | 52 | 24 | 35 |
| 23 | 23 | 35 | 29 | 29 | 17 | 66 | 55 | 79 | 8 | 58 | 46 | 27 | 112 |
| 24 | 24 | 5 | 26 | 55 | 43 | 69 | 2 | 83 | 56 | 47 | 31 | 12 | 88 |
| 25 | 25 | 38 | 28 | 10 | 57 | 72 | 27 | 15 | 65 | 86 | 63 | 46 | 16 |
| 26 | 26 | 8 | 20 | 24 | 17 | 45 | 75 | 63 | 54 | 90 | 95 | 57 | 38 |
| 27 | 27 | 41 | 22 | 62 | 44 | 33 | 48 | 93 | 22 | 29 | 23 | 98 | 42 |
| 28 | 28 | 33 | 53 | 64 | 50 | 36 | 80 | 61 | 97 | 70 | 102 | 57 | 74 |
| 29 | 29 | 44 | 8 | 31 | 38 | 24 | 39 | 100 | 36 | 11 | 49 | 68 | 106 |
| 30 | 30 | 22 | 55 | 69 | 51 | 86 | 64 | 50 | 103 | 18 | 34 | 109 | 81 |

| Gr. Idx 3RBs | 12RB | | | 15RB | | | 16RB | | |
|---|---|---|---|---|---|---|---|---|---|
| 1 | 74 | 51 | 4 | 6 | 95 | 140 | 6 | 102 | 70 |
| 2 | 9 | 120 | 44 | 101 | 71 | 131 | 76 | 12 | 108 |
| 3 | 83 | 13 | 14 | 17 | 107 | 77 | 18 | 114 | 19 |
| 4 | 18 | 122 | 87 | 23 | 83 | 113 | 25 | 152 | 120 |
| 5 | 92 | 23 | 115 | 29 | 118 | 148 | 30 | 158 | 174 |
| 6 | 27 | 96 | 131 | 35 | 154 | 124 | 37 | 132 | 101 |
| 7 | 101 | 124 | 32 | 40 | 130 | 160 | 43 | 139 | 107 |
| 8 | 36 | 105 | 8 | 46 | 136 | 106 | 49 | 113 | 145 |
| 9 | 133 | 110 | 41 | 52 | 141 | 171 | 151 | 103 | 56 |
| 10 | 45 | 114 | 91 | 58 | 147 | 57 | 62 | 157 | 189 |

TABLE 25-continued

|  |  |  |  |  |  |  |  |  |
|---|---|---|---|---|---|---|---|---|
| 11 | 119 | 3 | 50 | 64 | 153 | 4 | 68 | 67 | 163 |
| 12 | 54 | 100 | 123 | 69 | 159 | 129 | 74 | 169 | 10 |
| 13 | 12 | 58 | 128 | 75 | 165 | 135 | 80 | 176 | 81 |
| 14 | 63 | 132 | 7 | 81 | 21 | 170 | 86 | 150 | 182 |
| 15 | 67 | 137 | 21 | 86 | 27 | 176 | 188 | 93 | 29 |
| 16 | 2 | 118 | 71 | 93 | 152 | 3 | 3 | 98 | 162 |
| 17 | 7 | 76 | 77 | 158 | 98 | 9 | 105 | 41 | 9 |
| 18 | 11 | 127 | 81 | 104 | 14 | 44 | 111 | 47 | 15 |
| 19 | 85 | 39 | 16 | 20 | 50 | 110 | 117 | 22 | 181 |
| 20 | 136 | 20 | 89 | 115 | 26 | 175 | 28 | 123 | 124 |
| 21 | 94 | 48 | 25 | 121 | 32 | 122 | 129 | 34 | 2 |
| 22 | 6 | 64 | 52 | 127 | 38 | 8 | 135 | 136 | 59 |
| 23 | 103 | 34 | 131 | 133 | 73 | 132 | 142 | 78 | 46 |
| 24 | 38 | 15 | 73 | 139 | 49 | 19 | 148 | 52 | 84 |
| 25 | 112 | 66 | 43 | 144 | 25 | 55 | 154 | 59 | 90 |
| 26 | 47 | 116 | 24 | 150 | 61 | 31 | 33 | 161 | 17 |
| 27 | 121 | 75 | 52 | 156 | 96 | 155 | 166 | 39 | 71 |
| 28 | 56 | 79 | 126 | 162 | 72 | 102 | 173 | 77 | 45 |
| 29 | 130 | 95 | 19 | 78 | 48 | 108 | 115 | 179 | 51 |
| 30 | 65 | 135 | 134 | 173 | 54 | 84 | 185 | 89 | 121 |

TABLE 26

| Gr. Idx 3RBs | 18RB | | | 20RB | | | 24RB | | | 25RB | | |
|---|---|---|---|---|---|---|---|---|---|---|---|---|
| 1 | 112 | 7 | 6 | 8 | 7 | 167 | 9 | 151 | 150 | 9 | 10 | 156 |
| 2 | 119 | 14 | 84 | 15 | 135 | 95 | 19 | 207 | 18 | 19 | 165 | 18 |
| 3 | 20 | 126 | 91 | 23 | 143 | 103 | 28 | 27 | 169 | 28 | 175 | 126 |
| 4 | 133 | 28 | 168 | 31 | 150 | 190 | 36 | 37 | 178 | 38 | 184 | 135 |
| 5 | 34 | 175 | 139 | 39 | 38 | 158 | 140 | 45 | 234 | 194 | 48 | 145 |
| 6 | 41 | 146 | 40 | 46 | 126 | 47 | 55 | 196 | 149 | 56 | 203 | 252 |
| 7 | 48 | 153 | 118 | 54 | 174 | 173 | 64 | 205 | 158 | 66 | 213 | 212 |
| 8 | 54 | 195 | 139 | 62 | 181 | 221 | 73 | 214 | 262 | 76 | 222 | 75 |
| 9 | 61 | 202 | 62 | 69 | 189 | 70 | 82 | 223 | 81 | 85 | 231 | 183 |
| 10 | 68 | 174 | 209 | 77 | 197 | 157 | 91 | 280 | 92 | 95 | 241 | 192 |
| 11 | 75 | 74 | 76 | 85 | 204 | 5 | 242 | 195 | 6 | 104 | 250 | 251 |
| 12 | 187 | 152 | 81 | 92 | 13 | 172 | 109 | 110 | 204 | 113 | 260 | 211 |
| 13 | 194 | 36 | 141 | 220 | 180 | 101 | 119 | 213 | 260 | 123 | 269 | 25 |
| 14 | 95 | 201 | 25 | 108 | 107 | 109 | 128 | 33 | 270 | 132 | 230 | 133 |
| 15 | 102 | 208 | 32 | 116 | 36 | 235 | 137 | 136 | 138 | 288 | 142 | 44 |
| 16 | 109 | 3 | 179 | 123 | 203 | 4 | 146 | 147 | 4 | 5 | 151 | 249 |
| 17 | 116 | 10 | 186 | 131 | 132 | 130 | 155 | 13 | 249 | 161 | 63 | 160 |
| 18 | 17 | 175 | 70 | 19 | 59 | 138 | 164 | 70 | 23 | 170 | 24 | 268 |
| 19 | 24 | 59 | 130 | 27 | 147 | 146 | 174 | 173 | 32 | 180 | 33 | 179 |
| 20 | 136 | 31 | 137 | 35 | 154 | 234 | 41 | 183 | 277 | 189 | 43 | 42 |
| 21 | 143 | 37 | 2 | 162 | 42 | 82 | 192 | 50 | 3 | 198 | 52 | 101 |
| 22 | 150 | 9 | 149 | 170 | 169 | 50 | 201 | 60 | 202 | 208 | 62 | 110 |
| 23 | 16 | 30 | 209 | 58 | 177 | 18 | 210 | 69 | 21 | 218 | 71 | 22 |
| 24 | 163 | 93 | 23 | 185 | 65 | 66 | 219 | 78 | 125 | 227 | 80 | 81 |
| 25 | 170 | 65 | 171 | 193 | 113 | 192 | 87 | 228 | 134 | 237 | 90 | 41 |
| 26 | 177 | 72 | 176 | 200 | 81 | 121 | 96 | 143 | 49 | 99 | 245 | 148 |
| 27 | 78 | 183 | 43 | 208 | 89 | 49 | 247 | 246 | 105 | 255 | 109 | 254 |
| 28 | 85 | 50 | 138 | 216 | 96 | 97 | 256 | 114 | 67 | 265 | 118 | 167 |
| 29 | 92 | 197 | 127 | 224 | 223 | 104 | 264 | 76 | 265 | 274 | 128 | 275 |
| 30 | 46 | 99 | 204 | 232 | 231 | 72 | 274 | 132 | 180 | 284 | 283 | 137 |

In another example, if the maximum number of sequences per each group is predetermined to 2, the grouping can be performed as shown in the following table 27. The table 27 is also the case when the base sequences are selected by actual cross correlation calculation.

TABLE 27

| Gr. Idx 3RBs | 3RB | 4RB | 5RB | 6RB | 8RB | | 9RB | | 10RB | | 12RB | | 15RB | |
|---|---|---|---|---|---|---|---|---|---|---|---|---|---|---|
| 1 | 1 | 25 | 2 | 20 | 2 | 3 | 25 | 57 | 4 | 60 | 79 | 74 | 51 | 6 | 95 |
| 2 | 2 | 3 | 4 | 40 | 33 | 65 | 28 | 7 | 71 | 64 | 45 | 9 | 120 | 101 | 71 |
| 3 | 3 | 14 | 6 | 7 | 21 | 53 | 9 | 46 | 10 | 11 | 39 | 83 | 13 | 17 | 107 |
| 4 | 4 | 6 | 47 | 9 | 66 | 56 | 41 | 14 | 85 | 15 | 71 | 18 | 122 | 23 | 83 |
| 5 | 5 | 39 | 39 | 47 | 54 | 44 | 50 | 71 | 44 | 56 | 75 | 92 | 23 | 29 | 118 |
| 6 | 6 | 9 | 31 | 61 | 14 | 17 | 84 | 21 | 92 | 97 | 50 | 27 | 96 | 35 | 154 |

TABLE 27-continued

| | | | | | | | | | | | | | | | |
|---|---|---|---|---|---|---|---|---|---|---|---|---|---|---|---|
| 7 | 7 | 42 | 33 | 16 | 28 | 20 | 87 | 24 | 51 | 82 | 63 | 101 | 124 | 40 | 130 |
| 8 | 8 | 12 | 30 | 42 | 54 | 23 | 5 | 28 | 99 | 67 | 86 | 36 | 105 | 46 | 136 |
| 9 | 9 | 45 | 17 | 68 | 21 | 48 | 85 | 31 | 74 | 61 | 89 | 133 | 110 | 52 | 141 |
| 10 | 10 | 15 | 19 | 23 | 5 | 73 | 29 | 106 | 70 | 93 | 112 | 45 | 114 | 58 | 147 |
| 11 | 11 | 1 | 21 | 11 | 25 | 32 | 2 | 38 | 102 | 40 | 78 | 119 | 3 | 64 | 153 |
| 12 | 12 | 37 | 23 | 51 | 63 | 79 | 64 | 95 | 77 | 72 | 44 | 54 | 100 | 69 | 159 |
| 13 | 13 | 4 | 5 | 6 | 30 | 67 | 37 | 45 | 9 | 104 | 47 | 12 | 58 | 75 | 165 |
| 14 | 14 | 21 | 7 | 32 | 22 | 40 | 58 | 102 | 84 | 51 | 6 | 63 | 132 | 81 | 21 |
| 15 | 15 | 23 | 58 | 58 | 34 | 43 | 61 | 105 | 16 | 17 | 111 | 67 | 137 | 86 | 27 |
| 16 | 16 | 24 | 1 | 13 | 65 | 46 | 28 | 91 | 2 | 96 | 2 | 2 | 118 | 93 | 152 |
| 17 | 17 | 26 | 52 | 39 | 49 | 31 | 49 | 23 | 59 | 62 | 107 | 7 | 76 | 158 | 98 |
| 18 | 18 | 43 | 54 | 65 | 41 | 22 | 52 | 62 | 98 | 9 | 66 | 11 | 127 | 104 | 14 |
| 19 | 19 | 29 | 36 | 8 | 20 | 10 | 25 | 30 | 12 | 41 | 24 | 85 | 39 | 20 | 50 |
| 20 | 20 | 46 | 38 | 46 | 60 | 87 | 57 | 69 | 5 | 73 | 35 | 136 | 20 | 115 | 26 |
| 21 | 21 | 32 | 40 | 48 | 66 | 16 | 60 | 1 | 37 | 20 | 1 | 94 | 48 | 121 | 32 |
| 22 | 22 | 2 | 42 | 3 | 50 | 41 | 78 | 76 | 49 | 52 | 24 | 6 | 64 | 127 | 38 |
| 23 | 23 | 35 | 29 | 29 | 17 | 66 | 55 | 79 | 8 | 46 | 27 | 103 | 34 | 133 | 73 |
| 24 | 24 | 5 | 26 | 55 | 43 | 69 | 2 | 83 | 56 | 31 | 12 | 38 | 15 | 139 | 49 |
| 25 | 25 | 38 | 28 | 10 | 57 | 72 | 27 | 15 | 65 | 63 | 46 | 112 | 66 | 144 | 25 |
| 26 | 26 | 8 | 20 | 24 | 17 | 45 | 75 | 63 | 54 | 95 | 57 | 47 | 116 | 150 | 61 |
| 27 | 27 | 41 | 22 | 62 | 44 | 33 | 48 | 93 | 22 | 23 | 98 | 121 | 75 | 156 | 96 |
| 28 | 28 | 33 | 53 | 64 | 50 | 36 | 80 | 61 | 97 | 102 | 57 | 56 | 79 | 162 | 72 |
| 29 | 29 | 44 | 8 | 31 | 38 | 24 | 39 | 100 | 36 | 49 | 68 | 130 | 95 | 78 | 48 |
| 30 | 30 | 22 | 55 | 69 | 51 | 86 | 64 | 50 | 103 | 34 | 109 | 65 | 135 | 173 | 54 |

| Gr. Idx 3RBs | 16RB | | 18RB | | 20RB | | 24RB | | 25RBs | |
|---|---|---|---|---|---|---|---|---|---|---|
| 1 | 6 | 102 | 112 | 7 | 8 | 7 | 9 | 151 | 9 | 10 |
| 2 | 76 | 12 | 119 | 14 | 15 | 135 | 19 | 207 | 19 | 165 |
| 3 | 18 | 114 | 20 | 126 | 23 | 143 | 28 | 27 | 28 | 175 |
| 4 | 25 | 152 | 133 | 28 | 31 | 150 | 36 | 37 | 38 | 184 |
| 5 | 30 | 158 | 34 | 175 | 39 | 38 | 140 | 45 | 194 | 48 |
| 6 | 37 | 132 | 41 | 146 | 46 | 126 | 55 | 196 | 56 | 203 |
| 7 | 43 | 139 | 48 | 153 | 54 | 174 | 64 | 205 | 66 | 213 |
| 8 | 49 | 113 | 54 | 195 | 62 | 181 | 73 | 214 | 76 | 222 |
| 9 | 151 | 103 | 61 | 202 | 69 | 189 | 82 | 223 | 85 | 231 |
| 10 | 62 | 157 | 68 | 174 | 77 | 197 | 91 | 280 | 95 | 241 |
| 11 | 68 | 67 | 75 | 74 | 85 | 204 | 242 | 195 | 104 | 250 |
| 12 | 74 | 169 | 187 | 152 | 92 | 13 | 109 | 110 | 113 | 260 |
| 13 | 80 | 176 | 194 | 36 | 220 | 180 | 119 | 213 | 123 | 269 |
| 14 | 86 | 150 | 95 | 201 | 108 | 107 | 128 | 33 | 132 | 230 |
| 15 | 188 | 93 | 102 | 208 | 116 | 36 | 137 | 136 | 288 | 142 |
| 16 | 3 | 98 | 109 | 3 | 123 | 203 | 146 | 147 | 5 | 151 |
| 17 | 105 | 41 | 116 | 10 | 131 | 132 | 155 | 13 | 161 | 63 |
| 18 | 111 | 47 | 17 | 175 | 19 | 59 | 164 | 70 | 170 | 24 |
| 19 | 117 | 22 | 24 | 59 | 27 | 147 | 174 | 173 | 180 | 33 |
| 20 | 28 | 123 | 136 | 31 | 35 | 154 | 41 | 183 | 189 | 43 |
| 21 | 129 | 34 | 143 | 37 | 162 | 42 | 192 | 50 | 198 | 52 |
| 22 | 135 | 136 | 150 | 9 | 170 | 169 | 201 | 60 | 208 | 62 |
| 23 | 142 | 78 | 16 | 30 | 58 | 177 | 210 | 69 | 218 | 71 |
| 24 | 148 | 52 | 163 | 93 | 185 | 65 | 219 | 78 | 227 | 80 |
| 25 | 154 | 59 | 170 | 65 | 193 | 113 | 87 | 228 | 237 | 90 |
| 26 | 33 | 161 | 177 | 72 | 200 | 81 | 96 | 143 | 99 | 245 |
| 27 | 166 | 39 | 78 | 183 | 208 | 89 | 247 | 246 | 255 | 109 |
| 28 | 173 | 77 | 85 | 50 | 216 | 96 | 256 | 114 | 265 | 118 |
| 29 | 115 | 179 | 92 | 197 | 224 | 223 | 264 | 76 | 274 | 128 |
| 30 | 185 | 89 | 46 | 99 | 232 | 231 | 274 | 132 | 284 | 283 |

In another example, if the maximum number of sequences per each group is predetermined to 1, the grouping can be performed as shown in the following table 28. The table 28 is also the case when the base sequences are selected by actual cross correlation calculation.

TABLE 28

| Gr. Idx 3RBs | 3RB | 4RB | 5RB | 6RB | 8RB | 9RB | 10RB | 12RB | 15RB | 16RB | 18RB | 20RB | 24RB | 25RBs |
|---|---|---|---|---|---|---|---|---|---|---|---|---|---|---|
| 1 | 1 | 25 | 2 | 20 | 3 | 57 | 60 | 74 | 6 | 6 | 112 | 8 | 9 | 9 |
| 2 | 2 | 3 | 4 | 40 | 65 | 7 | 64 | 9 | 101 | 76 | 119 | 15 | 19 | 19 |
| 3 | 3 | 14 | 6 | 7 | 53 | 46 | 11 | 83 | 17 | 18 | 20 | 23 | 28 | 28 |
| 4 | 4 | 6 | 47 | 9 | 56 | 14 | 15 | 18 | 23 | 25 | 133 | 31 | 36 | 38 |
| 5 | 5 | 39 | 39 | 47 | 44 | 71 | 56 | 92 | 29 | 30 | 34 | 39 | 140 | 194 |
| 6 | 6 | 9 | 31 | 61 | 17 | 21 | 97 | 27 | 35 | 37 | 41 | 46 | 55 | 56 |
| 7 | 7 | 42 | 33 | 16 | 20 | 24 | 82 | 101 | 40 | 43 | 48 | 54 | 64 | 66 |
| 8 | 8 | 12 | 30 | 42 | 23 | 28 | 67 | 36 | 46 | 49 | 54 | 62 | 73 | 76 |

TABLE 28-continued

| Gr. Idx 3RBs | 3RB | 4RB | 5RB | 6RB | 8RB | 9RB | 10RB | 12RB | 15RB | 16RB | 18RB | 20RB | 24RB | 25RBs |
|---|---|---|---|---|---|---|---|---|---|---|---|---|---|---|
| 9 | 9 | 45 | 17 | 68 | 48 | 31 | 61 | 133 | 52 | 151 | 61 | 69 | 82 | 85 |
| 10 | 10 | 15 | 19 | 23 | 73 | 106 | 93 | 45 | 58 | 62 | 68 | 77 | 91 | 95 |
| 11 | 11 | 1 | 21 | 11 | 32 | 38 | 40 | 119 | 64 | 68 | 75 | 85 | 242 | 104 |
| 12 | 12 | 37 | 23 | 51 | 79 | 95 | 72 | 54 | 69 | 74 | 187 | 92 | 109 | 113 |
| 13 | 13 | 4 | 5 | 6 | 67 | 45 | 104 | 12 | 75 | 80 | 194 | 220 | 119 | 123 |
| 14 | 14 | 21 | 7 | 32 | 40 | 102 | 51 | 63 | 81 | 86 | 95 | 108 | 128 | 132 |
| 15 | 15 | 23 | 58 | 58 | 43 | 105 | 17 | 67 | 86 | 188 | 102 | 116 | 137 | 288 |
| 16 | 16 | 24 | 1 | 13 | 46 | 91 | 96 | 2 | 93 | 3 | 109 | 123 | 146 | 5 |
| 17 | 17 | 26 | 52 | 39 | 31 | 23 | 62 | 7 | 158 | 105 | 116 | 131 | 155 | 161 |
| 18 | 18 | 43 | 54 | 65 | 22 | 62 | 9 | 11 | 104 | 111 | 17 | 19 | 164 | 170 |
| 19 | 19 | 29 | 36 | 8 | 10 | 30 | 41 | 85 | 20 | 117 | 24 | 27 | 174 | 180 |
| 20 | 20 | 46 | 38 | 46 | 87 | 69 | 73 | 136 | 115 | 28 | 136 | 35 | 41 | 189 |
| 21 | 21 | 32 | 40 | 48 | 16 | 1 | 20 | 94 | 121 | 129 | 143 | 162 | 192 | 198 |
| 22 | 22 | 2 | 42 | 3 | 41 | 76 | 52 | 6 | 127 | 135 | 150 | 170 | 201 | 208 |
| 23 | 23 | 35 | 29 | 29 | 66 | 79 | 46 | 103 | 133 | 142 | 16 | 58 | 210 | 218 |
| 24 | 24 | 5 | 26 | 55 | 69 | 83 | 31 | 38 | 139 | 148 | 163 | 185 | 219 | 227 |
| 25 | 25 | 38 | 28 | 10 | 72 | 15 | 63 | 112 | 144 | 154 | 170 | 193 | 87 | 237 |
| 26 | 26 | 8 | 20 | 24 | 45 | 63 | 95 | 47 | 150 | 33 | 177 | 200 | 96 | 99 |
| 27 | 27 | 41 | 22 | 62 | 33 | 93 | 23 | 121 | 156 | 166 | 78 | 208 | 247 | 255 |
| 28 | 28 | 33 | 53 | 64 | 36 | 61 | 102 | 56 | 162 | 173 | 85 | 216 | 256 | 265 |
| 29 | 29 | 44 | 8 | 31 | 24 | 100 | 49 | 130 | 78 | 115 | 92 | 224 | 264 | 274 |
| 30 | 30 | 22 | 55 | 69 | 86 | 50 | 34 | 65 | 173 | 185 | 46 | 232 | 274 | 284 |

For the above cases, the tables can be reorganized according to the allocated number of sequence per each group and each length.

For another example of this invention, the above tables can be extended to 100 RB length, and following tables show this example. In this example, the maximum number of the root index number (v) for 5 RB length or less is set to 1, and maximum number of the root index number (v) for the length longer than 5 RB is set to 2.

TABLE 29

| | RB | 3 | 4 | 5 | 6 | | 8 | | 9 | | 10 | | 12 | | 15 | |
|---|---|---|---|---|---|---|---|---|---|---|---|---|---|---|---|---|
| | Nzc | 31 | 47 | 59 | 71 | | 89 | | 107 | | 113 | | 139 | | 179 | |
| | Max root per RB | 1 | 1 | 1 | 2 | | 2 | | 2 | | 2 | | 2 | | 2 | |
| Gr. Idx | v | 0 | 0 | 0 | 0 | 1 | 0 | 1 | 0 | 1 | 0 | 1 | 0 | 1 | 0 | 1 |
| 0 | | 0 | 2 | 2 | 2 | 3 | 3 | 2 | 3 | 4 | 4 | 3 | 4 | 5 | 6 | 5 |
| 1 | | 1 | 3 | 4 | 5 | 4 | 6 | 5 | 7 | 6 | 7 | 8 | 9 | 8 | 12 | 11 |
| 2 | | 2 | 5 | 6 | 7 | 6 | 9 | 8 | 10 | 11 | 11 | 10 | 13 | 14 | 17 | 18 |
| 3 | | 3 | 6 | 8 | 9 | 10 | 11 | 12 | 14 | 13 | 15 | 14 | 18 | 17 | 23 | 24 |
| 4 | | 4 | 8 | 10 | 11 | 12 | 14 | 15 | 17 | 18 | 18 | 19 | 22 | 23 | 29 | 28 |
| 5 | | 5 | 9 | 11 | 14 | 13 | 17 | 18 | 21 | 20 | 22 | 21 | 27 | 26 | 35 | 34 |
| 6 | | 6 | 11 | 13 | 16 | 17 | 20 | 21 | 24 | 25 | 26 | 25 | 31 | 32 | 40 | 41 |
| 7 | | 7 | 12 | 15 | 18 | 19 | 23 | 22 | 28 | 27 | 29 | 30 | 36 | 35 | 46 | 47 |
| 8 | | 8 | 14 | 17 | 21 | 20 | 26 | 25 | 31 | 32 | 33 | 32 | 40 | 41 | 52 | 51 |
| 9 | | 9 | 15 | 19 | 23 | 22 | 29 | 28 | 35 | 34 | 36 | 37 | 45 | 44 | 58 | 57 |
| 10 | | 10 | 17 | 21 | 25 | 26 | 32 | 31 | 38 | 37 | 40 | 41 | 49 | 50 | 64 | 63 |
| 11 | | 11 | 18 | 23 | 27 | 28 | 34 | 35 | 41 | 42 | 44 | 43 | 54 | 53 | 69 | 70 |
| 12 | | 12 | 20 | 25 | 30 | 29 | 37 | 38 | 45 | 44 | 47 | 48 | 58 | 59 | 75 | 76 |
| 13 | | 13 | 21 | 27 | 32 | 33 | 40 | 41 | 48 | 49 | 51 | 52 | 63 | 62 | 81 | 80 |
| 14 | | 14 | 23 | 29 | 34 | 35 | 43 | 44 | 52 | 51 | 55 | 54 | 67 | 68 | 87 | 86 |
| 15 | | 15 | 24 | 30 | 37 | 36 | 46 | 45 | 55 | 56 | 58 | 59 | 72 | 71 | 92 | 93 |
| 16 | | 16 | 26 | 32 | 39 | 38 | 49 | 48 | 59 | 58 | 62 | 61 | 76 | 77 | 98 | 99 |
| 17 | | 17 | 27 | 34 | 41 | 42 | 52 | 51 | 62 | 63 | 66 | 65 | 81 | 80 | 104 | 103 |
| 18 | | 18 | 29 | 36 | 44 | 43 | 55 | 54 | 66 | 65 | 69 | 70 | 85 | 86 | 110 | 109 |
| 19 | | 19 | 30 | 38 | 46 | 45 | 57 | 58 | 69 | 70 | 73 | 72 | 90 | 89 | 115 | 116 |
| 20 | | 20 | 32 | 40 | 48 | 49 | 60 | 61 | 72 | 73 | 77 | 76 | 94 | 95 | 121 | 122 |
| 21 | | 21 | 33 | 42 | 50 | 51 | 63 | 64 | 76 | 75 | 80 | 81 | 99 | 98 | 127 | 128 |
| 22 | | 22 | 35 | 44 | 53 | 52 | 66 | 67 | 79 | 80 | 84 | 83 | 103 | 104 | 133 | 132 |
| 23 | | 23 | 36 | 46 | 55 | 54 | 69 | 68 | 83 | 82 | 87 | 88 | 108 | 107 | 139 | 138 |
| 24 | | 24 | 38 | 48 | 57 | 58 | 72 | 71 | 86 | 87 | 91 | 92 | 112 | 113 | 144 | 145 |
| 25 | | 25 | 39 | 49 | 60 | 59 | 75 | 74 | 90 | 89 | 95 | 94 | 117 | 116 | 150 | 151 |
| 26 | | 26 | 41 | 51 | 62 | 61 | 78 | 77 | 93 | 94 | 98 | 99 | 121 | 122 | 156 | 155 |
| 27 | | 27 | 42 | 53 | 64 | 65 | 80 | 81 | 97 | 96 | 102 | 103 | 126 | 125 | 162 | 161 |
| 28 | | 28 | 44 | 55 | 66 | 67 | 83 | 84 | 100 | 101 | 106 | 105 | 130 | 131 | 167 | 168 |
| 29 | | 29 | 45 | 57 | 69 | 68 | 86 | 87 | 104 | 103 | 109 | 110 | 135 | 134 | 173 | 174 |

TABLE 30

| RB | 16 | | 18 | | 20 | | 24 | | 25 | | 27 | | 30 | | 32 | |
|---|---|---|---|---|---|---|---|---|---|---|---|---|---|---|---|---|
| Nzc | 191 | | 211 | | 239 | | 283 | | 293 | | 317 | | 359 | | 383 | |
| Max root per RB | 2 | | 2 | | 2 | | 2 | | 2 | | 2 | | 2 | | 2 | |
| Gr. Idx  v | 0 | 1 | 0 | 1 | 0 | 1 | 0 | 1 | 0 | 1 | 0 | 1 | 0 | 1 | 0 | 1 |
| 0 | 6 | 7 | 7 | 6 | 8 | 7 | 9 | 10 | 9 | 10 | 10 | 11 | 12 | 11 | 12 | 13 |
| 1 | 12 | 13 | 14 | 13 | 15 | 16 | 18 | 19 | 19 | 18 | 20 | 21 | 23 | 24 | 25 | 24 |
| 2 | 18 | 19 | 20 | 21 | 23 | 24 | 27 | 28 | 28 | 29 | 31 | 30 | 35 | 34 | 37 | 38 |
| 3 | 25 | 24 | 27 | 28 | 31 | 30 | 37 | 36 | 38 | 37 | 41 | 40 | 46 | 47 | 49 | 50 |
| 4 | 31 | 30 | 34 | 35 | 39 | 38 | 46 | 45 | 47 | 48 | 51 | 52 | 58 | 57 | 62 | 61 |
| 5 | 37 | 36 | 41 | 40 | 46 | 47 | 55 | 54 | 57 | 56 | 61 | 62 | 69 | 70 | 74 | 75 |
| 6 | 43 | 44 | 48 | 47 | 54 | 53 | 64 | 63 | 66 | 67 | 72 | 71 | 81 | 82 | 86 | 87 |
| 7 | 49 | 50 | 54 | 55 | 62 | 61 | 73 | 74 | 76 | 75 | 82 | 81 | 93 | 92 | 99 | 98 |
| 8 | 55 | 56 | 61 | 62 | 69 | 70 | 82 | 83 | 85 | 86 | 92 | 93 | 104 | 105 | 111 | 112 |
| 9 | 62 | 61 | 68 | 69 | 77 | 78 | 91 | 92 | 95 | 94 | 102 | 103 | 116 | 115 | 124 | 123 |
| 10 | 68 | 67 | 75 | 74 | 85 | 84 | 100 | 101 | 104 | 103 | 112 | 113 | 127 | 128 | 136 | 135 |
| 11 | 74 | 73 | 82 | 81 | 93 | 92 | 110 | 109 | 113 | 114 | 123 | 122 | 139 | 138 | 148 | 149 |
| 12 | 80 | 81 | 88 | 89 | 100 | 101 | 119 | 118 | 123 | 122 | 133 | 132 | 151 | 150 | 161 | 160 |
| 13 | 86 | 87 | 95 | 96 | 108 | 107 | 128 | 127 | 132 | 133 | 143 | 144 | 162 | 163 | 173 | 172 |
| 14 | 92 | 93 | 102 | 103 | 116 | 115 | 137 | 136 | 142 | 141 | 153 | 154 | 174 | 173 | 185 | 186 |
| 15 | 99 | 98 | 109 | 108 | 123 | 124 | 146 | 147 | 151 | 152 | 164 | 163 | 185 | 186 | 198 | 197 |
| 16 | 105 | 104 | 116 | 115 | 131 | 132 | 155 | 156 | 161 | 160 | 174 | 173 | 197 | 196 | 210 | 211 |
| 17 | 111 | 110 | 123 | 122 | 139 | 138 | 164 | 165 | 170 | 171 | 184 | 185 | 208 | 209 | 222 | 223 |
| 18 | 117 | 118 | 129 | 130 | 146 | 147 | 173 | 174 | 180 | 179 | 194 | 195 | 220 | 221 | 235 | 234 |
| 19 | 123 | 124 | 136 | 137 | 154 | 155 | 183 | 182 | 189 | 190 | 205 | 204 | 232 | 231 | 247 | 248 |
| 20 | 129 | 130 | 143 | 142 | 162 | 161 | 192 | 191 | 198 | 199 | 215 | 214 | 243 | 244 | 259 | 260 |
| 21 | 136 | 135 | 150 | 149 | 170 | 169 | 201 | 200 | 208 | 207 | 225 | 224 | 255 | 254 | 272 | 271 |
| 22 | 142 | 141 | 157 | 156 | 177 | 178 | 210 | 209 | 217 | 218 | 235 | 236 | 266 | 267 | 284 | 285 |
| 23 | 148 | 147 | 163 | 164 | 185 | 186 | 219 | 220 | 227 | 226 | 245 | 246 | 278 | 277 | 297 | 296 |
| 24 | 154 | 155 | 170 | 171 | 193 | 192 | 228 | 229 | 236 | 237 | 256 | 255 | 290 | 289 | 309 | 308 |
| 25 | 160 | 161 | 177 | 176 | 200 | 201 | 237 | 238 | 246 | 245 | 266 | 265 | 301 | 302 | 321 | 322 |
| 26 | 166 | 167 | 184 | 183 | 208 | 209 | 246 | 247 | 255 | 256 | 276 | 277 | 313 | 312 | 334 | 333 |
| 27 | 173 | 172 | 191 | 190 | 216 | 215 | 256 | 255 | 265 | 264 | 286 | 287 | 324 | 325 | 346 | 345 |
| 28 | 179 | 178 | 197 | 198 | 224 | 223 | 265 | 264 | 274 | 275 | 297 | 296 | 336 | 335 | 358 | 359 |
| 29 | 185 | 184 | 204 | 205 | 231 | 232 | 274 | 273 | 284 | 283 | 307 | 306 | 347 | 348 | 371 | 370 |

TABLE 31

| | RB | 36 | | 40 | | 45 | | 48 | | 50 | | 54 | | 60 | | 64 | |
|---|---|---|---|---|---|---|---|---|---|---|---|---|---|---|---|---|---|
| 1 | RB | 36 | | 40 | | 45 | | 48 | | 50 | | 54 | | 60 | | 64 | |
| 2 | Nzc | 431 | | 479 | | 523 | | 571 | | 599 | | 647 | | 719 | | 761 | |
| | Max root per RB | 2 | | 2 | | 2 | | 2 | | 2 | | 2 | | 2 | | 2 | |
| Gr. Idx  v | | 0 | 1 | 0 | 1 | 0 | 1 | 0 | 1 | 0 | 1 | 0 | 1 | 0 | 1 | 0 | 1 |
| 0 | | 14 | 13 | 15 | 16 | 17 | 16 | 18 | 19 | 19 | 20 | 21 | 20 | 23 | 24 | 25 | 24 |
| 1 | | 28 | 27 | 31 | 30 | 34 | 33 | 37 | 36 | 39 | 38 | 42 | 41 | 46 | 47 | 49 | 50 |
| 2 | | 42 | 41 | 46 | 47 | 51 | 50 | 55 | 56 | 58 | 57 | 63 | 62 | 70 | 69 | 74 | 73 |
| 3 | | 56 | 55 | 62 | 61 | 67 | 68 | 74 | 73 | 77 | 78 | 83 | 84 | 93 | 92 | 98 | 99 |
| 4 | | 70 | 69 | 77 | 78 | 84 | 85 | 92 | 93 | 97 | 96 | 104 | 105 | 116 | 115 | 123 | 122 |
| 5 | | 83 | 84 | 93 | 92 | 101 | 102 | 111 | 110 | 116 | 115 | 125 | 126 | 139 | 140 | 147 | 148 |
| 6 | | 97 | 98 | 108 | 109 | 118 | 119 | 129 | 128 | 135 | 136 | 146 | 147 | 162 | 163 | 172 | 171 |
| 7 | | 111 | 112 | 124 | 123 | 135 | 134 | 147 | 148 | 155 | 154 | 167 | 166 | 186 | 185 | 196 | 197 |
| 8 | | 125 | 126 | 139 | 140 | 152 | 151 | 166 | 165 | 174 | 173 | 188 | 187 | 209 | 208 | 221 | 220 |
| 9 | | 139 | 140 | 155 | 154 | 169 | 168 | 184 | 185 | 193 | 194 | 209 | 208 | 232 | 231 | 245 | 246 |
| 10 | | 153 | 152 | 170 | 169 | 186 | 185 | 203 | 202 | 213 | 212 | 230 | 229 | 255 | 256 | 270 | 271 |
| 11 | | 167 | 166 | 185 | 186 | 202 | 203 | 221 | 222 | 232 | 231 | 250 | 251 | 278 | 279 | 295 | 294 |
| 12 | | 181 | 180 | 201 | 200 | 219 | 220 | 239 | 240 | 251 | 252 | 271 | 272 | 302 | 301 | 319 | 320 |
| 13 | | 195 | 194 | 216 | 217 | 236 | 237 | 258 | 257 | 271 | 270 | 292 | 293 | 325 | 324 | 344 | 343 |
| 14 | | 209 | 208 | 232 | 231 | 253 | 254 | 276 | 277 | 290 | 289 | 313 | 314 | 348 | 347 | 368 | 369 |
| 15 | | 222 | 223 | 247 | 248 | 270 | 269 | 295 | 294 | 309 | 310 | 334 | 333 | 371 | 372 | 393 | 392 |
| 16 | | 236 | 237 | 263 | 262 | 287 | 286 | 313 | 314 | 328 | 329 | 355 | 354 | 394 | 395 | 417 | 418 |
| 17 | | 250 | 251 | 278 | 279 | 304 | 303 | 332 | 331 | 348 | 347 | 376 | 375 | 417 | 418 | 442 | 441 |
| 18 | | 264 | 265 | 294 | 293 | 321 | 320 | 350 | 349 | 367 | 368 | 397 | 396 | 441 | 440 | 466 | 467 |
| 19 | | 278 | 279 | 309 | 310 | 337 | 338 | 368 | 369 | 386 | 387 | 417 | 418 | 464 | 463 | 491 | 490 |
| 20 | | 292 | 291 | 324 | 325 | 354 | 355 | 387 | 386 | 406 | 405 | 438 | 439 | 487 | 488 | 516 | 515 |
| 21 | | 306 | 305 | 340 | 339 | 371 | 372 | 405 | 406 | 425 | 426 | 459 | 460 | 510 | 511 | 540 | 541 |

TABLE 31-continued

| | | | | | | | | | | | | | | | | |
|---|---|---|---|---|---|---|---|---|---|---|---|---|---|---|---|---|
| 22 | 320 | 319 | 355 | 356 | 388 | 389 | 424 | 423 | 444 | 445 | 480 | 481 | 533 | 534 | 565 | 564 |
| 23 | 334 | 333 | 371 | 370 | 405 | 404 | 442 | 443 | 464 | 463 | 501 | 500 | 557 | 556 | 589 | 590 |
| 24 | 348 | 347 | 386 | 387 | 422 | 421 | 460 | 461 | 483 | 484 | 522 | 521 | 580 | 579 | 614 | 613 |
| 25 | 361 | 362 | 402 | 401 | 439 | 438 | 479 | 478 | 502 | 503 | 543 | 542 | 603 | 604 | 638 | 639 |
| 26 | 375 | 376 | 417 | 418 | 456 | 455 | 497 | 498 | 522 | 521 | 564 | 563 | 626 | 627 | 663 | 662 |
| 27 | 389 | 390 | 433 | 432 | 472 | 473 | 516 | 515 | 541 | 542 | 584 | 585 | 649 | 650 | 687 | 688 |
| 28 | 403 | 404 | 448 | 449 | 489 | 490 | 534 | 535 | 560 | 561 | 605 | 606 | 673 | 672 | 712 | 711 |
| 29 | 417 | 418 | 464 | 463 | 506 | 507 | 553 | 552 | 580 | 579 | 626 | 627 | 696 | 695 | 736 | 737 |

TABLE 32

| 1 | RB | 72 | | 75 | | 80 | | 81 | | 90 | | 96 | | 100 | |
|---|---|---|---|---|---|---|---|---|---|---|---|---|---|---|---|
| 2 | Nzc | 863 | | 887 | | 953 | | 971 | | 1069 | | 1151 | | 1193 | |
| | Max root per RB | 2 | | 2 | | 2 | | 2 | | 2 | | 2 | | 2 | |
| Gr. Idx | v | 0 | 1 | 0 | 1 | 0 | 1 | 0 | 1 | 0 | 1 | 0 | 1 | 0 | 1 |
| 0 | | 28 | 27 | 29 | 28 | 31 | 30 | 31 | 32 | 34 | 35 | 37 | 38 | 38 | 39 |
| 1 | | 56 | 55 | 57 | 58 | 61 | 62 | 63 | 62 | 69 | 68 | 74 | 75 | 77 | 76 |
| 2 | | 84 | 83 | 86 | 85 | 92 | 93 | 94 | 93 | 103 | 104 | 111 | 112 | 115 | 116 |
| 3 | | 111 | 112 | 114 | 115 | 123 | 122 | 125 | 126 | 138 | 137 | 149 | 148 | 154 | 153 |
| 4 | | 139 | 140 | 143 | 144 | 154 | 153 | 157 | 156 | 172 | 173 | 186 | 185 | 192 | 193 |
| 5 | | 167 | 168 | 172 | 171 | 184 | 185 | 188 | 187 | 207 | 206 | 223 | 222 | 231 | 230 |
| 6 | | 195 | 194 | 200 | 201 | 215 | 216 | 219 | 220 | 241 | 242 | 260 | 259 | 269 | 270 |
| 7 | | 223 | 222 | 229 | 228 | 246 | 245 | 251 | 250 | 276 | 275 | 297 | 298 | 308 | 307 |
| 8 | | 251 | 250 | 258 | 257 | 277 | 276 | 282 | 281 | 310 | 311 | 334 | 335 | 346 | 347 |
| 9 | | 278 | 279 | 286 | 287 | 307 | 308 | 313 | 314 | 345 | 344 | 371 | 372 | 385 | 384 |
| 10 | | 306 | 307 | 315 | 314 | 338 | 339 | 345 | 344 | 379 | 380 | 408 | 409 | 423 | 424 |
| 11 | | 334 | 335 | 343 | 344 | 369 | 368 | 376 | 375 | 414 | 413 | 446 | 445 | 462 | 461 |
| 12 | | 362 | 361 | 372 | 371 | 400 | 399 | 407 | 408 | 448 | 449 | 483 | 482 | 500 | 501 |
| 13 | | 390 | 389 | 401 | 400 | 430 | 431 | 439 | 438 | 483 | 482 | 520 | 519 | 539 | 538 |
| 14 | | 418 | 417 | 429 | 430 | 461 | 462 | 470 | 469 | 517 | 518 | 557 | 556 | 577 | 578 |
| 15 | | 445 | 446 | 458 | 457 | 492 | 491 | 501 | 502 | 552 | 551 | 594 | 595 | 616 | 615 |
| 16 | | 473 | 474 | 486 | 487 | 523 | 522 | 532 | 533 | 586 | 587 | 631 | 632 | 654 | 655 |
| 17 | | 501 | 502 | 515 | 516 | 553 | 554 | 564 | 563 | 621 | 620 | 668 | 669 | 693 | 692 |
| 18 | | 529 | 528 | 544 | 543 | 584 | 585 | 595 | 596 | 655 | 656 | 705 | 706 | 731 | 732 |
| 19 | | 557 | 556 | 572 | 573 | 615 | 614 | 626 | 627 | 690 | 689 | 743 | 742 | 770 | 769 |
| 20 | | 585 | 584 | 601 | 600 | 646 | 645 | 658 | 657 | 724 | 725 | 780 | 779 | 808 | 809 |
| 21 | | 612 | 613 | 629 | 630 | 676 | 677 | 689 | 690 | 759 | 758 | 817 | 816 | 847 | 846 |
| 22 | | 640 | 641 | 658 | 659 | 707 | 708 | 720 | 721 | 793 | 794 | 854 | 853 | 885 | 886 |
| 23 | | 668 | 669 | 687 | 686 | 738 | 737 | 752 | 751 | 828 | 827 | 891 | 892 | 924 | 923 |
| 24 | | 696 | 695 | 715 | 716 | 769 | 768 | 783 | 784 | 862 | 863 | 928 | 929 | 962 | 963 |
| 25 | | 724 | 723 | 744 | 743 | 799 | 800 | 814 | 815 | 897 | 896 | 965 | 966 | 1001 | 1000 |
| 26 | | 752 | 751 | 773 | 772 | 830 | 831 | 846 | 845 | 931 | 932 | 1002 | 1003 | 1039 | 1040 |
| 27 | | 779 | 780 | 801 | 802 | 861 | 860 | 877 | 878 | 966 | 965 | 1040 | 1039 | 1078 | 1077 |
| 28 | | 807 | 808 | 830 | 829 | 892 | 891 | 908 | 909 | 1000 | 1001 | 1077 | 1076 | 1116 | 1117 |
| 29 | | 835 | 836 | 858 | 859 | 922 | 923 | 940 | 939 | 1035 | 1034 | 1114 | 1113 | 1155 | 1154 |

Based on these concepts, the present invention provides a method for generating reference signal sequence using ZC sequence as follows.

To generate reference signal sequence, one embodiment of the present invention defines a specific base sequence for allying cyclic shift. In this embodiment, the base sequence is defined using ZC sequence with certain root index (hereinafter "q"). And, the specific base sequence is selected from the base sequence groups, and each of the base sequence group contains base sequences having a high cross correlation relation as stated above. So, if one wants to select the specific base sequence with index of "q", the "q" should be selected considering the group index (hereinafter "u") and the base sequence number index within each group (hereinafter "v"). That is, "q" should be a function of "u" and "v".

And, after the specific base sequence with root index "q" is selected, then the cyclic shift corresponding to various cyclic shift values can be applied to the selected base sequence.

If the relation between the "q", "u" and "v" is more specifically considered, "q" can be acquired by the following equations. The following equations 17 and 18 are for selecting the index "q" to meet the condition that the term ($s_1/N_1 - s_2/N_2$) becomes close to zero.

$$q = \text{round}(y) + \text{floor}\left(\frac{v+1}{2}\right) \cdot (-1)^{floor(round(y)-y)+v} \quad \text{[Equation 17]}$$

where $y = \frac{N_{zc}^{RS} \cdot (u+1)}{N_{reference,zc}^{RS}}$, $u \in \{0, 1, \ldots, 29\}$, $v \in \{0, 1, \ldots, \text{floor}(N_{ZC}^{RS}/30) - 1\}$ $$q = \text{floor}(y + 0.5) + \text{floor}\left(\frac{v+1}{2}\right) \cdot (-1)^{floor(floor(y+0.5)-y)+v} \quad \text{[Equation 18]}$$

where $y = \frac{N_{zc}^{RS} \cdot (u+1)}{N_{reference,zc}^{RS}}$, $u \in \{0, 1, \ldots, 29\}$, $v \in \{0, 1, \ldots, \text{floor}(N_{ZC}^{RS}/30) - 1\}$.

Here, $N_{zc}^{RS}$ is the target ZC sequence generation length used in generating the q-th root ZC sequence, and $N_{zc}^{RS}$ is given by the largest prime number which is less than the corresponding reference signal sequence size. That is, the base sequence is generated by cyclic extension method.

And, $N_{reference,zc}^{RS}$ is the length given by the largest prime number which is less than the reference sequence size, for example, 3 RB length. If the grouping is based on the 3 RB length, then $N_{reference,zc}^{RS}$ is 31. The "round (z)" is a function of rounding off to a nearest integer nearest to z, and the "floor (z)" is a function of making a greatest integer not greater than z.

And, according to another embodiment of this invention, if the ZC sequence is generated based on the truncation method, then $N_{zc}^{RS}$ can be given by the smallest prime number which is greater than the corresponding reference signal sequence size. And, in this case, $N_{reference,zc}^{RS}$ can be the length given by the smallest prime number which is greater than the reference sequence size, for example, 3 RB length. If the grouping is based on the 3 RB length, then $N_{reference,zc}^{RS}$ can be 37.

And, according to equations 17 and 18, "m"-th element of the "q"-th ZC sequence ($x_q(m)$) can be expressed as follows.

$$x_q(m) = e^{-j\frac{\pi qm(m+1)}{N_{ZC}^{RS}}}, 0 \le m \le N_{ZC}^{RS} - 1 \quad \text{[Equation 19]}$$

Because "round (y)" and "floor (y+0.5)" are actually equivalent, the equations 17 and 18 have the same meaning. In the equations 17 and 18, the term $(-1)^{floor(round(y)-y)}$ means that if "y" has 0.5 or greater value in its decimal place, $(-1)^{floor(round(y)-y)}$ can be calculated as "1", and if "y" has the value less than 0.5 in its decimal place, $(-1)^{floor(round(y)-y)}$ can be calculated as "−1". So, $(-1)^{floor(round(y)-y)}$ can be replaced with $(-1)^{floor(y-round(y)+1}$ or any other equivalent terms having the same meaning.

In the above examples, when the grouping is performed for the length greater than the 3 RB length based on the 3 RB length, and when the ZC sequence is generated based on the cyclic extension method, $N_{reference,zc}^{RS}$ can be 31. Also, when the ZC sequence is generated based on the truncation method, $N_{reference,zc}^{RS}$ can be 37. And, when the grouping is performed for the length greater than the 4 RB length based on the 4 RB length, and when the ZC sequence is generated based on the cyclic extension method, $N_{reference,zc}^{RS}$ can be 47. Also, when the ZC sequence is generated based on the truncation method, $N_{reference,zc}^{RS}$ can be 49. And, this can be easily employed to other length based grouping.

Above mentioned tables can be acquired by the equations 17 and 18. The following examples are part of selecting root index according to the equations 17 and 18.

First, if the $N_{reference,zc}$=31, the method for selecting first group ("u"=0) when 1) Nzc=47, 2) Nzc=71 3)Nzc=211 is as follows. In the following examples, the equation 18 is used.

1) $N_{reference,zc} = 31, N_{zc}^{RS} = 47, u = 0, v = 0; y = 47/31,$ $$q = \left\lfloor \frac{47}{31} + 0.5 \right\rfloor + \left\lfloor \frac{0+1}{2} \right\rfloor \cdot (-1)^{\lfloor \lfloor \frac{47}{31}+0.5 \rfloor - \frac{47}{31} \rfloor + 0} = 2$$

So, for 4 RB length, the first base sequence number (v=0) in the first group (u=0) is 2 (q=2).

2) $N_{reference,zc} = 31, N_{zc}^{RS} = 71, u = 0, v = 0; y = 71/31,$ $$q = \left\lfloor \frac{71}{31} + 0.5 \right\rfloor + \left\lfloor \frac{0+1}{2} \right\rfloor \cdot (-1)^{\lfloor \lfloor \frac{71}{31}+0.5 \rfloor - \frac{71}{31} \rfloor + 0} = 2$$

So, for 6 RB length, the first base sequence number (v=0) in the first group (u=0) is 2 (q=2).

3) $N_{reference,zc} = 31, N_{zc}^{RS} = 211, u = 0, v = 0; y = 211/31,$ $$q = \left\lfloor \frac{211}{31} + 0.5 \right\rfloor + \left\lfloor \frac{0+1}{2} \right\rfloor \cdot (-1)^{\lfloor \lfloor \frac{211}{31}+0.5 \rfloor - \frac{211}{31} \rfloor + 0} = 7$$

So, for 18 RB length, the first base sequence number (v=0) in the first group (u=0) is 7 (q=7).

For the above cases, the selected root indexes (q) correspond to the data in tables 6~8 which are generated based on 3 RB length.

In another example, if the $N_{reference,zc}$=47 (based on 4 RB length), the method for selecting the second group ("u"=1) when 1) Nzc=59, 2) Nzc=107 3)Nzc=139 is as follows. In the following examples, the equation 18 is used.

1) $N_{reference,zc} = 47, N_{zc}^{RS} = 59, u = 1, v = 0; y = 59/47*2,$ $$q = \left\lfloor \frac{59 \cdot 2}{47} + 0.5 \right\rfloor + \left\lfloor \frac{0+1}{2} \right\rfloor \cdot (-1)^{\lfloor \lfloor \frac{59 \cdot 2}{47}+0.5 \rfloor - \frac{59 \cdot 2}{47} \rfloor + 0} = 3$$

So, for 5 RB length, the first base sequence number (v=0) in the second group (u=1) is 3 (q=3).

2) $N_{reference,zc} = 47, N_{zc}^{RS} = 107, u = 1, v = 0; y = 107/47*2,$ $$q = \left\lfloor \frac{107 \cdot 2}{47} + 0.5 \right\rfloor + \left\lfloor \frac{0+1}{2} \right\rfloor \cdot (-1)^{\lfloor \lfloor \frac{107 \cdot 2}{47}+0.5 \rfloor - \frac{107 \cdot 2}{47} \rfloor + 0} = 5$$

So, for 9 RB length, the first base sequence number (v=0) in the second group (u=1) is 5 (q=5).

3) $N_{reference,zc} = 47, N_{zc}^{RS} = 139, u = 1, v = 0; y = 139/47*2,$ $$q = \left\lfloor \frac{139 \cdot 2}{47} + 0.5 \right\rfloor + \left\lfloor \frac{0+1}{2} \right\rfloor \cdot (-1)^{\lfloor \lfloor \frac{139 \cdot 2}{47}+0.5 \rfloor - \frac{139 \cdot 2}{47} \rfloor + 0} = 6$$

So, for 12 RB length, the first base sequence number (v=0) in the second group (u=1) is 6 (q=6).

In another embodiment of the present invention, the equations 17 and 18 can be replaced as follows.

$$q = \text{round}(y) + \text{floor}\left(\frac{v+1}{2}\right) \cdot (-1)^{floor(round(y)-y)+v} \quad \text{[Equation 20]}$$

where $y = \frac{(N_{zc}^{RS} - 1) \cdot (u+1)}{N_{reference,zc}^{RS} - 1}, u \in \{0, 1, \ldots, 29\},$ $v \in \{0, 1, \ldots, \text{floor}(N_{ZC}^{RS}/30) - 1\}$ -continued $$q = \text{floor}(y + 0.5) + \text{floor}\left(\frac{v+1}{2}\right) \cdot (-1)^{\text{floor}(\text{floor}(y+0.5)-y)+v} \quad [\text{Equation 21}]$$
$$\text{where } y = \frac{(N_{zc}^{RS} - 1) \cdot (u+1)}{N_{reference,zc}^{RS} - 1}, u \in \{0, 1, \ldots, 29\},$$
$$v \in \{0, 1, \ldots, \text{floor}(N_{ZC}^{RS}/30) - 1\}$$

Because "round (y)" and "floor (y+0.5)" are actually equivalent, the equations 20 and 21 have the same meaning.

In another embodiment of the present invention, the equations 17 and 18 can be replaced as follows.

$$q = \text{round}(y) + \text{floor}\left(\frac{v+1}{2}\right) \cdot (-1)^{\text{floor}(\text{round}(y)-y)+v} \quad [\text{Equation 22}]$$
$$\text{where } y = \text{round}\left(\frac{N_{zc}^{RS}}{N_{reference,zc}^{RS}}\right) \cdot (u+1),$$
$$u \in \{0, 1, \ldots, 29\},$$
$$v \in \{0, 1, \ldots, \text{floor}(N_{ZC}^{RS}/30) - 1\}$$

$$q = \text{floor}(y + 0.5) + \text{floor}\left(\frac{v+1}{2}\right) \cdot (-1)^{\text{floor}(\text{floor}(y+0.5)-y)+v} \quad [\text{Equation 23}]$$
$$\text{where } y = \text{floor}\left(\frac{N_{zc}^{RS}}{N_{reference,zc}^{RS}} + 0.5\right) \cdot (u+1),$$
$$u \in \{0, 1, \ldots, 29\},$$
$$v \in \{0, 1, \ldots, \text{floor}(N_{ZC}^{RS}/30) - 1\}$$

These equations correspond to various grouping method explained with regard to the above mentioned tables.

If the maximum number of sequences, which can be grouped in one group, are predetermined to 2, the equations 17-18, 20-21 and 22-23 can be simplified as follows, respectively.

$$q = \text{round}(y) + v \cdot (-1)^{\text{floor}(2y)} \quad [\text{Equation 24}]$$
$$\text{where } y = \frac{N_{zc}^{RS} \cdot (u+1)}{N_{reference,zc}^{RS}},$$
$$u \in \{0, 1, \ldots, 29\}, v \in \{0, 1\}$$

$$q = \text{floor}(y + 0.5) + v \cdot (-1)^{\text{floor}(2y)} \quad [\text{Equation 25}]$$
$$\text{where } y = \frac{N_{zc}^{RS} \cdot (u+1)}{N_{reference,zc}^{RS}},$$
$$u \in \{0, 1, \ldots, 29\}, v \in \{0, 1\}$$

$$q = \text{round}(y) + v \cdot (-1)^{\text{floor}(2y)} \quad [\text{Equation 26}]$$
$$\text{where } y = \frac{(N_{zc}^{RS} - 1) \cdot (u+1)}{N_{reference,zc}^{RS} - 1},$$
$$u \in \{0, 1, \ldots, 29\}, v \in \{0, 1\}$$

$$q = \text{floor}(y + 0.5) + v \cdot (-1)^{\text{floor}(2y)} \quad [\text{Equation 27}]$$
$$\text{where } y = \frac{(N_{zc}^{RS} - 1) \cdot (u+1)}{N_{reference,zc}^{RS} - 1},$$
$$u \in \{0, 1, \ldots, 29\}, v \in \{0, 1\}$$

$$q = \text{round}(y) + v \cdot (-1)^{\text{floor}(2y)} \quad [\text{Equation 28}]$$
$$\text{where } y = \text{round}\left(\frac{N_{zc}^{RS}}{N_{reference,zc}^{RS}}\right) \cdot (u+1),$$
$$u \in \{0, 1, \ldots, 29\}, v \in \{0, 1\}$$

$$q = \text{floor}(y + 0.5) + v \cdot (-1)^{\text{floor}(2y)} \quad [\text{Equation 29}]$$
$$\text{where } y = \text{floor}\left(\frac{N_{zc}^{RS}}{N_{reference,zc}^{RS}} + 0.5\right) \cdot (u+1),$$
$$u \in \{0, 1, \ldots, 29\}, v \in \{0, 1\}$$

The equations 17-18, 20-21 and 22-23 are for selecting ZC root index to meet the condition that the term $(s_1/N_1 - s_2/N_2)$ become close to zero. And, the equations 24-29 are for selecting root index ZC root index when the maximum number of sequences per groups of each length is limited to 2.

But if we make these equations to be more generalized such that the term $(s_1/N_1 - s_2/N_2)$ become close to a specific value (T), the following equations can be acquired. In this case, the value "T" can be 0, ½, –½, ⅓, –⅓. But value "T" can have other value.

In the following equations, the equations 30 and 31 are for selecting ZC root index when the maximum number of sequence per group of each length can have the maximum value. And, the equations 32 and 33 are for selecting ZC root index when the maximum number of sequence per group of each length is limited to 2.

$$q = \text{round}(y) + \text{floor}\left(\frac{v+1}{2}\right) \cdot (-1)^{\text{floor}(\text{round}(y)-y)+v} \quad [\text{Equation 30}]$$
$$\text{where } y = N_{zc}^{RS} \cdot \left(T + \frac{(u+1)}{N_{reference,zc}^{RS}}\right),$$
$$u \in \{0, 1, \ldots, 29\},$$
$$v \in \{0, 1, \ldots, \text{floor}(N_{ZC}^{RS}/30) - 1\}$$

$$q = \text{floor}(y + 0.5) + \text{floor}\left(\frac{v+1}{2}\right) \cdot (-1)^{\text{floor}(\text{floor}(y+0.5)-y)+v} \quad [\text{Equation 31}]$$
$$\text{where } y = N_{zc}^{RS} \cdot \left(T + \frac{(u+1)}{N_{reference,zc}^{RS}}\right),$$
$$u \in \{0, 1, \ldots, 29\},$$
$$v \in \{0, 1, \ldots, \text{floor}(N_{ZC}^{RS}/30) - 1\}$$

$$q = \text{round}(y) + v \cdot (-1)^{\text{floor}(2y)} \quad [\text{Equation 32}]$$
$$\text{where } y = N_{zc}^{RS} \cdot \left(T + \frac{(u+1)}{N_{reference,zc}^{RS}}\right),$$
$$u \in \{0, 1, \ldots, 29\}, v \in \{0, 1\}$$

$$q = \text{floor}(y + 0.5) + v \cdot (-1)^{\text{floor}(2y)} \quad [\text{Equation 33}]$$
$$\text{where } y = N_{zc}^{RS} \cdot \left(T + \frac{(u+1)}{N_{reference,zc}^{RS}}\right),$$
$$u \in \{0, 1, \ldots, 29\}, v \in \{0, 1\}$$

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

According to the embodiments of the present invention, inter cell interference caused by using variable length sequences can be minimized. And, if each grouped base sequence is allocated to specific cell or Node B, UE(s) can use variable length sequence as reference signal.

These methods are appropriate to be employed in 3GPP LTE (3$^{rd}$ Generation Partnership Project Long Term Evolution) system. But, those skilled in the art can easily understand that these methods can be employed to any wireless communication system using various length sequences as a reference signal sequences.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for a user equipment (UE) to transmit reference signal sequences to a base station, the method comprising:

acquiring a reference signal sequence by using sequences divided into groups,
wherein each group comprises sequences generated by using Zadoff-Chu (ZC) sequences having lengths of $N_1, N_2, \ldots, N_M$ and having sequence indices of $s_1, s_2, \ldots, s_M$ for each length respectively, wherein any of two sequence indices $s_i$ and $s_j$ (i and j$\in\{1, 2, \ldots, M\}$) of sequences within the same group are closest integer numbers satisfying the equation:

$$s_i/N_i = s_j/N_j,$$

wherein the reference signal sequence is acquired by using sequences of a group having a group index determined based on a cell identification, and
transmitting the acquired reference signal sequence to the base station.

2. The method of claim 1, wherein each group further comprises sequences generated by using ZC sequences having lengths greater than a predetermined length and having sequence indices other than the sequence indices of $s_1, s_2, \ldots, s_M$ for the corresponding ZC sequence length.

3. The method of claim 1, wherein each group comprises at least one sequence for each length of $N_1, N_2, \ldots, N_M$.

4. The method of claim 1, wherein a length of the reference signal sequence corresponds to an integer multiple of a resource block size in a frequency domain.

5. The method of claim 1, wherein each group further comprises sequences defined by using another type of sequence other than the ZC sequence.

6. A user equipment (UE) for transmitting reference signal sequences to a base station, the UE comprising:

a transceiver configured to transmit signals; and
a processor configured to:
acquire a reference signal sequence by using sequences divided into groups,
wherein each group comprises sequences generated by using Zadoff-Chu (ZC) sequences having lengths of $N_1, N_2, \ldots, N_M$ and having sequence indices of $s_1, s_2, \ldots, s_M$ for each length respectively, wherein any of two sequence indices $s_i$ and $s_j$ (i and j$\in\{1, 2, \ldots, M\}$) of sequences within the same group are closest integer numbers satisfying the equation:

$$s_i/N_i = s_j/N_j,$$

wherein the reference signal sequence is acquired by using sequences of a group having a group index determined based on a cell identification, and
control the transceiver to transmit the acquired reference signal sequence to the base station.

7. The UE of claim 6, wherein each group further comprises sequences generated by using ZC sequences having lengths greater than a predetermined length and having sequence indices other than the sequence indices of $s_1, s_2, \ldots, s_M$ for the corresponding ZC sequence length.

8. The UE of claim 6, wherein each group comprises at least one sequence for each length of $N_1, N_2, \ldots, N_M$.

9. The UE of claim 6, wherein a length of the reference signal sequence corresponds to an integer multiple of a resource block size in a frequency domain.

10. The UE of claim 6, wherein each group further comprises sequences defined by using another type of sequence other than the ZC sequence.

* * * * *